(12) United States Patent
Severinsky

(10) Patent No.: US 8,114,916 B2
(45) Date of Patent: *Feb. 14, 2012

(54) SYSTEMS, METHODS, AND COMPOSITIONS FOR PRODUCTION OF SYNTHETIC HYDROCARBON COMPOUNDS

(75) Inventor: Alexander J. Severinsky, Chevy Chase, MD (US)

(73) Assignee: Fuelcor, LLC, McClean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/939,724

(22) Filed: Nov. 4, 2010

(65) Prior Publication Data

US 2011/0054047 A1 Mar. 3, 2011

Related U.S. Application Data

(63) Continuation of application No. 12/647,121, filed on Dec. 24, 2009, now Pat. No. 7,863,340, which is a continuation of application No. 11/276,850, filed on Mar. 16, 2006, now Pat. No. 7,642,292.

(60) Provisional application No. 60/661,923, filed on Mar. 16, 2005, provisional application No. 60/678,174, filed on May 6, 2005.

(51) Int. Cl.
*C07C 27/00* (2006.01)
(52) U.S. Cl. ...................... 518/700; 518/702
(58) Field of Classification Search .......... 518/700, 518/702
See application file for complete search history.

(56) References Cited

U.S. PATENT DOCUMENTS

| | | | |
|---|---|---|---|
| 4,074,980 A | 2/1978 | Wainer | |
| 4,081,253 A | 3/1978 | Marion | |
| 4,152,292 A | 5/1979 | Conner et al. | |
| 4,159,201 A | 6/1979 | Staege | |
| RE30,085 E | 8/1979 | Perret | |
| 4,187,165 A | 2/1980 | Appleby et al. | |
| 4,225,401 A | 9/1980 | Divisek et al. | |
| 4,235,694 A | 11/1980 | Hall | |
| 4,265,868 A | 5/1981 | Kamody | |
| 4,279,830 A | 7/1981 | Haag et al. | |
| 4,285,786 A | 8/1981 | Larson | |
| 4,318,997 A | 3/1982 | Flockenhaus et al. | |
| 4,357,224 A | 11/1982 | Hardman et al. | |
| 4,457,816 A | 7/1984 | Galluzzo et al. | |
| 4,553,981 A | 11/1985 | Fuderer | |
| 4,622,308 A | 11/1986 | Koikeda et al. | |
| 4,623,668 A | 11/1986 | Broecker et al. | |
| 4,640,766 A | 2/1987 | Post et al. | |
| 4,710,211 A | 12/1987 | Gazzi et al. | |
| 4,718,927 A | 1/1988 | Bauer et al. | |
| 4,720,293 A | 1/1988 | Rowles et al. | |
| 4,738,904 A | 4/1988 | Ludwig et al. | |
| 4,746,343 A | 5/1988 | Ishizu et al. | |
| 4,758,375 A | 7/1988 | Brophy et al. | |
| 4,782,096 A | 11/1988 | Banquy | |
| 4,846,863 A | 7/1989 | Tomlinson et al. |
| 4,895,584 A | 1/1990 | Buck et al. |
| 4,923,492 A | 5/1990 | Hewitt |
| 4,946,477 A | 8/1990 | Perka et al. |
| 4,952,305 A | 8/1990 | Kummann |
| 4,970,867 A | 11/1990 | Herron et al. |
| 5,015,354 A | 5/1991 | Nishiki et al. |
| 5,028,634 A | 7/1991 | Fiato |
| 5,035,732 A | 7/1991 | McCue, Jr. |
| 5,073,356 A | 12/1991 | Guro et al. |
| 5,102,645 A | 4/1992 | Fisher et al. |
| 5,139,548 A | 8/1992 | Liu et al. |
| 5,141,544 A | 8/1992 | Butts |
| 5,198,310 A | 3/1993 | Fleming et al. |
| 5,227,407 A | 7/1993 | Kim |
| 5,231,835 A | 8/1993 | Beddome et al. |
| 5,257,505 A | 11/1993 | Butts |
| 5,266,176 A | 11/1993 | Muret et al. |
| 5,271,813 A | 12/1993 | Linkous |
| 5,309,720 A | 5/1994 | Johnson et al. |
| 5,344,849 A | 9/1994 | Ayasse |

(Continued)

FOREIGN PATENT DOCUMENTS

DE 2742452 A1 3/1979

(Continued)

OTHER PUBLICATIONS

US Government Accountability Office Report GAO-07-283. "Crude Oil: Uncertainty about Future Oil Supply Makes It Important to Develop a Strategy for Addressing a Peak and Decline in Oil Production". Feb. 2007.

(Continued)

*Primary Examiner* — Jafar Parsa
(74) *Attorney, Agent, or Firm* — Ballard Spahr LLP

(57) ABSTRACT

A process and system for producing hydrocarbon compounds or fuels that recycle products of hydrocarbon compound combustion—carbon dioxide or carbon monoxide, or both, and water. The energy for recycling is electricity derived from preferably not fossil based fuels, like from nuclear fuels or from renewable energy. The process comprises electrolysing water, and then using hydrogen to reduce externally supplied carbon dioxide to carbon monoxide, then using so produced carbon monoxide together with any externally supplied carbon monoxide and hydrogen in Fischer-Tropsch reactors, with upstream upgrading to desired specification fuels—for example, gasoline, jet fuel, kerosene, diesel fuel, and others. Energy released in some of these processes is used by other processes. Using adiabatic temperature changes and isothermal pressure changes for gas processing and separation, large amounts of required energy are internally recycled using electric and heat distribution lines. Phase conversion of working fluid is used in heat distribution lines for increased energy efficiency. The resulting use of electric energy is less than 1.4 times the amount of the high heating value of combustion of so produced hydrocarbon compounds when carbon dioxide is converted to carbon monoxide in the invention, and less than 0.84 when carbon monoxide is the source.

5 Claims, 32 Drawing Sheets

U.S. PATENT DOCUMENTS

| | | |
|---|---|---|
| 5,346,679 A | 9/1994 | Osaki et al. |
| 5,363,655 A | 11/1994 | Kikkawa et al. |
| 5,375,422 A | 12/1994 | Butts |
| 5,409,960 A | 4/1995 | Stark |
| 5,496,530 A | 3/1996 | Vannby et al. |
| 5,498,638 A | 3/1996 | Long |
| 5,506,272 A | 4/1996 | Benham et al. |
| 5,513,600 A | 5/1996 | Teves |
| 5,537,827 A | 7/1996 | Low et al. |
| 5,538,706 A | 7/1996 | Kapoor et al. |
| 5,543,437 A | 8/1996 | Benham et al. |
| 5,588,307 A | 12/1996 | Schmidt |
| 5,613,373 A | 3/1997 | Grenier |
| 5,615,561 A | 4/1997 | Houshmand et al. |
| 5,620,670 A | 4/1997 | Benham et al. |
| 5,621,155 A | 4/1997 | Benham et al. |
| 5,645,613 A | 7/1997 | Benham et al. |
| 5,663,473 A | 9/1997 | Griffiths et al. |
| 5,685,170 A | 11/1997 | Sorensen |
| 5,711,865 A | 1/1998 | Caesar |
| 5,714,657 A | 2/1998 | deVries |
| 5,718,819 A | 2/1998 | Peschka et al. |
| 5,741,440 A | 4/1998 | Cooper et al. |
| 5,770,630 A | 6/1998 | Kowal et al. |
| 5,776,988 A | 7/1998 | Chaumette et al. |
| 5,783,051 A | 7/1998 | Hirai et al. |
| 5,827,902 A | 10/1998 | Maretto et al. |
| 5,890,377 A | 4/1999 | Foglietta |
| 5,953,935 A | 9/1999 | Sorensen |
| 5,968,325 A | 10/1999 | Oloman et al. |
| 5,983,663 A | 11/1999 | Sterner |
| 6,016,665 A | 1/2000 | Cole et al. |
| 6,023,942 A | 2/2000 | Thomas et al. |
| 6,080,290 A | 6/2000 | Stuart et al. |
| 6,090,312 A | 7/2000 | Ziaka et al. |
| 6,094,937 A | 8/2000 | Paurola et al. |
| 6,105,389 A | 8/2000 | Paradowski et al. |
| 6,105,390 A | 8/2000 | Bingham et al. |
| 6,131,407 A | 10/2000 | Wissolik |
| 6,156,809 A | 12/2000 | Clark et al. |
| 6,178,774 B1 | 1/2001 | Billy et al. |
| 6,180,684 B1 | 1/2001 | Halmo et al. |
| 6,187,226 B1 | 2/2001 | Detering et al. |
| 6,192,705 B1 | 2/2001 | Kimble, III |
| 6,211,255 B1 | 4/2001 | Schanke et al. |
| 6,237,365 B1 | 5/2001 | Trebble |
| 6,253,574 B1 | 7/2001 | Stockmann et al. |
| 6,262,131 B1 | 7/2001 | Arcuri et al. |
| 6,265,453 B1 | 7/2001 | Kennedy |
| 6,293,979 B1 | 9/2001 | Choudhary et al. |
| RE37,406 E | 10/2001 | Behrmann et al. |
| 6,306,917 B1 | 10/2001 | Bohn et al. |
| 6,312,658 B1 | 11/2001 | Hufton et al. |
| 6,318,119 B1 | 11/2001 | Fischer et al. |
| 6,319,960 B1 | 11/2001 | Behrmann et al. |
| 6,328,945 B1 | 12/2001 | Hufton et al. |
| 6,363,744 B2 | 4/2002 | Finn et al. |
| 6,367,286 B1 | 4/2002 | Price |
| 6,378,330 B1 | 4/2002 | Minta et al. |
| 6,442,969 B1 | 9/2002 | Rojey et al. |
| 6,458,857 B1 | 10/2002 | Wittenbrink et al. |
| 6,489,370 B2 | 12/2002 | Iijima et al. |
| 6,491,880 B1 | 12/2002 | Wang et al. |
| 6,558,634 B1 | 5/2003 | Wang et al. |
| 6,564,579 B1 | 5/2003 | McCartney |
| 6,581,409 B2 | 6/2003 | Wilding et al. |
| 6,609,393 B2 | 8/2003 | Oakey |
| 6,613,215 B2 | 9/2003 | Molter et al. |
| 6,630,061 B2 | 10/2003 | Lee et al. |
| 6,642,280 B2 | 11/2003 | Sorensen et al. |
| 6,642,281 B1 | 11/2003 | Long et al. |
| 6,658,890 B1 | 12/2003 | Hahn et al. |
| 6,662,589 B1 | 12/2003 | Roberts et al. |
| 6,673,845 B2 | 1/2004 | Price |
| 6,680,044 B1 | 1/2004 | Tonkovich et al. |
| 6,693,138 B2 | 2/2004 | O'Rear |
| 6,696,501 B2 | 2/2004 | Schanke et al. |
| 6,711,903 B1 | 3/2004 | Rich, Jr. |
| 6,713,032 B2 | 3/2004 | Mizobuchi et al. |
| 6,713,519 B2 | 3/2004 | Wang et al. |
| 6,723,756 B2 | 4/2004 | Munson et al. |
| 6,727,289 B2 | 4/2004 | Ionkina et al. |
| 6,733,913 B2 | 5/2004 | Cisar et al. |
| 6,740,436 B2 | 5/2004 | Chou et al. |
| 6,750,258 B2 | 6/2004 | Wang et al. |
| 6,751,985 B2 | 6/2004 | Kimble et al. |
| 6,773,691 B2 | 8/2004 | Ramani et al. |
| 6,774,148 B2 | 8/2004 | O'Rear |
| 6,784,212 B2 | 8/2004 | Steynberg et al. |
| 6,806,296 B2 | 10/2004 | Shiroto et al. |
| 6,806,297 B2 | 10/2004 | Huisman et al. |
| 6,829,906 B2 | 12/2004 | Beam |
| 6,846,404 B2 | 1/2005 | O'Rear |
| 6,858,127 B2 | 2/2005 | Hoek et al. |
| 6,877,318 B2 | 4/2005 | Tadayon et al. |
| 6,890,419 B2 | 5/2005 | Reichman et al. |
| 6,900,248 B2 | 5/2005 | Minkkinen et al. |
| 6,914,082 B2 | 7/2005 | Zhang et al. |
| 6,921,778 B2 | 7/2005 | Minkkinen et al. |
| 6,931,889 B1 | 8/2005 | Foglietta et al. |
| 6,933,323 B2 | 8/2005 | O'Rear et al. |
| 6,939,449 B2 | 9/2005 | Streckert et al. |
| 6,946,493 B2 | 9/2005 | Mohedas et al. |
| 6,962,061 B2 | 11/2005 | Wilding et al. |
| 6,977,120 B2 | 12/2005 | Chou et al. |
| 6,982,287 B2 | 1/2006 | Wang et al. |
| 6,986,266 B2 | 1/2006 | Narinsky |
| 6,992,113 B2 | 1/2006 | O'Rear et al. |
| 6,992,114 B2 | 1/2006 | O'Rear et al. |
| 7,302,903 B1 | 12/2007 | Behrens |
| 7,642,292 B2 * | 1/2010 | Severinsky .................. 518/700 |
| 7,863,340 B2 * | 1/2011 | Severinsky .................. 518/700 |
| 2001/0044476 A1 | 11/2001 | Kennedy |
| 2002/0025457 A1 | 2/2002 | Dodd et al. |
| 2002/0155061 A1 | 10/2002 | Prasad et al. |
| 2003/0018086 A1 | 1/2003 | Price |
| 2003/0027875 A1 | 2/2003 | Zhang et al. |
| 2003/0162846 A1 | 8/2003 | Wang et al. |
| 2003/0223925 A1 | 12/2003 | Rostrup-Nielsen et al. |
| 2004/0014825 A1 | 1/2004 | Hensman |
| 2004/0192792 A1 | 9/2004 | Espinoza et al. |
| 2004/0192989 A1 | 9/2004 | Espinoza et al. |
| 2005/0049317 A1 | 3/2005 | Raje et al. |
| 2005/0089465 A1 | 4/2005 | Anumakonda et al. |
| 2006/0053792 A1 | 3/2006 | Bourgeois |

FOREIGN PATENT DOCUMENTS

| | | |
|---|---|---|
| DE | 19522083 A1 | 10/1996 |
| DE | 19634111 A1 | 2/1998 |
| DE | 19956560 A1 | 6/2001 |
| DE | 20320020 U1 | 5/2004 |
| EP | 737648 A2 | 10/1996 |
| JP | 61066790 A | 4/1986 |
| JP | 06-158058 A | 6/1994 |
| JP | 2000-104078 A | 4/2000 |
| JP | 2002-537275 A | 11/2002 |
| JP | 2003-507161 A | 2/2003 |
| JP | 2003-507176 A | 2/2003 |
| JP | 2003-524679 A | 8/2003 |
| JP | 2005-530849 A | 10/2005 |

OTHER PUBLICATIONS

Report by SANDIA Labs of the US DoE, "SANDIA gets Fuel from Thin Air (Sunshine to Petrol Project) CO2 to CO to H2 to Petrol". Dec. 9, 2007.

Bullis, Kevin. "Making Gasoline from Carbon Dioxide". MIT Technology Review, Apr. 25, 2007.

English translation of Application Papers Laid Open for German Patent DE 195 22 083, publication date Oct. 2, 1996, Dr. Manfred Schonberg, Applicant.

Yakobson, D.L., "Energy for the New Millenium," Rentech, Inc., Slide Presentation for Gas-to-Liquids Howard Weil 2001 Annual Energy Conference, New Orleans, LA, Mar. 25-29, 2001.

Da Prato, P.L. et al, "Selection of optimum technology for CO rich syngas", Air Products and Chemicals, Inc., Hydrocarbon Engineering, Sep./Oct. 1996.

Gundarson, H.H. et al., "Produce CO-rich synthesis gas," Air Products and Chemicals, Inc., Hydrocarbon Processing, Apr. 1999, pp. 87-93.
Green Car Congress, Technologies, issues and policies for sustainable mobility, Green Car Congress: Gas-to-Liquids, Jul.-Oct. 2004, Google GCC, retrieved on Oct. 30, 2004 from www.greencarcongress.com/gastoliquids/index.html.
US Defense Logistivs Agency, Defense Energy Support Center. "Synthetic Fuels Tutorial", Mar. 2007.
Jensen, S.H. et al, "Perspectives of High Temperature Electrolysis Using SOEC," Materials Research Department, Rise National Laboratory, Denmark, pp. 1-10, World Energy Congress 2004, Sydney (AU), Sep. 5-9, 2004.
Certificate of Correction issued on Dec. 28, 2010 for U.S. Patent No. 7,642,292 (Inventor—Severinsky).
Request for Certificate of Correction filed on Nov. 3, 2010 for U.S. Patent No. 7,642,292 (Inventor—Severinsky).
Issue Notification issued on Dec. 16, 2009 for U.S. Appl. No. 11/276,850, filed Mar. 16, 2006 (Inventor—Severinsky).
Notice of Allowance issued on Oct. 30, 2009 for U.S. Appl. No. 11/276,850, filed Mar. 16, 2006 (Inventor—Severinsky).
Request for Continued Examination filed on Oct. 19, 2009 for U.S. Appl. No. 11/276,850, filed Mar. 16, 2006 (Inventor—Severinsky).
Notice of Allowance issued on Sep. 18, 2009 for U.S. Appl. No. 11/276,850, filed Mar. 16, 2006 (Inventor—Severinsky).
Response after Non-Final Rejection filed on Jul. 22, 2009 for U.S. Appl. No. 11/276,850, filed Mar. 16, 2006 (Inventor—Severinsky).
Non-Final Rejection issued on Jan. 26, 2009 for U.S. Appl. No. 11/276,850, filed Mar. 16, 2006 (Inventor—Severinsky).
Response to Election/Restriction filed on Oct. 8, 2008 for U.S. Appl. No. 11/276,850, filed Mar. 16, 2006 (Inventor—Severinsky).
Requirement for Restriction/Election issued on Aug. 8, 2008 for U.S. Appl. No. 11/276,850, filed Mar. 16, 2006 (Inventor—Severinsky).
Response to Election/Restriction filed on Apr. 3, 2008 for U.S. Appl. No. 11/276,850, filed Mar. 16, 2006 (Inventor—Severinsky).
Examiner Interview Summary Record issued on Nov. 28, 2007 for U.S. Appl. No. 11/276,850, filed Mar. 16, 2006 (Inventor—Severinsky).
Requirement for Restriction/Election issued on Oct. 3, 2007 for U.S. Appl. No. 11/276,850, filed Mar. 16, 2006 (Inventor—Severinsky).
Issue Notification issued on Dec. 15, 2010 for U.S. Appl. No. 12/647,121, filed Dec. 24, 2009 (Inventor—Severinsky).
Amendment after Notice of Allowance (Rule 312) filed on Nov. 3, 2010 for U.S. Appl. No. 12/647,121, filed Dec. 24, 2009 (Inventor—Severinsky).
Notice of Allowance issued on Aug. 5, 2010 for U.S. Appl. No. 12/647,121, filed Dec. 24, 2009 (Inventor—Severinsky).
Response after Non-Final Rejection filed on Jul. 26, 2010 for U.S. Appl. No. 12/647,121, filed Dec. 24, 2009 (Inventor—Severinsky).
Non-Final Rejection issued on Apr. 27, 2010 for U.S. Appl. No. 12/647,121, filed Dec. 24, 2009 (Inventor—Severinsky).
Preliminary Amendment filed on Dec. 24, 2009 for U.S. Appl. No. 12/647,121, filed Dec. 24, 2009 (Inventor—Severinsky).
Non-Final Rejection issued on Jan. 18, 2011 for U.S. Appl. No. 12/647,178, filed Dec. 24, 2009 (Inventor—Severinsky).
Preliminary Amendment filed on Dec. 24, 2009 for U.S. Appl. No. 12/647,178, filed Dec. 24, 2009 (Inventor—Severinsky).
Preliminary Amendment filed on Nov. 3, 2010 for U.S. Appl. No. 12/938,900, filed Nov. 3, 2010 (Inventor—Severinsky).
International Search Report issued on Aug. 18, 2006 for Intl. App. No. PCT/US06/009710 filed Mar. 16, 2006 (Inventor—Severinsky).
Written Opinion issued on Aug. 18, 2006 for Intl. App. No. PCT/US06/009710 filed Mar. 16, 2006 (Inventor—Severinsky).
Response to Written Opinion dated Aug. 18, 2006 filed on Nov. 16, 2006 for Intl. App. No. PCT/US06/009710 filed Mar. 16, 2006 (Inventor—Severinsky).
Written Opinion issued on Apr. 5, 2007 for Intl. App. No. PCT/US06/009710 filed Mar. 16, 2006 (Inventor—Severinsky).
Response to Second Written Opinion dated Apr. 5, 2007 filed on Nov. 16, 2006 for Intl. App. No. PCT/US06/009710 filed Mar. 16, 2006 (Inventor—Severinsky).
International Preliminary Report on Patentability issued on Jul. 3, 2007 for Intl. App. No. PCT/US06/009710 filed Mar. 16, 2006 (Inventor—Severinsky).
Result of consultation issued on Jun. 13, 2011 for EP App. No. 06738735.7, which claims priority to Intl. App. No. PCT/US06/009710 filed Mar. 16, 2006 (Inventor—Severinsky).
Reply to Communciation from Examining Division filed on Apr. 26, 2011 for EP App. No. 06738735.7, which claims priority to Intl. App. No. PCT/US06/009710 filed Mar. 16, 2006 (Inventor—Severinsky).
Result of consultation issued on Mar. 23, 2011 for EP App. No. 06738735.7, which claims priority to Intl. App. No. PCT/US06/009710 filed Mar. 16, 2006 (Inventor—Severinsky).
Communication from Examining Division issued on Mar. 10, 2011 for EP App. No. 06738735.7, which claims priority to Intl. App. No. PCT/US06/009710 filed Mar. 16, 2006 (Inventor—Severinsky).
Request for correction of text proposed for grant filed on Nov. 26, 2010 for EP App. No. 06738735.7, which claims priority to Intl. App. No. PCT/US06/009710 filed Mar. 16, 2006 (Inventor—Severinsky).
Communication from Examining Division issued on Aug. 27, 2010 for EP App. No. 06738735.7, which claims priority to Intl. App. No. PCT/US06/009710 filed Mar. 16, 2006 (Inventor—Severinsky).
Minutes of oral proceedings issued on Aug. 20, 2010 for EP App. No. 06738735.7, which claims priority to Intl. App. No. PCT/US06/009710 filed Mar. 16, 2006 (Inventor—Severinsky).
Written submissions in preparation to oral proceedings filed on Jul. 7, 2010 for EP App. No. 06738735.7, which claims priority to Intl. App. No. PCT/US06/009710 filed Mar. 16, 2006 (Inventor—Severinsky).
Written submissions in preparation to oral proceedings filed on Jun. 2, 2010 for EP App. No. 06738735.7, which claims priority to Intl. App. No. PCT/US06/009710 filed Mar. 16, 2006 (Inventor—Severinsky).
Summons to attend oral proceedings issued on Mar. 15, 2010 for EP App. No. 06738735.7, which claims priority to Intl. App. No. PCT/US06/009710 filed Mar. 16, 2006 (Inventor—Severinsky).
Reply to Communciation from Examining Division filed on Sep. 23, 2009 for EP App. No. 06738735.7, which claims priority to Intl. App. No. PCT/US06/009710 filed Mar. 16, 2006 (Inventor—Severinsky).
Communication for Examining Division issued on Mar. 26, 2008 for EP App. No. 06738735.7, which claims priority to Intl. App. No. PCT/US06/009710 filed Mar. 16, 2006 (Inventor—Severinsky).
Reply to Communicarion from Examining Division filed on Feb. 26, 2008 for EP App. No. 06738735.7, which claims priority to Intl. App. No. PCT/US06/009710 filed Mar. 16, 2006 (Inventor—Severinsky).
Communication for Examining Division issued on Feb. 11, 2008 for EP App. No. 06738735.7, which claims priority to Intl. App. No. PCT/US06/009710 filed Mar. 16, 2006 (Inventor—Severinsky).
Preliminary Amendment filed on Sep. 14, 2007 for EP App. No. 06738735.7, which claims priority to Intl. App. No. PCT/US06/009710 filed Mar. 16, 2006 (Inventor—Severinsky).
Official Action issued on Apr. 21, 2009 for RU App. No. 2007138221, which claims priority to Intl. App. No. PCT/US06/009710 filed Mar. 16, 2006 (Inventor—Severinsky).
Response to Official Action filed on Dec. 24, 2009 for RU App. No. 2007138221, which claims priority to Intl. App. No. PCT/US06/009710 filed Mar. 16, 2006 (Inventor—Severinsky).
Decision to Grant issued on Feb. 8, 2010 for RU App. No. 2007138221, which claims priority to Intl. App. No. PCT/US06/009710 filed Mar. 16, 2006 (Inventor—Severinsky).
Voluntary Amendments filed on Mar. 16, 2010 for RU App. No. 2007138221, which claims priority to Intl. App. No. PCT/US06/009710 filed Mar. 16, 2006 (Inventor—Severinsky).
Preliminary Amendments filed on Apr. 6, 2010 for RU App. No. 2010111716, which claims priority to Intl. App. No. PCT/US06/009710 filed Mar. 16, 2006 (Inventor—Severinsky).
Official Action issued on Apr. 5, 2011 for RU App. No. 2010111716, which claims priority to Intl. App. No. PCT/US06/009710 filed Mar. 16, 2006 (Inventor—Severinsky).
Amendments filed on Mar. 17, 2010 for SG App. No. 200706760-6, which claims priority to Intl. App. No. PCT/US06/009710 filed Mar. 16, 2006 (Inventor—Severinsky).
Certificate of Grant issued on Aug. 31, 2010 for SG App. No. 200706760-6, which claims priority to Intl. App. No. PCT/US06/009710 filed Mar. 16, 2006 (Inventor—Severinsky).

Office Action issued on Jun. 2, 2010 for Canadian Pat. App. No. 2,601,445, which claims priority to Intl. App. No. PCT/US06/009710 filed Mar. 16, 2006 (Inventor—Severinsky).

Response to Office Action filed on Nov. 26, 2010 for Canadian Pat. App. No. 2,601,445, which claims priority to Intl. App. No. PCT/US06/009710 filed Mar. 16, 2006 (Inventor—Severinsky).

Office Action issued on Apr. 14, 2011 for Canadian Pat. App. No. 2,601,445, which claims priority to Intl. App. No. PCT/US06/009710 filed Mar. 16, 2006 (Inventor—Severinsky).

First Examination Report issued on Feb. 24, 2011 for IN Pat. App. No. 3520/KOLNP/2007, which claims priority to Intl. Appl. No. PCT/US06/009710 filed Mar. 16, 2006 (Inventor—Severinsky).

Response to First Office Action filed on Mar. 3, 2011 for CN Pat. App. No. 200680012464.8, which claims priority to Intl. App. No. PCT/US06/009710 filed Mar. 16, 2006 (Inventor—Severinsky).

First Office Action issued on Aug. 19, 2010 for CN Pat. App. No. 200680012464.8, which claims priority to Intl. App. No. PCT/US06/009710 filed Mar. 16, 2006 (Inventor—Severinsky).

Preliminary Amendment filed on Mar. 12, 2009 for JP App. No. 2008502096, which claims priority to Intl. App. No. PCT/US06/009710 filed Mar. 16, 2006 (Inventor—Severinsky).

Voluntary Amendment filed on Mar. 15, 2010 for KR Pat. App. No. 2007-7023519, which claims priority to Intl. App. No. PCT/US06/009710 filed Mar. 16, 2006 (Inventor—Severinsky).

Response to Office Action filed by Applicant on Oct. 14, 2011 for Canadian Pat. App. No. 2,601,445, which is national phase of Intl. App. No. PCT/US06/009710 filed Mar. 16, 2006 (Inventor—Severinsky; pp. 1-16).

Intention to grant European Patent issued by European Patent Office on Oct. 4, 2011 for EP App. No. 06738735.7, which is national phase of Intl. App. No. PCT/US06/009710 filed Mar. 16, 2006 (Inventor—Severinsky; pp. 1-7).

Notice of Allowance issued by USPTO on Aug. 26, 2011 for U.S. Appl. No. 12/938,900, filed Nov. 3, 2010 (Inventor—Severinsky; pp. 1-9).

Response after Non-Final Office Action filed by Applicant on Sep. 26, 2011 for U.S. Appl. No. 12/939,724, filed Nov. 4, 2010 (Inventor—Severinsky; pp. 1-9).

Notice of Allowance issued by USPTO on Sep. 16, 2011 for U.S. Appl. No. 12/938,890, filed Nov. 3, 2010 (Inventor—Severinsky; pp. 1-5).

Supplemental Response/Terminal Disclaimer filed by Applicant on Sep. 1, 2011 for U.S. Appl. No. 12/938,890, filed Nov. 3, 2010 (Inventor—Severinsky; pp. 1-6).

Supplemental Response/Terminal Disclaimer filed by Applicant on Aug. 31, 2011 for U.S. Appl. No. 12/938,890, filed Nov. 3, 2010 (Inventor—Severinsky; pp. 1-7).

Response after Non-Final Office Action/Terminal Disclaimer filed by Applicant on Sep. 1, 2011 for U.S. Appl. No. 12/938,890, filed Nov. 3, 2010 (Inventor—Severinsky; pp. 1-7).

Non-Final Office Action issued on Apr. 27, 2011 for U.S. Appl. No. 12/938,890, filed Nov. 3, 2010 (Inventor—Severinsky; pp. 1-5).

Response to Election/Restriction Requirement filed on Feb. 18, 2011 for U.S. Appl. No. 12/938,890, filed Nov. 3, 2010 (Inventor—Severinsky; pp. 1-5).

Requirement for Restriction/Election issued on Jan. 19, 2011 for U.S. Appl. No. 12/938,890, filed Nov. 3, 2010 (Inventor—Severinsky; pp. 1-5).

Preliminary Amendment filed on Nov. 3, 2010 for U.S. Appl. No. 12/938,890, filed Nov. 3, 2010 (Inventor—Severinsky; pp. 1-9).

* cited by examiner

SYSTEMS, METHODS, AND COMPOSITIONS FOR PRODUCTION OF SYNTHETIC HYDROCARBON COMPOUNDS

RELATED US APPLICATION DATA

This application is a continuation application of copending U.S. patent application Ser. No. 12/647,121, filed Dec. 24, 2009, which is a continuation application of U.S. patent application Ser. No. 11/276,850, now U.S. Pat. No. 7,642,292, filed Mar. 16, 2006, which claims the benefit of U.S. Provisional Application Ser. No. 60/661,923, filed Mar. 16, 2005, and U.S. Provisional Application Ser. No. 60/678,174, filed May 6, 2005. Each of the aforementioned applications is hereby incorporated herein by reference in its entirety.

FIELD OF THE INVENTION

This invention relates generally to the field of hydrocarbon compound production and, more specifically, to energy efficient processes and systems that produce hydrocarbon compound fuels. In a preferred embodiment, the invention relates to an apparatus and a method to convert electric energy into hydrocarbon compound fuels, such as gasoline, kerosene, jet fuel and diesel fuel, among others, and which are produced by recycling products of combustion—carbon dioxide and water.

BACKGROUND OF THE INVENTION

Although the idea for developing synthetic hydrocarbon fuels has been discussed for at least the last 30 years, there has not been a need to produce them because of the availability, ease of production, transportation, and processing of fossil fuels. However, the worldwide fossil fuel market is changing due to a number of factors, including steadily increasing worldwide energy demand, increasing concentration of production in oil producing regions, and increasing emphasis in oil dependant countries on the importance of energy supply.

There are several disadvantages to using fossil fuels. First, there is a finite amount of fossil fuels available which, once used, cannot be regenerated. Additionally, hydrocarbon fuels made from fossil fuels may contain highly undesirable sulfur, nitrogen, and aromatic compounds. When these fuels are burned, sulfur, nitrogen, and particulates are released into the air, which leads to the formation of acid rain and smog. More recently, concern has focused on the impact of carbon dioxide emissions from fossil fuel combustion as a contributor to global warming.

There are several well-established processes for direct hydrogenation of gases such as carbon monoxide or carbon dioxide to produce hydrocarbon fuels. One of the most successful was developed in Germany in the 1920s by Franz Fischer and Hans Tropsch.

In 1938, early German plants produced approximately 5 million barrels per year of diesel oil and gasoline using the Fischer-Tropsch process, which reacts carbon monoxide and hydrogen over a catalyst to produce liquid hydrocarbons and water. The problem with this and other methods is that they use fossil fuels such as coal or natural gas to produce the carbon monoxide. The use of such fossil fuels as the primary feedstock is accompanied by many of the same drawbacks as the production of fossil fuels such as finite supply and emissions.

Therefore, it can be seen that there is a long-felt need for a production system that recycles the products of combustion into hydrocarbon compound fuels. It is to such a system and processes for making hydrocarbon compounds that the present invention is primarily directed, with emphasis on energy efficiency.

SUMMARY OF THE INVENTION

The present invention comprises systems, methods and compositions for the production of synthetic hydrocarbon compounds, particularly hydrocarbon compounds that can be used as fuels. In general, species of carbon oxides, carbon monoxide or carbon dioxide, are converted into one or more hydrocarbon compounds, comprising carbon and hydrogen, including but not limited to diesel fuel, gasoline, jet fuels, liquefied petroleum gas, or compounds found in natural gas. A particular process comprises forming, with electricity, a hydrogen stream, and in the presence of at least a portion of the hydrogen from the hydrogen stream, converting at least a portion of the carbon monoxide present in a carbon monoxide stream, into a hydrocarbon compound.

In a preferred embodiment of the system with a carbon dioxide input, the amount of input electric energy needed to convert carbon dioxide into high heating value of output hydrocarbon compounds combustion energy is in a range of between 1.4 and 1.1. In another preferred embodiment of the system with a carbon monoxide input (thus eliminating the need to convert carbon dioxide to carbon monoxide), the external electric energy needed to convert carbon monoxide is between 0.64 and 0.84 of the high heating value of hydrocarbon compounds. That is, in an embodiment of the present invention using carbon dioxide as an input, more electric energy will be required than the high heating value of combustion of hydrocarbon compounds produced. In another embodiment of the present invention, using carbon monoxide as an input, less electric energy will be required than the high heating value of combustion of hydrocarbon compounds produced.

According to an aspect of the present invention, it is possible to produce within one plant on the order of five hundred thousand gallons of fuel per day, or even more, in case sufficient electric energy, carbon monoxide and/or carbon dioxide are available.

One aspect of the invention comprises systems and methods comprising an electrolyser and a Fisher-Tropsch reactor, and in some embodiments, also a reverse water gas shift reactor, for producing hydrocarbon compounds. The present invention comprises methods and systems for producing hydrocarbon compounds comprising converting at least a portion of one of the species of carbon oxide, including but not limited to carbon monoxide, into hydrocarbon compounds, via a Fischer-Tropsch process in the presence of at least a portion of the hydrogen stream; and transferring at least a portion of excess heat from the Fischer-Tropsch process to one of the other process steps in the method or system, to a portion of a method or system requiring energy, or one of the other units in the system, for example, to an electrolyser or a reverse water gas shift reactor.

In the present invention, there are numerous places where certain gases must be separated from a gas mixture, or for example, gas parameters such as temperature and pressure, must be changed to make one or both compatible with an upstream or downstream process. These separations or changes to gases in the invention consume large amounts of energy. It is a novel aspect of the invention that energy can be transferred within the invention to meet the energy needs for gas separations and changes.

One advantage of the present invention is its energy efficient gas processing. There are generally two energy efficient thermodynamic processes used for gas processing. The first one is an adiabatic process when all external work is converted to or from gas energy. The second one is an isothermal process, when all external work is either converted into heat or derived from heat. By recycling external work through an electrical distribution line and heat through several heat distribution lines, energy losses in gas processing are substantially reduced. This is also assisted by use of phase conversion of working fluids in heat distribution lines to accept or deliver heat energy.

The present invention comprises systems and methods that provide the ability to produce a variety of hydrocarbon compounds, such as compounds for different fuels and a degree of control in producing one or more specific types of hydrocarbon fuels that is not found with currently available methods for making synthetic fuels. These and other objects, features and advantages of the present invention will become more apparent upon reading the following specification in conjunction with the accompanying figures.

DETAILED DESCRIPTION

Figure 1:
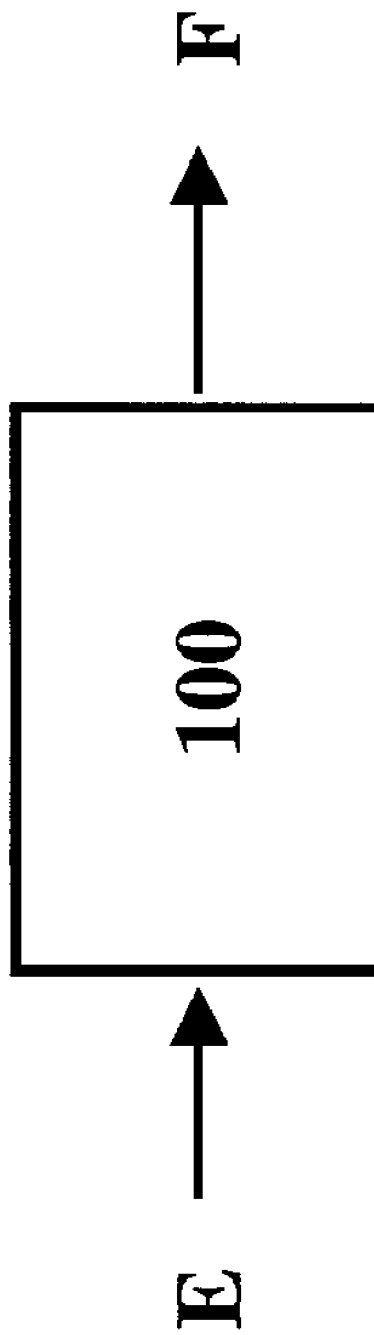
FIGS. 1-4 illustrate general, high-level systems of the present invention, according to preferred embodiments.

The present invention comprises systems, methods and compositions for making hydrocarbon compounds. Complete combustion of hydrocarbon fuels like coal, natural gas, liquid petroleum gas, ethanol, methanol, gasoline, kerosene, diesel fuel, and other known fuels primarily results in two basic substances—carbon dioxide and water. When burning such fuels, the main reaction is as follows:

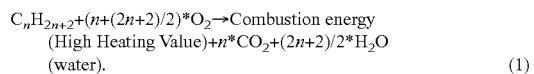
$$C_nH_{2n+2}+(n+(2n+2)/2)*O_2 \rightarrow \text{Combustion energy (High Heating Value)}+n*CO_2+(2n+2)/2*H_2O \text{ (water)}. \quad (1)$$

For example, for an average value of n=10, 10% more moles of water is produced than carbon dioxide. The number of oxygen moles used is equal to a sum of one mole for oxidizing carbon and a half of a mole plus 10% to oxidize hydrogen, 1.55 moles in total. As used herein, "High Heating Value" (HHV) is the amount of heat produced by the complete combustion of a unit quantity of fuel when all products of the combustion are cooled down to the temperature before the combustion and the water vapor formed during combustion is condensed.

In the invention described herein, the products of combustion, carbon oxides and hydrogen are recombined into hydrocarbon compounds, such as transportation fuels, including but not limited to, diesel and gasoline. It is also possible to recombine them into other compounds and compositions such as natural gas or liquefied petroleum gas. As used herein, hydrocarbon compounds include hydrocarbon compounds that may be used as an energy source such as fuels.

Hydrocarbon compounds may be produced using a Fischer-Tropsch process. In this part of this process and system, carbon monoxide (CO) and hydrogen are ideally reacted as follows:

$$CO+2H_2 \rightarrow (-CH_2-)+H_2O \quad (2)$$

wherein (—CH$_2$—) is a building block for polymerization into longer carbon chains. The primary products of this polymerization are linear paraffins, $C_nH_{2n}$, plus two hydrogen atoms to complete any chain at the ends. In this reaction, one hydrogen molecule is used for formation of hydrocarbons, plus approximately 10% for completing chains at the ends, and another hydrogen molecule is used to reduce carbon monoxide to carbon.

There are a variety of processes to produce carbon monoxide from carbon dioxide. One method for this is a chemical process called reverse water-gas shift reaction (RWGS). This reaction is as follows:

$$CO_2 + H_2 \Leftrightarrow CO + H_2O \tag{3}$$

In this reaction a hydrogen molecule is needed to reduce carbon dioxide to carbon monoxide.

For the reactions shown here, a ratio of 1.1+1+1=3.1 hydrogen moles per one carbon dioxide mole is used to produce hydrocarbon compounds. If water is to serve as the source of the hydrogen, the calculation may be as follows:

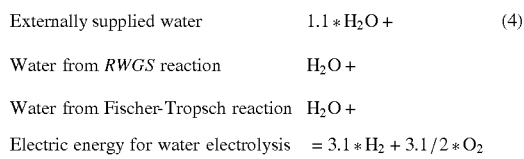

| | | |
|---|---|---|
| Externally supplied water | $1.1 * H_2O +$ | (4) |
| Water from RWGS reaction | $H_2O +$ | |
| Water from Fischer-Tropsch reaction | $H_2O +$ | |
| Electric energy for water electrolysis | $= 3.1 * H_2 + 3.1/2 * O_2$ | |

In an ideal situation, the amount of oxygen released is the same amount as was consumed in combustion thereby completing the recycling process. In the methods and systems taught herein, all or a portion of the water used can be from outside sources as well. A variety of processes may be used to produce hydrogen from water, for example, electrolysis of water may be used to produce hydrogen, photosynthesis may be used to produce hydrogen, as well as the heating of water to produce hydrogen. Water electrolysis is selected in the preferred embodiment while other methods of producing hydrogen are known to those skilled in the art and may be contemplated by the present invention.

One aspect of the invention comprises systems and methods comprising preferably an electrolyser, a reverse water gas shift reactor, and a Fisher-Tropsch reactor for producing hydrocarbon compounds. The present invention comprises methods and systems for producing hydrocarbon compounds comprising converting at least a portion of one of the species of carbon oxide, including but not limited to carbon monoxide, into one or more hydrocarbon compounds, via a Fischer-Tropsch process in the presence of at least a portion of a hydrogen stream; and transferring at least a portion of excess thermal energy from the Fischer-Tropsch process to one of the other process steps in the method requiring energy, or one of the other units in the system, for example, to an electrolyser or a reverse water gas shift reactor.

An electrolyser may be used to separate water into a hydrogen gas stream and a stream of oxygen gas.

The process may further comprise the conversion of a species of carbon oxide, including carbon dioxide. This step of converting one or more species of carbon oxide may comprise converting carbon dioxide in a reverse water gas shift (RWGS) process. The conversion of $CO_2$ takes place in the presence of hydrogen, and hydrogen may be provided by at least a portion of the hydrogen from the hydrogen stream from the electrolyser. Conversion of carbon dioxide to carbon monoxide may be accomplished by any methods known to those skilled in the art and such methods are contemplated by the present invention.

The carbon monoxide stream for the present invention may be provided from any source, for example, a source may be a stream of carbon monoxide from a source separate from and outside the present invention. A second source of carbon monoxide is as a portion of the effluent stream from the optional reaction process converting carbon dioxide to, among other species, carbon monoxide. The carbon dioxide stream for this process may come from a source such as carbon dioxide waste from a source outside the present invention.

The effluent from the Fischer-Tropsch process may undergo an upgrading process, upgrading the spectrum of hydrocarbons into the hydrocarbon compositions desired, such as various liquid fuels. As used herein, "upgrading", "post-processing" and "refining" or "upgrade" "post-process", and "refine" are used interchangeably and mean to separate, isolate, purify or in some manner differentiate by chemical or physical characteristics the various hydrocarbon compounds present from the synthesis reaction in the Fischer-Tropsch reactor, for example, fractionize, and convert the compounds into usable products or feedstock for other processes. Examples of conversion processes include, but are not limited to, oligomerisation, hydrocracking, isomerisation, aromatization, hydrogenation, hydroisomerisation, and alkylation.

As used herein, "$C_3$ compound" means a compound having three carbon atoms. For example, propane would be a $C_3$ hydrocarbon compound.

As used herein, "$C_4$ compound" means a compound having four carbon atoms. For example, butane would be a $C_4$ hydrocarbon compound.

As used herein, "$C_{5+}$ compound" means compounds having five or more carbon atoms. For example, hexane, octane, and compounds such as benzene would be a $C_{5+}$ hydrocarbon compound.

In an embodiment of the present invention, systems and methods to produce hydrocarbon compounds from the products of fuel combustion (carbon oxides) are described, and comprise providing an amount of electricity, such as electricity from a nuclear reactor, to a plant using a portion of the amount of the electricity to form a hydrogen stream from water; and reacting at least a portion of the products of fuel combustion, carbon dioxide and carbon monoxide, in the presence of at least a portion of the hydrogen from the hydrogen stream to form hydrocarbon compounds; wherein use of electric energy is minimized by recycling energies consumed and released in various processes.

In a preferred embodiment, the methods and systems of the present invention convert the input electric energy into the high heating value of output hydrocarbon compounds combustion energy in a range of between 1.4 and 1.1, when carbon dioxide is used as a carbon oxide in the methods and systems, and between 0.64 and 0.84 when carbon monoxide is the carbon oxide in the methods and systems, or without conversion of carbon dioxide to carbon monoxide.

In an embodiment of the present invention, electricity is used for the conversion of carbon dioxide and/or carbon monoxide and water into hydrocarbon compounds comprising carbon and hydrogen, wherein a water electrolyser is used to supply hydrogen to the conversion process. The carbon dioxide may be externally supplied to the process, and converted to carbon monoxide for further use in the methods and systems of the present invention. The carbon monoxide may also be externally supplied to the process, and a mixture of carbon oxides can be supplied as well.

The systems, methods and plants of the present invention may incorporate a number of subsystems, each aiding in the overall efficiency and productivity of the entire process, system or plant. For example, the invention may incorporate a source of electric energy, an electrolyser, a RWGS reactor, an FT reactor, and a post-processing plant.

In an embodiment of the present invention, there is a source of electric energy generated from the heat of a nuclear reactor. An example is a fast breeder reactor. This reactor may be setup once with reprocessed nuclear waste, and then its nuclear core may be reprocessed at a reprocessing plant. This has the advantage of extending the energy output from the world's uranium reserves on the order of 25 fold or so. At typical re-processing intervals of five years, there is plenty of initial fuel to power the present invention until the end of the physical plants' useful life. Alternatively, the energy may be provided by nuclear reactor waste heat conversion, a thermochemical process, or other sources, including fossil fuel free electricity, such as hydro, solar, ocean waves, wind, tides or currents, and combinations of any of these sources.

Electric energy may be used to electrolyse water to create hydrogen and oxygen. In some embodiments, the electrolyser may need a substantial amount of heat for operation. This heat, together with water for the operation, may be supplied by steam generated elsewhere in the plant.

While hydrogen may be produced by conventional electrolysis of water using electrodes, other methods can be employed, including the thermolysis of water (for example using waste heat from nuclear reactors), thermochemical processes, and combinations of these methods. Oxygen produced in the electrolyser may be put to uses outside of the plant.

The process of electrolysing water for the production of hydrogen preferably includes an electrolyser comprising bipolar electrodes and a cell average operating temperature over 100° C., or over 130° C., wherein cell internal pressures are over 10 bar, or over 20 bar. Other embodiments include that the electric current density is over 3,000 A/m$^2$, that a stack of cells is used with voltages over 60 V, and/or that AC-to-DC voltage rectifiers are used, with an output voltage ripple less than 3%.

There are numerous uses in the plant for the hydrogen produced in the electrolyser. Among them, hydrogen and carbon dioxide can be used together in the RWGS reactor to produce syngas, a mixture of carbon monoxide and hydrogen.

A source of carbon dioxide for the present process is a plant emitting carbon oxides, such carbon dioxide or carbon monoxide as a byproduct, especially a plant that is required to reduce its carbon oxide emissions. Examples of such a plant include a blast furnace used to produce steel, and fossil fuel power plants using coal or gas to produce electricity. Carbon dioxide, carbon monoxide or carbon oxides or a mixture may be provided by any method, including but not limited to, externally provided from any source.

A method of converting carbon dioxide to carbon monoxide is through the use of a RWGS reactor. An aspect of the invention comprises methods and systems wherein carbon dioxide and hydrogen are supplied to a RWGS reactor, and there is a substantially complete conversion of carbon dioxide to carbon monoxide, for example, a conversion of over 70%, more preferably over 80%, and more preferably still, over 90%. The output or effluent stream of the RWGS reactor comprises carbon monoxide and hydrogen in a $H_2$/CO ratio of between zero and three. Further, there are included means of separation of a portion of carbon dioxide on the output, and recycling of the carbon dioxide to the input. Other preferred embodiments may include that the operating temperature is between 350-500° C., that there is provided steam separation by condensation, and that more than one reactor can be sequential, serially connected. An embodiment may comprise intermediate separation of steam between serially connected RWGS reactors.

As a byproduct of the RWGS reactor operation, water is produced that may be used to feed an electrolyser.

A syngas effluent, which is generally a mixture of carbon monoxide and hydrogen and some residual carbon dioxide, is fed from a RWGS reactor to an FT reactor. Additional hydrogen may be added to the syngas, or to carbon monoxide, as required for the desired output of an FT reactor. It is also possible to use carbon monoxide, such as waste carbon monoxide from existing industrial processes, and combine this carbon monoxide with hydrogen instead of, or in addition to, the syngas stream produced by the RWGS reactor. Aspects of a plant of the present invention include methods that use carbon monoxide without the need for the intermediate step of converting carbon dioxide to carbon monoxide, thereby bypassing the RWGS process.

An FT unit of the present invention, which may include more than one FT reactors, primarily provides conversion of carbon monoxide and hydrogen to hydrocarbon compounds, at rates that are desirable, for example, a conversion of over 70%, more preferably over 80%, and more preferably still, over 90%. In the present invention, the methods and systems provide that the reaction heat removal is at substantially isothermal conditions. Additionally, the hydrogen supply is controlled, for example, for minimum production of methane and ethane. Other embodiments include that steam and gaseous hydrocarbon output separation using condensation caused by change of both temperature and pressure are provided, and that more than one FT reactor may be sequential or serially connected or having more than one reactor operating at substantially different temperatures and associated operating conditions.

The catalyst for the FT reaction can be a metal such as iron, cobalt, nickel, and combinations thereof; a metal oxide such as iron oxide, cobalt oxide, nickel oxide, ruthenium oxide, and combinations thereof; support-type material such as alumina or zeolites; supported metals, mixed metals, metal oxides, mixed metal oxides; and combinations of these catalysts, and others known to those skilled in the art.

The main output of the FT reactor is a mixture of hydrocarbon compounds with a byproduct of water that can have a variety of uses such as being fed to the electrolyser. The FT reaction is highly exothermic, and the heat can be used in a variety of ways. For example, at least a portion of the heat can be removed by a water stream being converted to steam with that steam then being fed to the electrolyser if required.

The mixture of hydrocarbon compounds exiting an FT reactor may be fed to a post-processing plant that can be similar, or in many ways simpler, than existing hydrocarbon fuel refineries as no removal of sulfur or nitrogen compounds is required. Some amount of hydrogen compounds can be used in this post-processing, refining process to yield compositions comprising combustible compounds. Such compositions may be used as fuels.

Upon post-processing, desired transportation grade fuel compositions are provided, that can include high-octane gasoline and diesel fuel of a composition reducing or even eliminating need for after-treatment in vehicles. The fuel compositions produced from the present process avoid many of the inherent drawbacks of processing crude oil, i.e. these compositions have no sulfur content, no nitrogen content, and no aromatics content. They do, however, have high volumetric and gravimetric energy densities, an excellent resistance to thermal oxidation processes, are fire safe (i.e., they are hard to ignite), and good low temperature properties.

The present system further provides for methods using separators, for separation of gases in a gas mixture, for example, in a novel and inventive combination of heat exchangers and compressors/expanders. The systems may include the use of compressors or expanders with heating or cooling to condition gas mixtures for condensation of a selected gas in a mixture, wherein expanders and compressors are used to condition gas mixtures to the desired temperatures. The systems may use heat exchangers for condensation or evaporation of a selected gas, with phase conversion of a cooling fluid into its vapor or steam as appropriate. Other embodiments include methods comprising phase conversion of a working fluid that is used for heating or cooling, along with either compression or expansion of gases. Heat machines, for example, heat pumps using a compressor, can be used to move heat from a low temperature area to a high temperature area, and heat removers using an expander-generator (electric power generation) may be utilized.

The present invention provides energy efficient systems that use energy, such as electric energy, for the conversion of carbon oxides, including carbon dioxide and carbon monoxide, and water into hydrocarbon fuels on a production scale. A system of the present invention also comprises use of residual internal heat for electricity generation, which electricity is used for carbon dioxide, carbon monoxide and water conversion into hydrocarbon fuels. A system may also comprise compressors and expanders used for conditioning and for separation of gas mixture components.

The present invention further incorporates one or more subsystems comprising transferring heat or steam between components of the system, including the transfer of heat from FT reactor(s) to an electrolyser either directly or via conversion to electric energy, feeding reaction steam from FT reactor(s) for condensation in an electrolyser, transferring heat from FT reactor(s) for use throughout the system by users of heat, via the use of heat exchange methods, transferring heat from FT reactor(s) to RWGS reactors along with associated input/output gas processing, heating reaction water from RWGS and/or FT reactors for use in an electrolyser, and supplying heat to gas-liquid phase conversion for cooling and heating of process gases and liquids.

The present invention also comprises use of gas expanders with electric generators and gas compressors with electric motors for receiving and feeding electric energy, i.e. recycling, to reduce substantially overall energy use in the plant.

Figure 5:
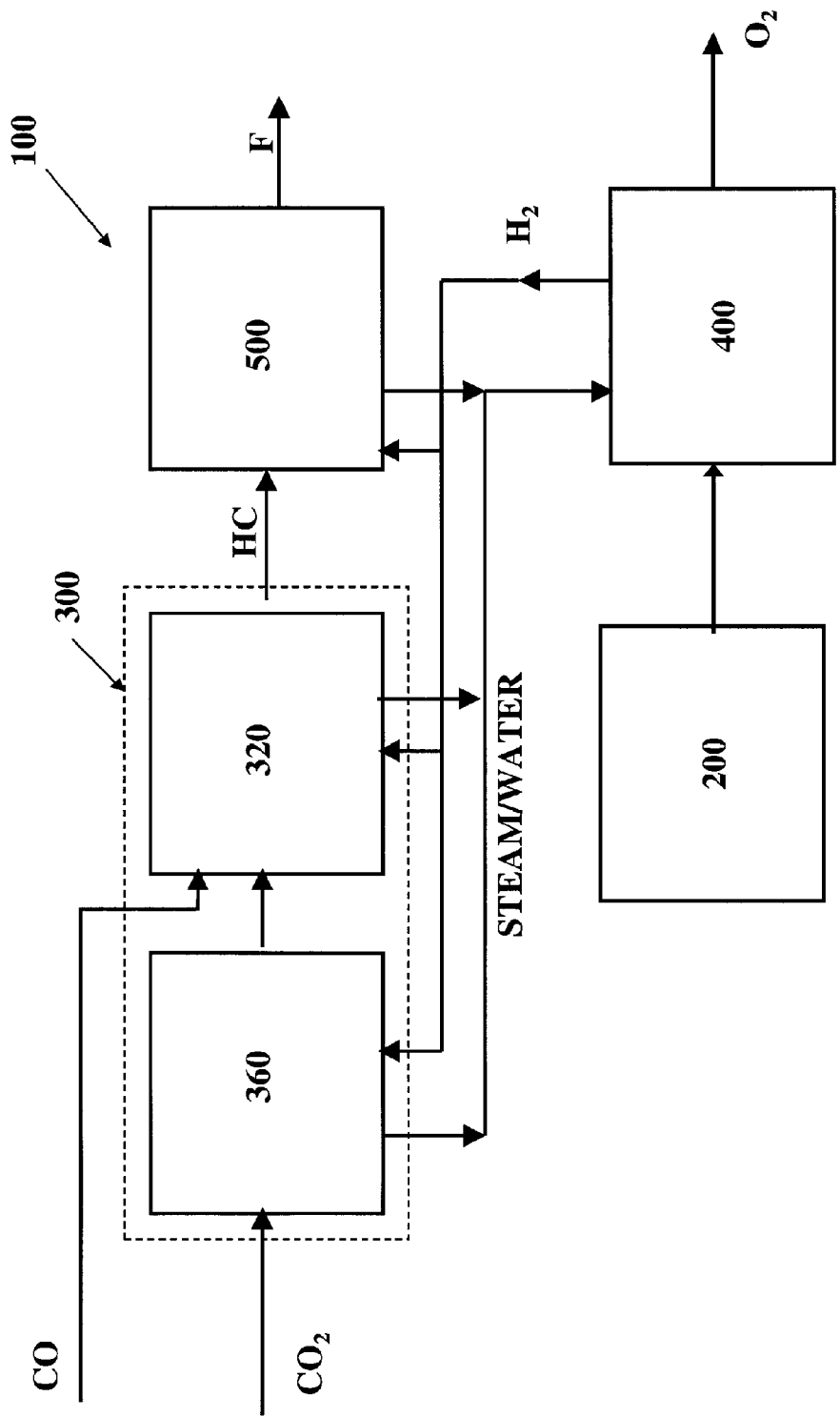
FIGS. 5-6 illustrate preferred embodiments of the present invention, incorporating the systems of FIGS. 1-4.
Figure 6:
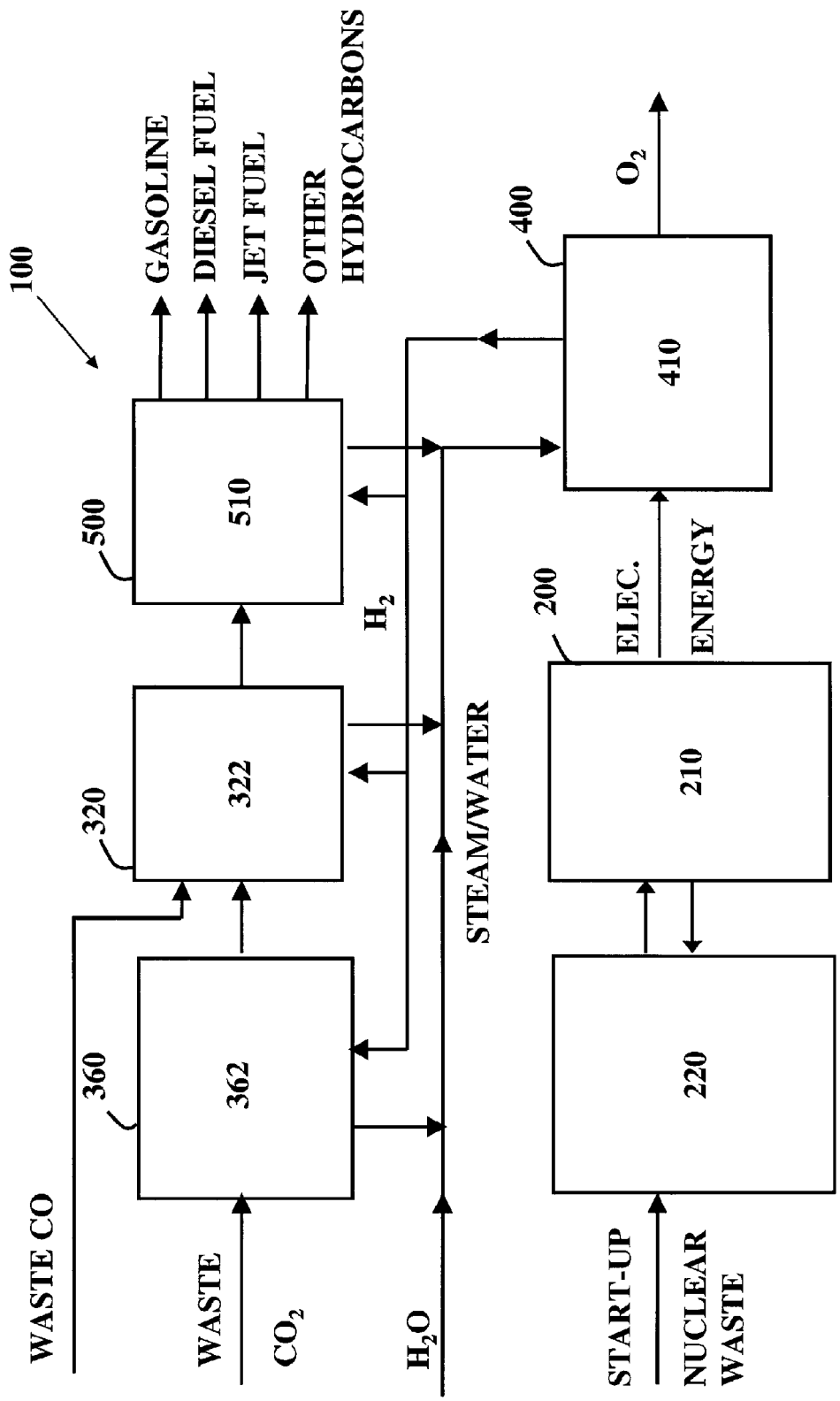

The present invention as shown in FIG. 1 comprises, in essence, a method of the present invention 100 being a method of converting one or more species of carbon oxides into hydrocarbon fuels F using electricity as the energy input E. The output fuels F can include, for example, gasoline, diesel and jet fuel. FIGS. 1-4 illustrate general, high-level systems of the present invention 100, each embodying its own novelty and inventive step, as described below, and together, forming a preferred process of the present invention 100 as shown in FIGS. 5 and 6.

While it is known to produce hydrocarbon fuels from coal and gas, the use of electricity to drive the conversion has previously been avoided. The industry has refrained from developing methods of producing fuels from carbon oxides using electricity because the energy efficiencies were simply too low to justify the cost. Yet, the energy efficiency of the present invention is greater than 60%; that is, the ratio of the high heating value of the fuels F to the amount of electricity E required to drive the conversion(s), is greater than 60%, and more preferably greater than 80%. In reverse ratio, it means that the amount of electric energy is approximately lower than 1.7 (1/60%) times of the high heating value of the fuel F, and more preferably lower than 1.25 times.

Figure 2:
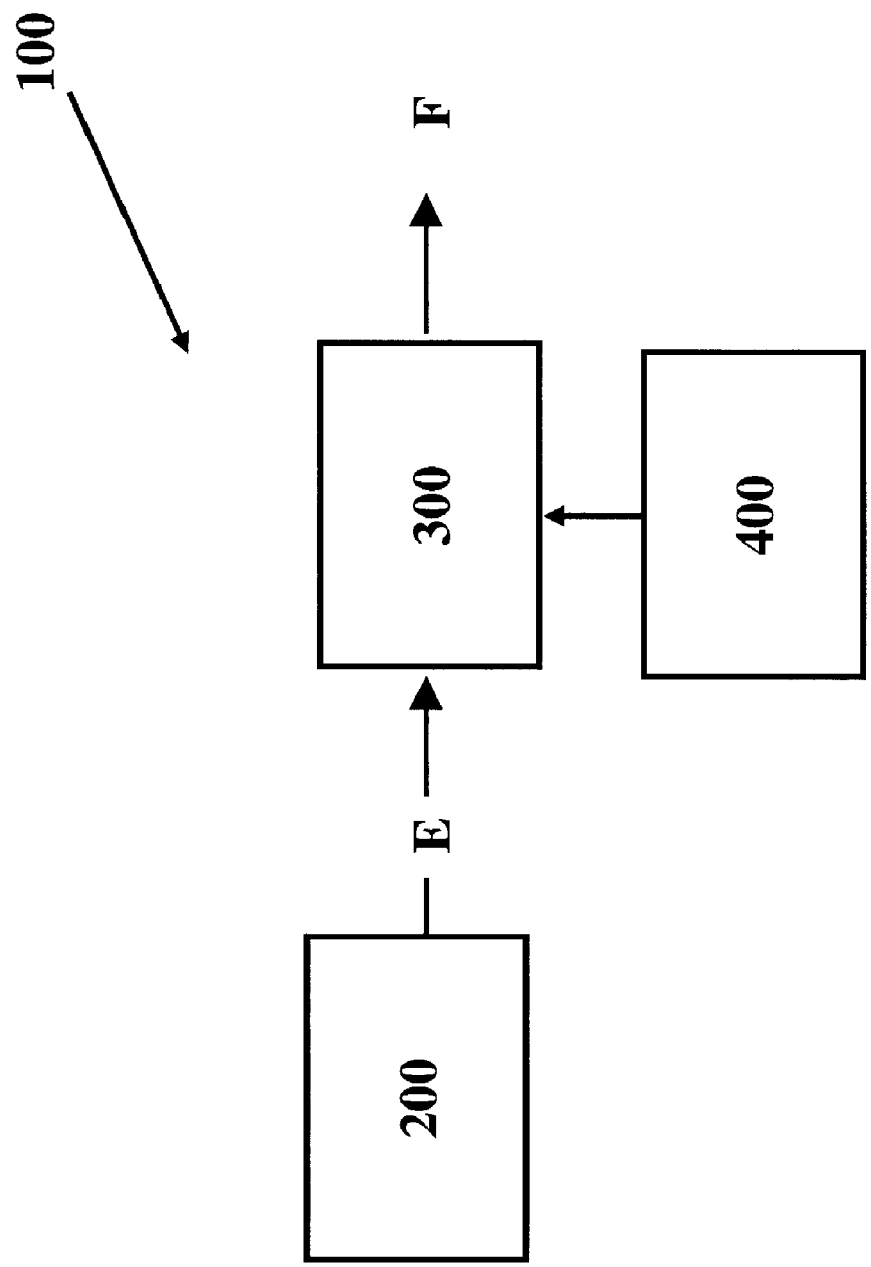

In yet another high level view of the present invention 100, as shown in FIG. 2, the present process comprises an energy input step 200 providing energy to the process, a conversion step 300 converting the one or more species of carbon oxides to fuel F, and a hydrogen input step 400 providing hydrogen to efficiently drive the conversion 300 of the carbon oxides to fuel F.

Figure 3:
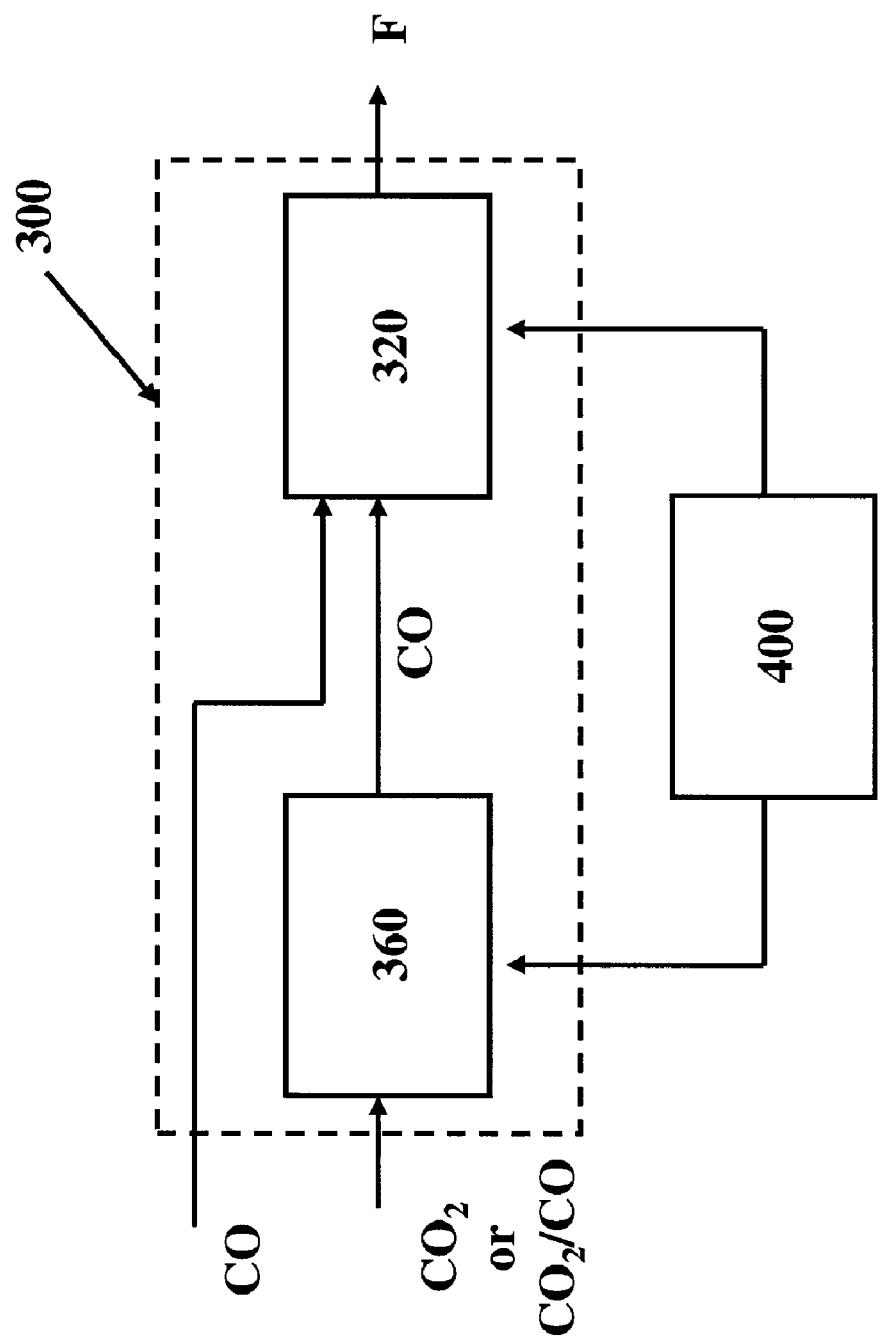

Referring to the conversion step 300 converting the carbon oxide to fuel F, as shown in FIG. 3, it can include at least two subsystems, one, a carbon monoxide conversion step 320 for the conversion of carbon monoxide to fuel F, and a second, a carbon dioxide conversion step 360, should the process of the present invention 100 be presented with carbon dioxide. The conversion step 360 converts carbon dioxide to carbon monoxide, and then feeds the carbon monoxide to the carbon monoxide conversion step 320. Alternatively, or in combination with the carbon monoxide from the conversion step 360, carbon monoxide can be fed to conversion step 320 from outside the system of the present invention 100, for example, from a plant's carbon monoxide waste stream or a mixture of $CO_2$ and CO can be fed to step 360 to convert $CO_2$ to CO.

Both conversion steps 320, 360 utilize at least a portion of the hydrogen from hydrogen input step 400 to drive their respective conversions. In one preferred embodiment, the invention 100 is presented with both carbon dioxide, and carbon monoxide, and thus the process of the present invention 100 utilizes both conversion steps 320, 360.

Figure 4:
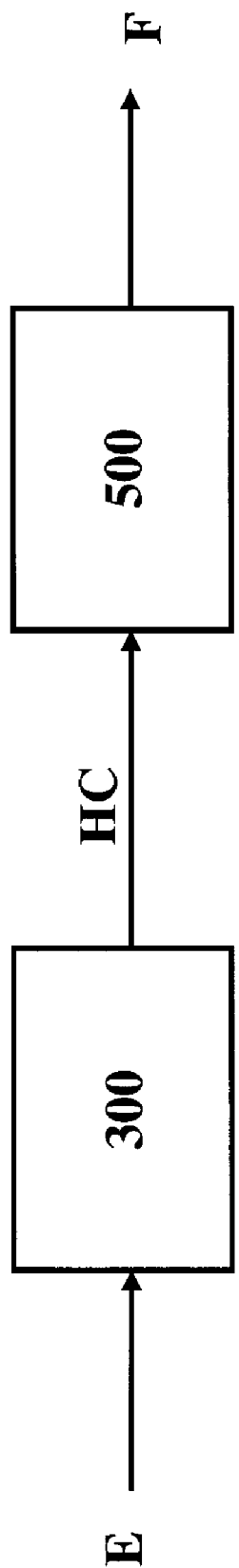

In FIG. 4, an intermediate step 500 is shown located between the output of the conversion step 300 converting the carbon oxide, and the final product fuels F. Typically, the output of the conversion step 300 is a spectrum of hydrocarbon compounds HC, out of which only some can be used in fuels. Thus, a post-processing step 500 is provided to upgrade them to the desired compositions, for example, fuels F.

Preferred embodiments of various subsystems of the present invention 100 are shown in FIGS. 5 and 6, and comprise a recycling process, and plant, to produce hydrocarbon fuels from the products of hydrocarbon fuel combustion. The invention includes the energy input step 200 providing energy to the process, including generating electricity using nuclear power reactors 210, preferably using fast breeder reactors consuming existing nuclear waste. A reactor 210 can be setup once with reprocessed nuclear waste, and then its nuclear core can be reprocessed at, for example, a re-processing plant 220 to extend the energy output from the world's Uranium reserves, perhaps 25 fold or more. As will be understood by those of skill in the art, at typical reprocessing intervals of five years, there is enough initial fuel to power the present invention until the end of its useful life.

The electricity is provided to the hydrogen input step 400, which can include electrolysing water in an electrolyser 410 to form streams of hydrogen and oxygen. Heat, also called thermal energy, from other subsystems of the process of the present invention 100 can be supplied to this step, to improve efficiencies. It can be supplied either directly to heat water when required or through conversion to electricity to conduct electrolysis. Some known types of electrolysers 410 may need some heat for operation. This heat, together with water for electrolyser operation, is preferably supplied primarily by steam generated elsewhere in the system of the present invention 100. There are numerous uses for hydrogen produced in the electrolyser 410 throughout the system, while it is preferred that most, if not all, of the oxygen produced is put to revenue generating uses outside the system of the present invention 100.

At least a portion of the hydrogen is fed to the conversion step 300, which, if the system of the present invention 100 handles both carbon monoxide and carbon dioxide, is a two-step process. In the first process, a carbon dioxide conversion step 360 is employed, including a reverse water gas shift process, namely a reverse water gas shift (RWGS) reactor 362, to combine hydrogen and carbon dioxide to produce syngas, a mixture of carbon monoxide and hydrogen. As a byproduct of the RWGS reactor operation, steam is produced that is fed to the electrolyser 410.

A source of carbon dioxide for the conversion step 360 may be a plant emitting carbon dioxide as a byproduct, especially a plant that is required to reduce carbon dioxide emissions. The prime examples of such plants are blast furnaces used to produce steel, and fossil fuel power plants using coal or gas to produce electricity.

Carbon dioxide can come in a mixture with carbon monoxide. This mixture can be either separated into carbon dioxide and carbon monoxide or processed as a mixture in the reactor 362 completing conversion of carbon dioxide to carbon monoxide.

The syngas is then fed to the carbon monoxide conversion step 320, including a Fisher-Tropsch process to combine carbon monoxide and hydrogen to provide a spectrum of hydrocarbons based on a double bond radical. The carbon monoxide conversion step 320 can include a Fischer-Tropsch (FT) reactor 322. While the FT reactor 322 can use the syngas from step 360, it is also possible to use waste carbon monoxide from existing industrial processes, and combine this waste carbon monoxide with hydrogen, instead of, or in addition to, syngas produced by the RWGS reactor 362. As is known, there are number of processes that produce carbon monoxide as waste, especially in combination with carbon dioxide.

In one preferred embodiment of the present system of the present invention 100, only carbon monoxide is processed, (not carbon dioxide), as this materially eliminates the need for the RWGS process 360. The system of the present invention 100 can also use a mixture of carbon dioxide and carbon monoxide as waste from industrial processes supplying such a mixture. Additional hydrogen can be added to the syngas output of step 360, and/or to the carbon monoxide input to step 320, as required to adjust the desired output of the FT reactor 322.

The main output of the FT reactor 322 is a mixture of hydrocarbon compounds based on —($CH_2$)-radical and a byproduct is water, which is preferably fed to the electrolyser 410. The FT reaction is highly exothermic, so heat is removed at least by providing water, which is converted to steam, which can be used directly or indirectly as a source of energy for electrolyser 410.

The hydrocarbon compounds output from the FT reactor can be characterized as a version of crude oil, in that the hydrocarbon compounds, like crude oil, can be refined using known techniques, to yield fuel compounds. Thus, the hydrocarbons are upgraded, or refined, at step 500, including a fuel post-processing step, to produce the desired compositions of fuels F. Step 500 can include a post-processing (upgrading) plant 510 that is similar, but generally simpler, with fewer processing steps needed, than in existing crude oil refineries. Such refining techniques are known to those skilled in the art. Again, some amount of hydrogen from step 400 may be used in this refining process 500.

The present invention uses multiple energy distribution lines, gas flow recycling/feedback loops, and inter-process heat and electricity exchanges. The overall results of the various improvements in each of the subsystems of the present invention 100, and in system-wide efficiencies, provide a system wherein preferably at least 60% of the energy input to the process (for example, from the electricity generated by the nuclear power plant) is ultimately contained in the high heating value of combustion output fuels F.

The system of the present invention 100 produces beneficial byproducts, as its outputs are fuels, and oxygen. In addition, the system of the present invention 100 provides a critical externality in that it reduces carbon dioxide. Carbon dioxide is a greenhouse gas that, because it is a prime contributor to global warming, is the subject to a variety of worldwide Treaties, such as the Kyoto Protocol, and national and regional implementing regulations.

As described, the final outputs of this recycling process of the present invention 100 are many desired transportation fuels, which can include high-octane sulfur free gasoline and sulfur free diesel fuel of a composition reducing or even eliminating the need for after-treatment in vehicles. One advantage of this system of the present invention 100 is its ability to produce a variety of hydrocarbon compound fuels. Another advantage is the degree of control available to plant operators to alter the ratio of hydrocarbon compounds produced by adjusting particular parameters of the methods and system, for example, the ratio of carbon monoxide and hydrogen fed to particular FT reactors. By varying the amounts of syngas fed to different types of FT reactors, it is possible to achieve different output ratios of diesel fuel, gasoline, jet fuel, and other fuels out of the total amount of syngas input.

The system of the present invention 100 is described in further detail below, including preferred embodiments of the various subsystems of the invention.

Energy Distribution Lines

Figure 7:
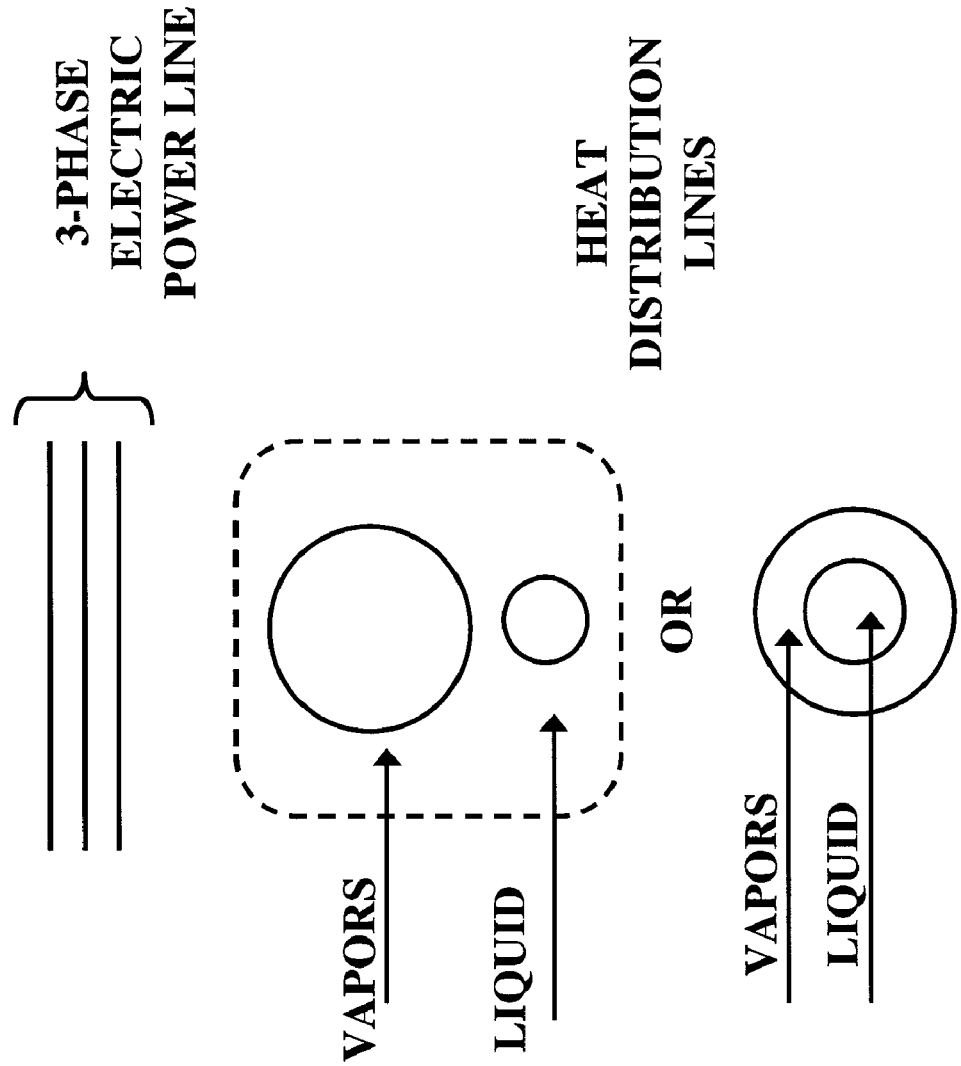
FIG. 7 shows various configurations of energy distribution lines of the present invention.

The system of the present invention 100 incorporates several energy distribution lines with two distinctive types of energy lines—electric and heat. Examples of energy distribution lines employed by the present system are shown in FIG. 7. At least one electric energy distribution line (EDL) is used. For example, one EDL is a conventional three-phase alternating current electric power distribution line operating at a conventional phase-to-phase voltage in the 10-50 kV range, a range practiced in commonly-used electric power generators. However, other voltages can be used as dictated by specific needs as would be commonly understood by a person of ordinary skill in the art.

Numerous generators and motors are connected to the EDL in this system. Generators are preferably of a synchronous type, conventionally controlled to match frequency, phase, and voltage amplitudes, so they can all feed the EDL in parallel. This type of control is used in existing electric power grid control. Motors are preferred to be of a synchronous type for controllability, and to realize higher efficiency, but other types of motors can be used.

In a preferred system of the present invention 100, there are other energy distribution lines, distributing heat, or thermal energy, (as opposed to electric energy) throughout the plant. The heat distribution lines (HDL) in this system can accept heat from a heat sources, and deliver heat to a heat users.

Phase conversion of a working fluid is used in the heat distribution lines. Each line uses two reservoirs—one of a liquid and another of a vapor of this liquid, both close to the boiling temperature and pressure of that working fluid. When heat delivery is required, vapor is taken from one half of the line, condensed, and delivered to the liquid half of the line. Condensation heat is released to a user of heat. When there is a need to take heat, then liquid is taken, vaporized, and delivered as vapor to the vapor half of the line. External heat is consumed by evaporation of working fluid.

In a preferred embodiment, there are five distinct temperatures for each of the five heat distribution lines.

A first HDL is preferably at the operating temperature of RWGS reactor 362, preferably in the range of 280-800° C. In a preferred embodiment, the operating temperature of the RWGS reactor 362 is approximately 400° C. At this temperature, it is preferred to use ethylene glycol as the working fluid or another fluid with a similar heat of vaporization and similar boiling pressure at 400° C. This first HDL is used at least to heat incoming gases into a RWGS reactor, and to deliver heat to this reactor itself, as the RWGS reaction is endothermic. In further description herein, this first HDL will sometimes be referred as the "RWGS-line", denoting its vapor part with a "V", and its liquid part with an "L".

A second HDL is preferably at the operating temperature of the FT reactor 322, preferably in the range of 180-350° C. It is preferred that the working fluid of this second HDL is water, as used in coal-fired and nuclear power plants. It is also possible to use a separate cooling loop for the FT reactor operating at higher temperatures using other working fluids, for example, ethylene glycol, and exchange some or all of its heat into this second HDL. In further description herein, this second HDL will sometimes be referred to as the "FT-line", denoting its steam part with an "S", and its water part with a "W".

A third HDL is at a temperature of water in the electrolyser 410. For example, it can be in 100-150° C. range, preferably in 130-140° C. range. The main purpose of this third HDL is to feed the electrolyser 410 with water and/or steam. This third HDL preferably uses water as a working fluid. In further description herein, this third HDL will sometimes be referred to as the "E-line", denoting its steam part with an "S", and its water part with a "W".

A fourth HDL is at ambient temperature, at 25° C. in an example of a preferred embodiment of the system, but can be at other ambient temperatures at various locations and weather conditions of this system. The working fluid can be a common refrigerant used at such ambient temperatures. The primary use of this fourth HDL is for the processing of incoming and outgoing materials. In further description herein, this fourth HDL will sometimes be referred to as the "A-line", denoting its vapor part with a "V", and its liquid part with an "L".

Figure 8:
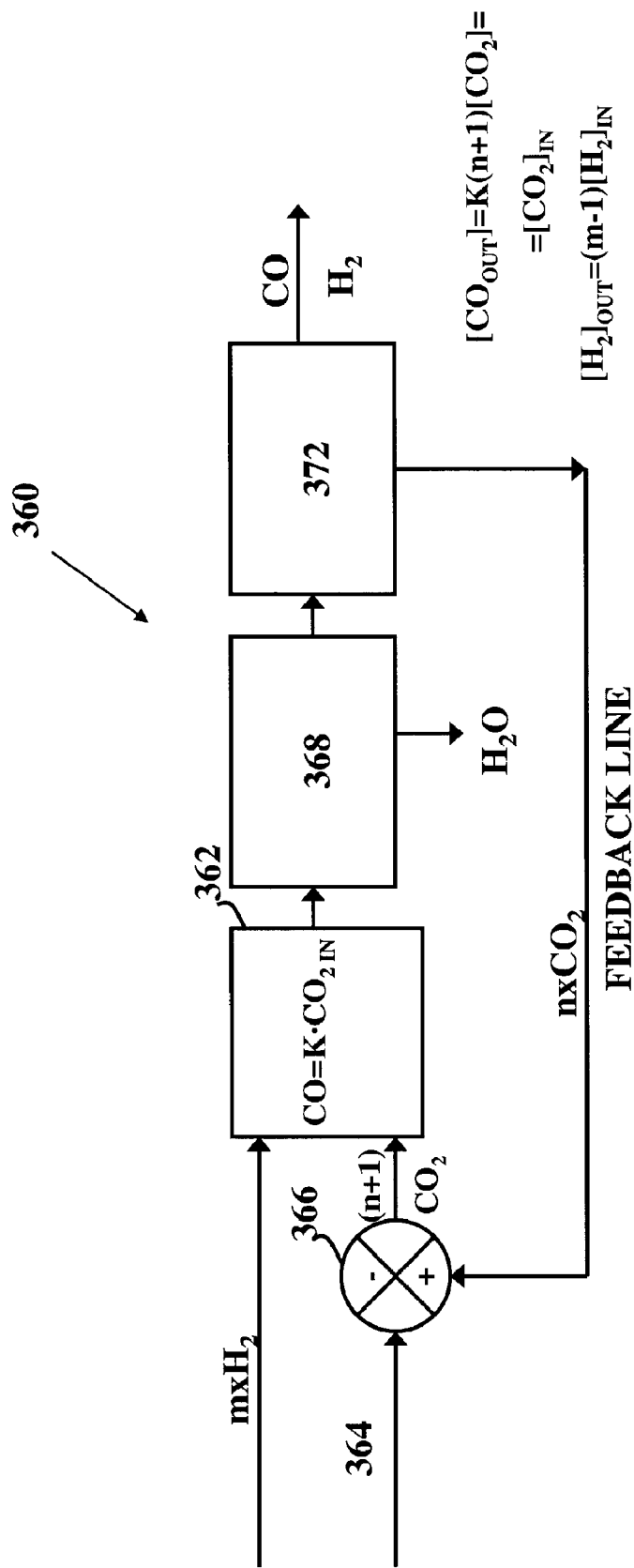
FIG. 8 shows a principal of operation of an RWGS reactor subassembly according to a preferred embodiment of the present invention.

A fifth HDL is preferably at the operating temperature of carbon dioxide separator 372 on FIG. 8, preferably in the range of −50 to −55° C. At this temperature, it is preferred to use common refrigerants like ethylene. This fifth HDL is used for heating and cooling gases flowing to and from the carbon dioxide separator. In further description herein, this line will sometimes be referred to as the "C-line", denoting its vapor part with a "V", and its liquid part with an "L".

An additional source of available thermal energy is nuclear power plant waste heat that can be used by converting it to electric energy.

Energy Distribution Lines Balancing

The energy distribution lines should be balanced, so the incoming energy should be equal to outgoing energy. The electrical distribution line delivers electric energy for water electrolysis and numerous motors driving compressors and feed pumps. It receives electric energy from numerous gas expanders driving electric power generators, including expanders converting heat energy released in the FT reactors or through burning of residual gases. The balance of electric energy is delivered by an external source 210.

The RWGS-line is balanced in a preferred manner by a heat pump delivering energy from the FT reactors. Throughout the system of the present invention 100, there are uses of heat energy from this line by converting its vapor to liquid.

In a preferred embodiment, the FT-line is balanced by heat coming from cooling FT reactors.

In a preferred embodiment, the E-line is balanced by heat coming from cooling FT reactors.

In a preferred embodiment, the A-line is balanced by delivering energy to the environment. This line collects excess thermal energy not consumed by the process, or converted to electricity. The primary use can be in space heating, especially in cold weather, by converting A-line vapor into liquid. If there is no need in this heat, then it can be dissipated to the environment using, for example, a conventional heat exchanger.

For economic construction, there should be a typical temperature difference between the temperature of the environment—air or water—and the temperature of this line. Operating (boiling) temperature in this line can be varied by regulating pressure.

In a preferred embodiment, the C-line is balanced by a heat pump removing excess heat and delivering it to the A-line.

Energy Input

Energy input step 200 preferably comprises an electric power plant 210 using heat generated by a nuclear process. While many types of nuclear processes can be used, if a fast breeder type reactor is not employed, then the plant would need a periodic supply of nuclear fuel.

The system of the present invention 100 need not use original or waste heat of a fission reactor, as other sources of energy to generate electricity can be used. For example, the efficiency of the system of the present invention 100 and the output requirements can be met not only by nuclear energy, but also, for example, hydroelectric or wind generators, as there is no waste heat required from an external source of energy. While not optimal, fossil fuel electric power plants can be used.

Carbon Oxides Conversion

Carbon Dioxide Conversion

Carbon dioxide conversion is preferably run through a RWGS process 360. As shown in FIG. 8, a preferable carbon dioxide conversion system comprises an RWGS reactor 362 that converts incoming carbon dioxide into carbon monoxide using hydrogen as a reducing agent.

The basic reaction is as follows:

$$CO_2 + H_2 \Leftrightarrow CO + H_2O \qquad (5)$$

This is a reversible reaction, and its equilibrium coefficient to convert carbon dioxide to carbon monoxide is low. For this reason, in the preferred embodiment of the present invention, excess of incoming gases, both carbon dioxide and hydrogen, are used to increase the amount of carbon monoxide.

The amount of hydrogen is enough for both (i) conversion to water inside the reactor and (ii) up to a desired level of mixture $H_2/CO$ (syngas) to feed the FT reactor 322. In this embodiment, this ratio $H_2/CO$ is around two, so the amount of hydrogen moles is approximately up to three times the number of input carbon dioxide moles. Depending on the FT catalyst used, other $H_2/CO$ values for feed to the FT reactor are also acceptable.

The amount of carbon dioxide at the input of the reactor 362 is preferably enough to achieve complete conversion of incoming carbon dioxide at a selected operating temperature of the reactor 362. For example, in one embodiment, the RWGS process 360 has a 400° C. operating temperature, and a three-stage RWGS reactor with intermediate separation of steam. In such a design, approximately the same amount of carbon dioxide is required at the input of the reactor, than incoming carbon dioxide normally available, conditioned that the $H_2/CO$ ratio on the output is near a value of 2. This additional amount of carbon dioxide is thus provided by a recycling loop of this reactor assembly as shown in FIG. 8. This additional supply of carbon dioxide is not consumed in the reactor, but circulates through it to change the equilibrium conditions for as near a complete conversion of the incoming carbon dioxide as possible. The two streams of carbon dioxide (fresh as well as recycled) can be mixed in a conventional gas mixer 366 or fed using separate, appropriately designed nozzles or distributors into the RWGS reactor.

The amount of carbon dioxide in the recycle loop depends on the amount of hydrogen feed, on the operating temperature of the RWGS reaction, and on the number of serially connected reactors with separation of steam between them. At lower hydrogen feed, or at lower temperatures, or with fewer reactors in series, there is a substantially larger amount of carbon dioxide in the recycle loop, and vice versa. One advantage of having a lesser amount of gas in the recycle loop is that there are lesser electric and heat losses needed to maintain gas circulation and separation.

The output stream of the RWGS reactor 362 goes first through a steam condensation section 368, and then through a carbon dioxide separator 372. In one embodiment, the steam condensation section can include a condenser (heat exchanger) followed by a knockout drum. The condensed water from the separator 368 can be fed back to the electrolyser. Separated carbon dioxide is delivered to the input gas mixer 366. A direct output of the carbon dioxide separator 372 is syngas with a $H_2/CO$ ratio approximately as beneficially required by the FT reactor 322 for efficient conversion and, residual carbon dioxide, if any.

There are other well-known processes to convert carbon dioxide into carbon monoxide that can be used in the present invention without changing functionality of this apparatus.

Operating pressure in the reactors can be in the range of 4-30 bar, 20-25 bar is preferred. GHSV-STP (Gas Hourly Space Velocity at Standard Temperature and Pressure) of 1,500-15,000, preferably 5,000-8,000.

Steam is preferably separated at or near ambient temperature, which leads to high separation ratio.

Separation of carbon dioxide from the output can be accomplished by traditional and current methods. The currently prevalent methods include a variety of Amine absorption processes as well as carbonate processes, pressure swing absorption, adsorption, and gas permeation, among others. Additionally, cryogenic separation is possible by lowering the temperature, and increasing pressure under appropriate processing conditions, such that only 15-35% of carbon dioxide may be left in the syngas, as a ratio to carbon monoxide, mol/mol, for example, at −50 to −55° C. and 50-100 bar pressure.

More likely, using cryogenics, solvent-mediated processes such as Ryan-Holmes, or three-phase ones such as CFZ (Controlled Freezing Zone), can be used for further reduction of carbon dioxide content. The residual carbon dioxide will be circulated through the upstream processes, or better yet beneficially consumed under certain operating conditions in the FT subassembly, and then more or less of it will be returned back to the input of this subassembly. Further, some of these processes can be used sequentially, for example, cryogenic liquefaction to separate the majority of carbon dioxide, followed by either CFZ or Amine absorption to condition syngas to a desired carbon dioxide level, in 3-10% level measured in mol/mol versus carbon monoxide. In front of the cryogenic-type of separator, water vapors must be thoroughly removed. Adsorption type dryers may be used as commonly practiced in cryogenic processes.

Figure 9:
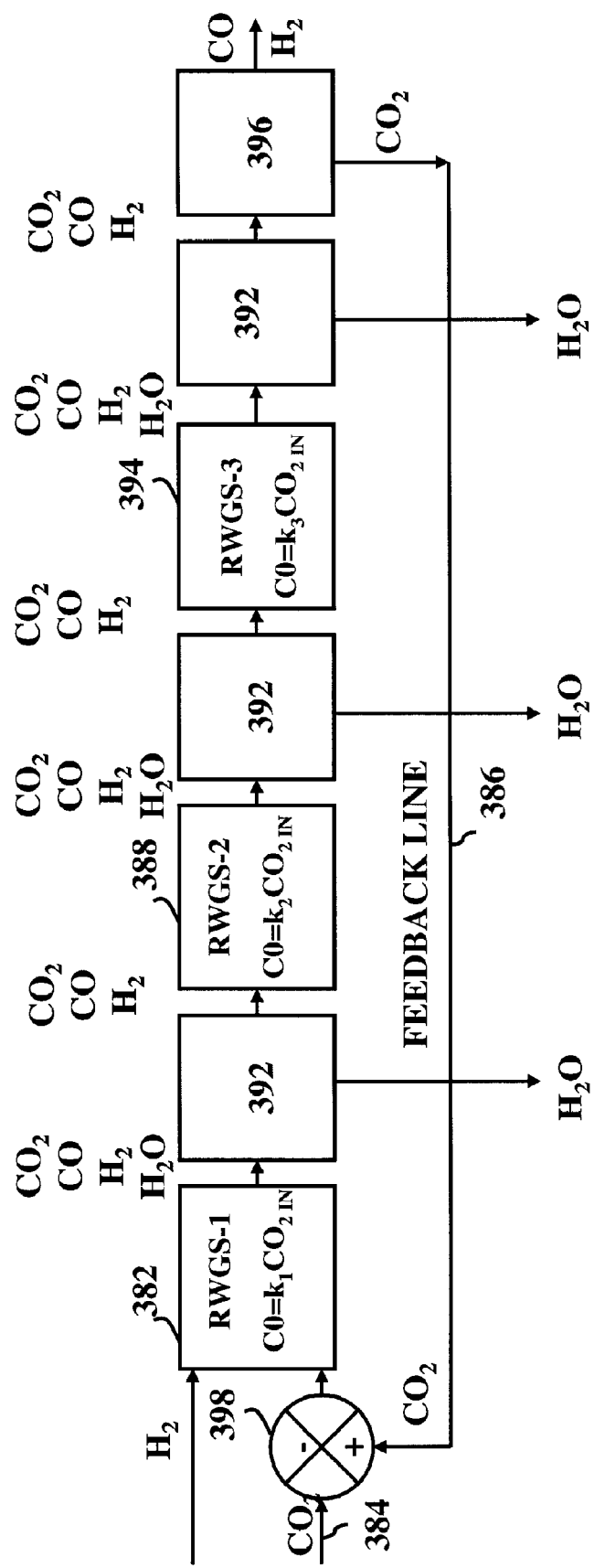
FIG. 9 illustrates a three-stage RWGS reactor with carbon dioxide recycling, according to a preferred embodiment of the present invention.

Another preferable carbon dioxide conversion system is shown in FIG. 9, and comprises a three-stage RWGS. As shown, there are three steam separator sections, one after each reactor, and then a carbon dioxide separator at the end of the process.

The RWGS reaction is weak in the direction of formation of carbon monoxide and therefore requires removal of at least one reactant.

In order to achieve as close to 100% conversion as possible, the system of the present invention 100 can use a three-stage RWGS reactor in conjunction with (i) steam removal on the output of each stage and (ii) increased molar concentration on the input.

First, the hydrogen molar concentration is increased to the extent that the resulting syngas will have up to the right ratio $H_2/CO$ for the upstream Fischer-Tropsch reactor 322. In one example, this ratio is two or more.

To satisfy the RWGS reaction, the first RWGS reactor 382 in this embodiment is fed with a molar ratio of 3:1 in relation to input carbon dioxide 384 molar content. One mole is used to reduce carbon dioxide to carbon monoxide, and two moles are left for effluent syngas.

Next, the carbon dioxide input is increased to the first RWGS reactor 382 by creating a recycling line 386 from the output, and circulating it without conversion. Approximately one more mole needs to be added in the circulating loop to one mole of input carbon dioxide to create the approximately 100% conversion in three RWGS reactors 382, 388, 394 in series with the construction as presented in FIG. 9.

The carbon dioxide conversion system of FIG. 9 relies on steam removal and carbon dioxide separation. A first steam separator 392 removes steam from effluent gas of the first RWGS reactor 382, and by doing so, creates conditions to continue carbon dioxide conversion in the second RWGS reactor 388. As carbon monoxide has not been removed, the conversion rate of the second reactor 388 will be smaller than the first reactor 382.

A second steam separator 392 removes steam from effluent gas of the second RWGS reactor 388, and by doing so, creates conditions to continue carbon dioxide conversion in the third RWGS reactor 394. As carbon monoxide has not been removed, the conversion rate of the third reactor 394 will be smaller than the second reactor 388.

A third steam separator 392 is positioned on the output of the third RWGS reactor 394. On the output of this separator, effluent gas contains syngas of a desired $CO/H_2$ ratio and carbon dioxide. Thus, carbon dioxide is separated using a separator 396, and placed in recycling line 386 to combine in a gas mixer 398 with incoming carbon dioxide 384.

If syngas contains smaller amount of hydrogen than necessary to feed upstream to the FT reactors, then additional hydrogen from electrolyser 410 will be added.

RWGS Reactors

The RWGS reactors used in the present system of the present invention 100 can operate efficiently at a number of operating temperatures, while 400° C. is used in a preferred embodiment. An exemplary catalyst is KATALCO 71-5 produced by Johnson Matthey. Operating pressures can be in the range of 4-30 bar, with preference for higher values to reduce overall size of the assembly. A GHSV-STP of 1,500-15,000, preferably 5,000-8,000 is used.

Figure 10:
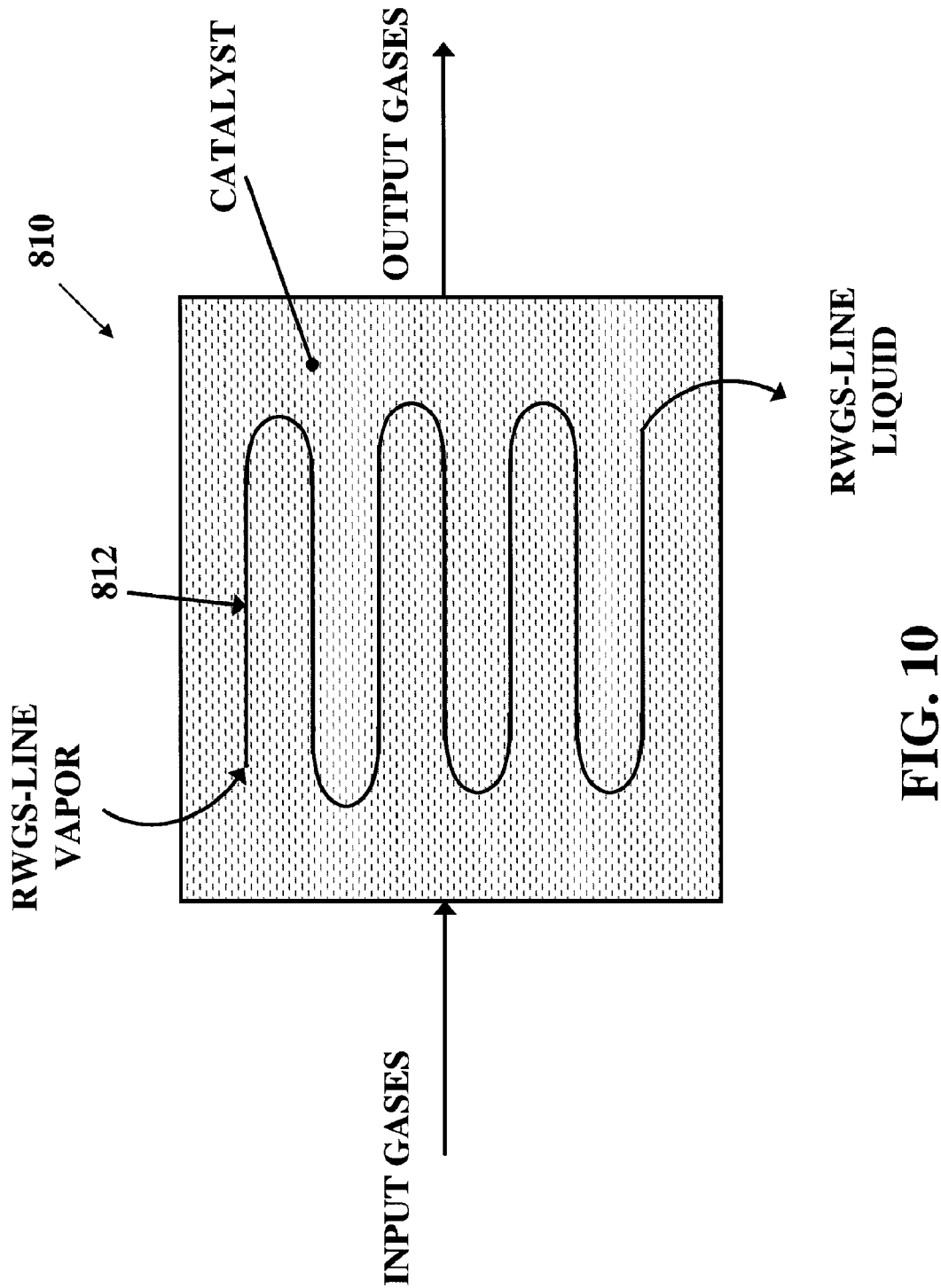
FIG. 10 shows an RWGS reactor with a heater, according to a preferred embodiment of the present invention.

The reaction is endothermic and requires external heat. In a preferred embodiment, the system of the present invention 100 uses an isothermal operation (being within plus or minus 10% of the ideal operating temperature as measured in ° K), with external heat delivered into a reaction zone from an external source. One example of an overall heat delivery system 810 is illustrated in FIG. 10. Phase conversion of a working fluid is used to deliver heat at or near isothermally, specifically the RWGS-line. RWGS-line vapors are delivered to condenser coil 812. Vapors condense and release condensation heat, while maintaining phase conversion temperature.

The residual working fluid is released into the liquid part of the RWGS-line. Released heat is consumed by reacting gases inside the reactor through a heat exchange process.

Preferably, the reactors 382, 388, 394 of FIG. 9 are of the same general construction, although the second and third reactors can be smaller than the first, as they convert lesser amounts of carbon dioxide into carbon monoxide and process smaller in volume gas mixture.

This RWGS subassembly can process not only pure carbon dioxide but also a mixture of carbon dioxide and carbon monoxide. The mixture can be processed through one, two, or all three serially connected reactors, as a function of ratio of carbon monoxide to carbon dioxide. If this ratio is smaller than this ratio on the output of the first reactor under condition of pure carbon dioxide conversion, then all three reactors will be used. The difference will be in reduced amount of hydrogen required for reduced amount of carbon dioxide. The same rule will determine if two or only one reactors are required for processing of this mixture. Ultimately, if only carbon monoxide is supplied, then no reactors are required.

Alternatives—Carbon Dioxide Conversion

As discussed, carbon dioxide conversion is preferably run through an RWGS process 360. There are a number of modifications to this RWGS process that will not significantly change the outcome—the production of carbon monoxide components of syngas.

For example, the temperature of reaction in the reactors can be reduced. This will decrease the equilibrium constant, and will thus cause an increase in amount of carbon dioxide in the recycling line, or the number of reactors connected in series, or both.

Additionally, the temperature of reaction can be increased, and then it can be possible to reduce the number of reactors in a preferred embodiment from three, to two or only one with a sufficient amount of carbon dioxide circulation to provide 100% conversion of incoming carbon dioxide.

It is also possible to reduce amount of hydrogen gas fed to this process with consequent increase in carbon dioxide in the recycling loop. It is also possible to reduce the amount of circulating carbon dioxide by using more than three reactors in series at the same temperature.

The reaction heat does not have to be delivered isothermally, but rather can be provided through heat exchange with any hot-side fluid of appropriate temperature, flow rate, among other parameters.

Other processes are known to convert carbon dioxide into carbon monoxide, and such processes can be used in the present system of the present invention 100.

Carbon Monoxide Conversion

Figure 11:
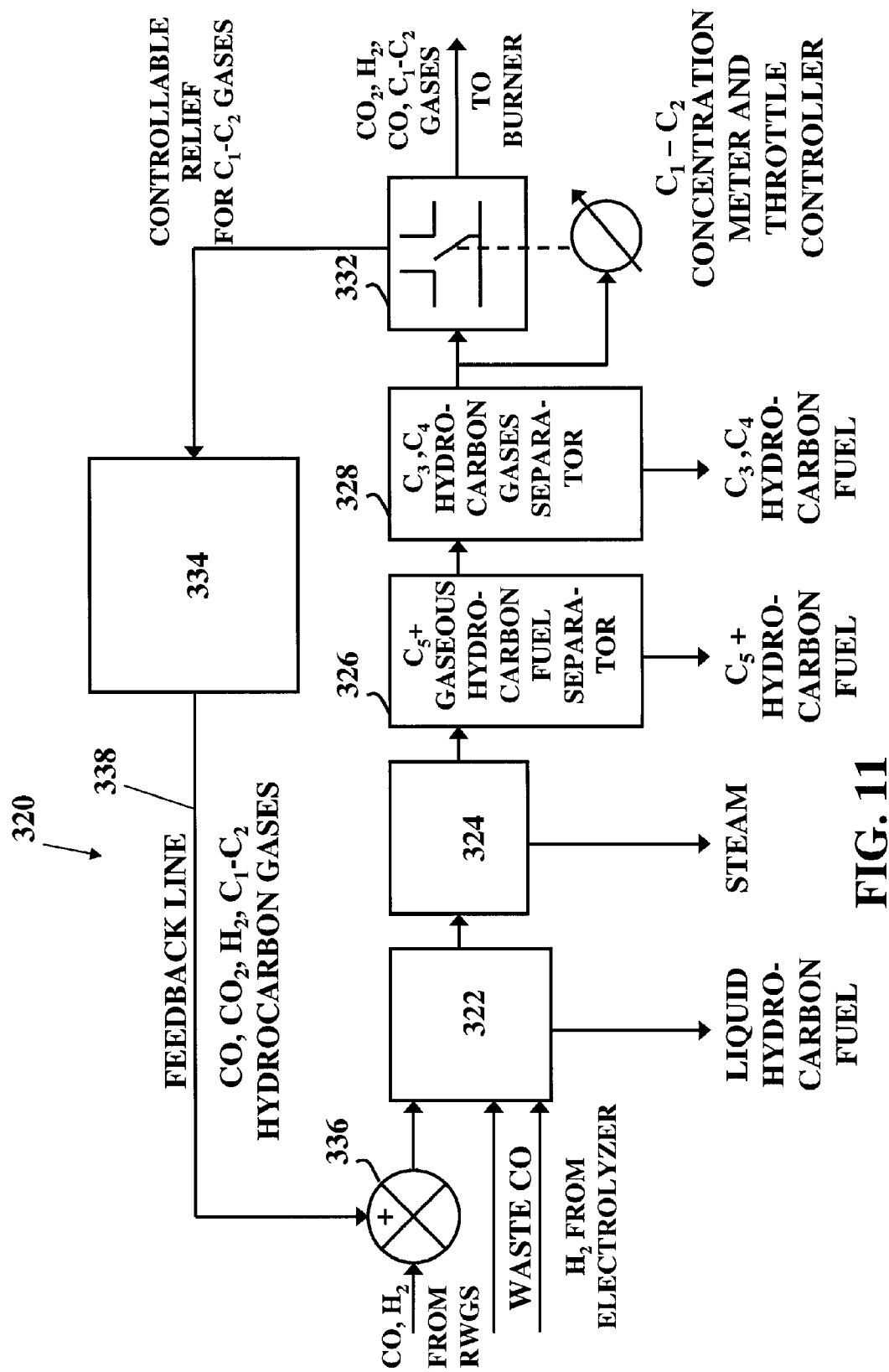
FIG. 11 shows a principal of operation of an FT reactor subassembly according to a preferred embodiment of the present invention.

Carbon monoxide conversion is preferably run through an FT reactor process 320. The reactor assembly is shown in FIG. 11. The operation of an FT reactor 322 is as follows:

$$CO + 2H_2 \rightarrow (-CH_2-) + H_2O \quad (6)$$

Dashes at (—$CH_2$—) denote available bonds for either adding hydrogen or for polymerization. There are numerous straight and oxygenated hydrocarbon compounds produced in Fischer-Tropsch reactors as a function of the type of catalyst used, and the operating temperature, pressure, and gas velocity in the reactor.

In one preferred embodiment, as an example, the reactor operates with a Cobalt catalyst at 220° C., and produces a mix of hydrocarbons, which after upgrading leads primarily to the production of a mixture of gasoline and diesel fuel in an approximate proportion of 1:2.

In other implementations of the present invention, at higher temperatures, for example around 330-350° C., more gasoline is produced, in gasoline to diesel ratio of approximately 4:1. So by combining operation at different temperatures, one can adjust gasoline to diesel ratio from 1:2 to 4:1. The production rate of diesel fuel by the present invention includes adjusting the temperature, pressure and residence time (gas flow). The amount of residual hydrocarbons that is difficult to convert into desired liquid fuels varies, and generally is higher at higher temperature and lower at low temperature.

In one embodiment, a Cobalt catalyst is used, with a $H_2$/CO ratio of 2.15, a 220° C. operating temperature, a pressure of approximately 20 bar, and GHSV-STP of 1,500. The conversion of carbon monoxide to hydrocarbons is up to 75%. Pressure can change in the range of 10-30 bar and GHSV from 500 to 5,000.

The FT reactor 322 on FIG. 11 produces both liquid hydrocarbons that are drained for further processing, and gaseous hydrocarbons mixed with steam and input gases (carbon monoxide and hydrogen). The presence of input gases is due to incomplete conversion of syngas. For more complete conversion, more than one FT reactor can be used in series with removal of steam and certain hydrocarbon gases in between the reactors. In an example of a preferred embodiment, a two-stage FT reactor is used to achieve higher conversion efficiency.

On the output of the reactor 322, steam is separated from the effluent gas by a steam separator 324, then gaseous hydrocarbons with carbon numbers $C_5$-$C_6$ by a separator 326, and finally gaseous hydrocarbons with carbon numbers $C_3$-$C_4$ by a separator 328. These separation processes can be combined as a function of composition of gas mixtures before separation. The residual gas contains mainly natural gas compounds, methane $CH_4$ and ethane $C_2H_6$, and residual syngas gases carbon monoxide and hydrogen, and various amounts of not separated carbon dioxide and $C_3$ and $C_4$ compounds.

In a preferred embodiment, a majority of the syngas is returned to the input of the FT reactor 322 via a recycle line, thereby improving conversion efficiency of incoming syngas into hydrocarbon fuels. This can be accomplished in part by using a controllable throttle or valve 332. This throttle is installed in the recycling line for effluent gas, and allows venting or flaring of a portion of this effluent gas in equal molar proportions. In a preferred embodiment, a controlling parameter is the amount of natural gas compounds before the vent. The throttle is open just enough to maintain this amount at a predetermined level. Other gases can be used for the same purpose.

A gas conditioner 334 in the recycling line can be provided to match the temperature and pressure of the syngas coming from the RWGS assembly 360. Syngas is combined in a gas mixer 336, or similar to a gas mixer 384.

Instead of syngas, the FT reactor 322 can be fed by an external source of waste carbon monoxide (from outside the system of the present invention 100) and hydrogen from the electrolyser 410, or a mixture of these gases and syngas. Hydrogen is added on the input from the electrolyser 410 to regulate the $H_2$/CO ratio required by the FT reactor 322. In a preferred embodiment, this $H_2$/CO ratio is around two, and more specifically between 2 and 2.2.

Vented gases in this apparatus can be fed into a burner-generator to produce electric power.

Figure 12:
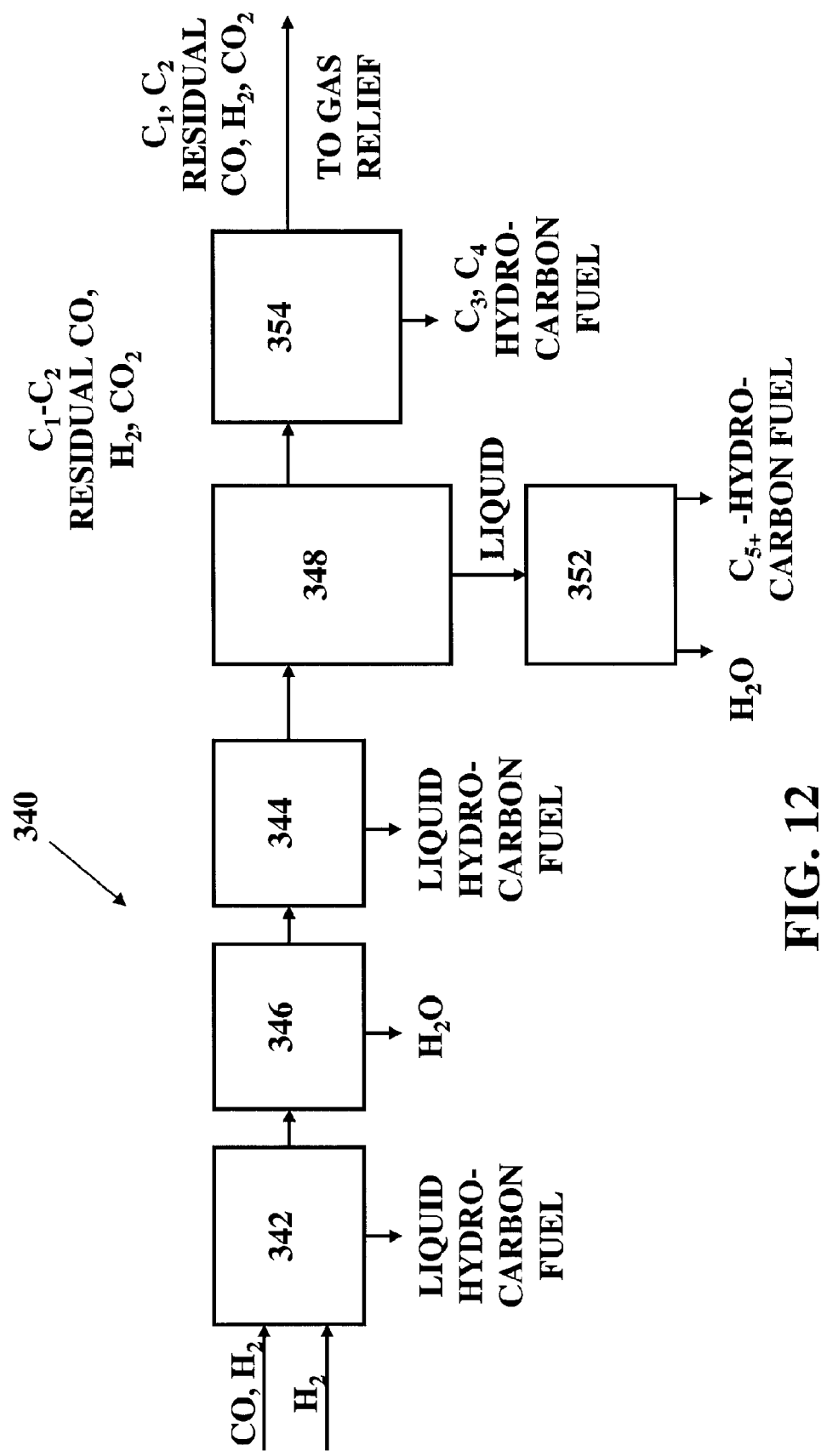
FIG. 12 shows a two stage FT reactor, according to a preferred embodiment of the present invention.

This FT assembly can be replaced by a variety of conventional Fischer-Tropsch reactor designs without changing functionality of this apparatus. A more detailed preferred carbon monoxide conversion system is shown in FIG. 12. A two-stage FT reactor system 340 is illustrated. There are two FT reactors 342, 344 in this assembly. Syngas from the RWGS subassembly and some amount of hydrogen from the electrolyser are fed into the first FT reactor 342. A certain amount of liquid hydrocarbons is produced and drained from the reactor. The unconverted syngas, steam, residual carbon dioxide from the RWGS assembly, and all hydrocarbons produced in the reactor 342 that are gaseous at the reaction temperature and pressure are fed into a steam separator 346. It is preferred to make separation at ambient temperature, but other temperatures can be used as well. It is possible that some hydrocarbon gases will be separated along with water. The residual water and hydrocarbons then may be separated as commonly practiced, for example by distillation or gravimetrically.

The residual syngas with some amount of hydrocarbon gases and residual carbon dioxide are fed into a second FT reactor 344. A certain amount of liquid hydrocarbons is produced and drained from the reactor. The unconverted syngas, steam, residual carbon dioxide from the RWGS assembly, and all hydrocarbons produced in the reactor that are gaseous at the reaction temperature and pressure are fed into a steam separator 348. It is preferred to make separation at ambient temperature, but other temperatures can be used as well.

At this position in the process, much smaller amounts of syngas are left than on the output of FT reactor 342, and therefore the partial pressure of hydrocarbon gases with carbon number $C_5$, and higher is larger, and they will condense along with steam in the steam and $C_{5+}$ separator 348. $C_n$ is a hydrocarbon with n-number of carbon atoms per molecule. $C_{n+}$ means hydrocarbons with n or more carbon atoms per molecule. The condensed liquid is drained, and water is separated by many common processes, like distillation or gravimetrically in a water separator 352.

The residual gases from the separator 348 are fed to another separator 354 of hydrocarbons, including ones with carbon numbers $C_3$ and $C_4$. They can be condensed and separated from this residual mixture at, for example, 20-50 bar, and at temperatures where most of such compounds are condensed. This temperature depends on amount of other gases in an effluent gas. When these amounts are large in comparison with volume of separateable gases, low temperature like one used for carbon dioxide separation can be used. Then, not only $C_3$ and $C_n$ hydrocarbons can be separated but also carbon dioxide. These gases can be easily separated from each other by pressure change and carbon dioxide recycled to the input of the RWGS assembly. Effluent syngas, components of natural gas, and residual carbon dioxide are fed to a controllable relief 332 (FIG. 11). In this relief, in equilibrium conditions, the amount of syngas is substantially smaller than other gases, and therefore whatever amount of mixture is released, it will contain much smaller amount of syngas than in the recycling loop. Presence of syngas in the recycling loop has the same effect on completion of conversion of the incoming syngas as presence of carbon dioxide in the recycling loop of the RWGS subassembly. Amount of syngas in vented gases can be used also for control of venting ratio.

In other preferred embodiments, more reactors can be used to increase the syngas conversion rate, even at different operating parameters, to create a more desirable spectrum of produced hydrocarbons, like one at low temperature like 220° C. and another one at like 340° C. Syngas can be directed in different amounts to reactors operating under different conditions to regulate composition of produced hydrocarbons that will in its turn affect composition of fuels after upgrading, i.e. relative amounts of gasoline, jet fuel, diesel fuel, and the like.

FT Reactors

Figure 13:
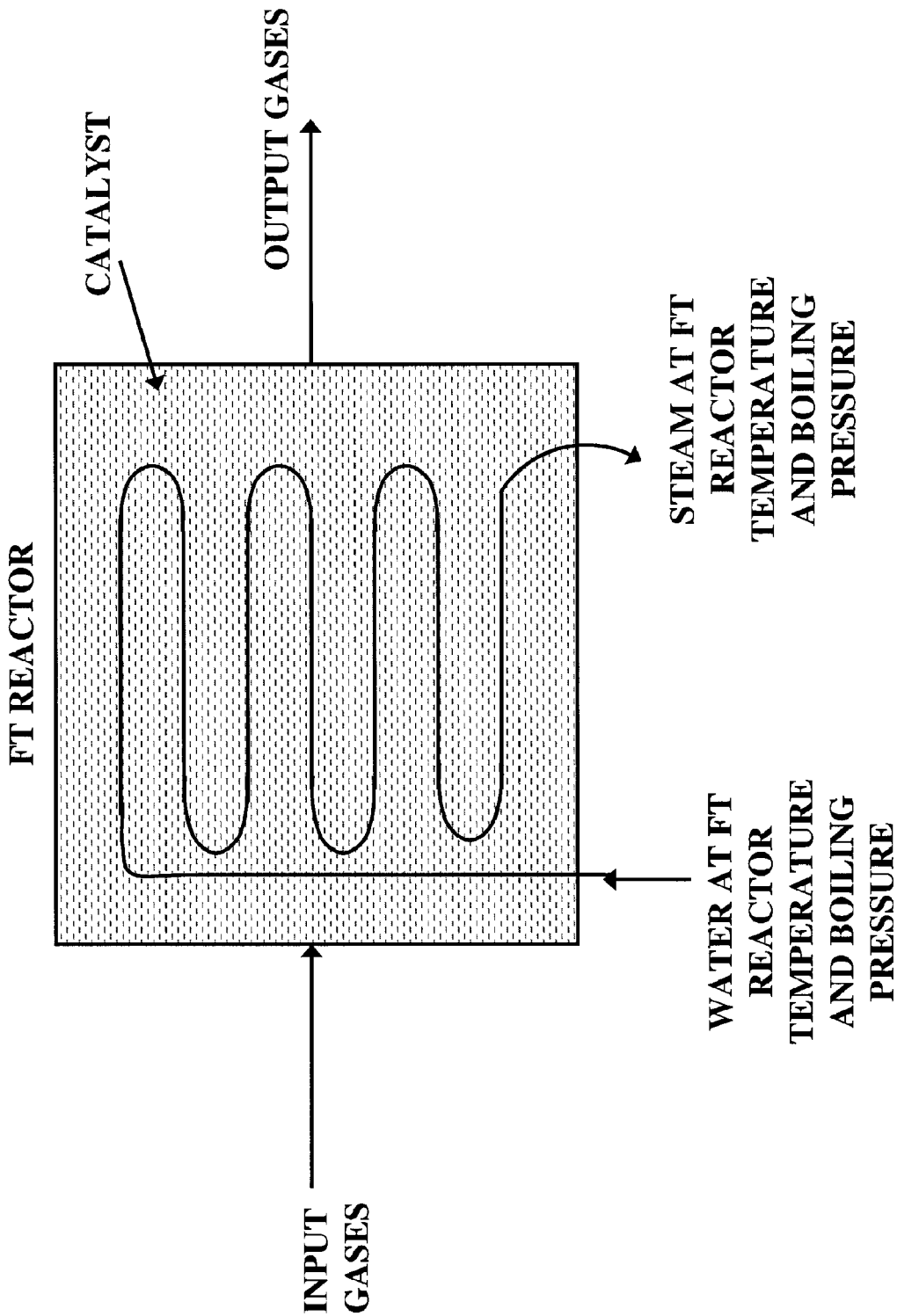
FIG. 13 illustrates an FT reactor with a water cooler, according to a preferred embodiment of the present invention.

The reaction is highly exothermic and requires substantial heat removal as the output of the reactor is highly temperature dependent. In a preferred embodiment, phase conversion of water into steam in the FT-line is used to remove this heat, as illustrated in FIG. 13. This leads to near isothermal operation of the reactor, and therefore consistent output, as the output of products from this reactor is highly dependent on temperature, for example within 10° C.

Alternatives—Carbon Monoxide Conversion

Carbon monoxide conversion may be accomplished through an FT process 320. There are number of modifications to this FT process that will not change the outcome, i.e. the production of hydrocarbon compounds out of syngas, but may significantly change the composition of the products produced.

For example, the temperature of the reactors can vary in the range of 150° C. to 350° C. Variances in catalyst type, catalyst bed type, pressure, residence time, and velocity of syngas, will alter in varying degrees the composition of the products produced. At higher temperatures, lighter hydrocarbon compositions are produced. In one example, at 310°-340° C., and utilizing a circulating catalyst, 72% of the output includes compositions with carbon number $C_5$-$C_{11}$ on which gasoline is based, 6% heavier hydrocarbons, 8% hydrocarbon gases, and 14% of alcohols, ketones and acids.

The FT assembly can be made to operate at different reactor temperatures by regulating water temperature and pressure in the FT-line, and pressure in the FT reactors and other components affect separation of steam and hydrocarbon gases.

The type of catalyst and its bed can be also changed from time to time to match changes in operating characteristics. Two or more reactors can be used connected in series and operating at the same or different temperatures, catalysts, and other operating conditions. Also, there can be two or more parallel strings of reactors, also operating at different or same conditions.

With such a construction, a plant built with system of the present invention 100 can accommodate changing market needs over many years of operation.

Generation of Hydrogen

The present system of the present invention 100 further comprises a hydrogen input step 400 providing hydrogen to drive the conversion 300 of the carbon oxides to fuel F. An electrolyser is the preferred device to provide the hydrogen.

Figure 14:
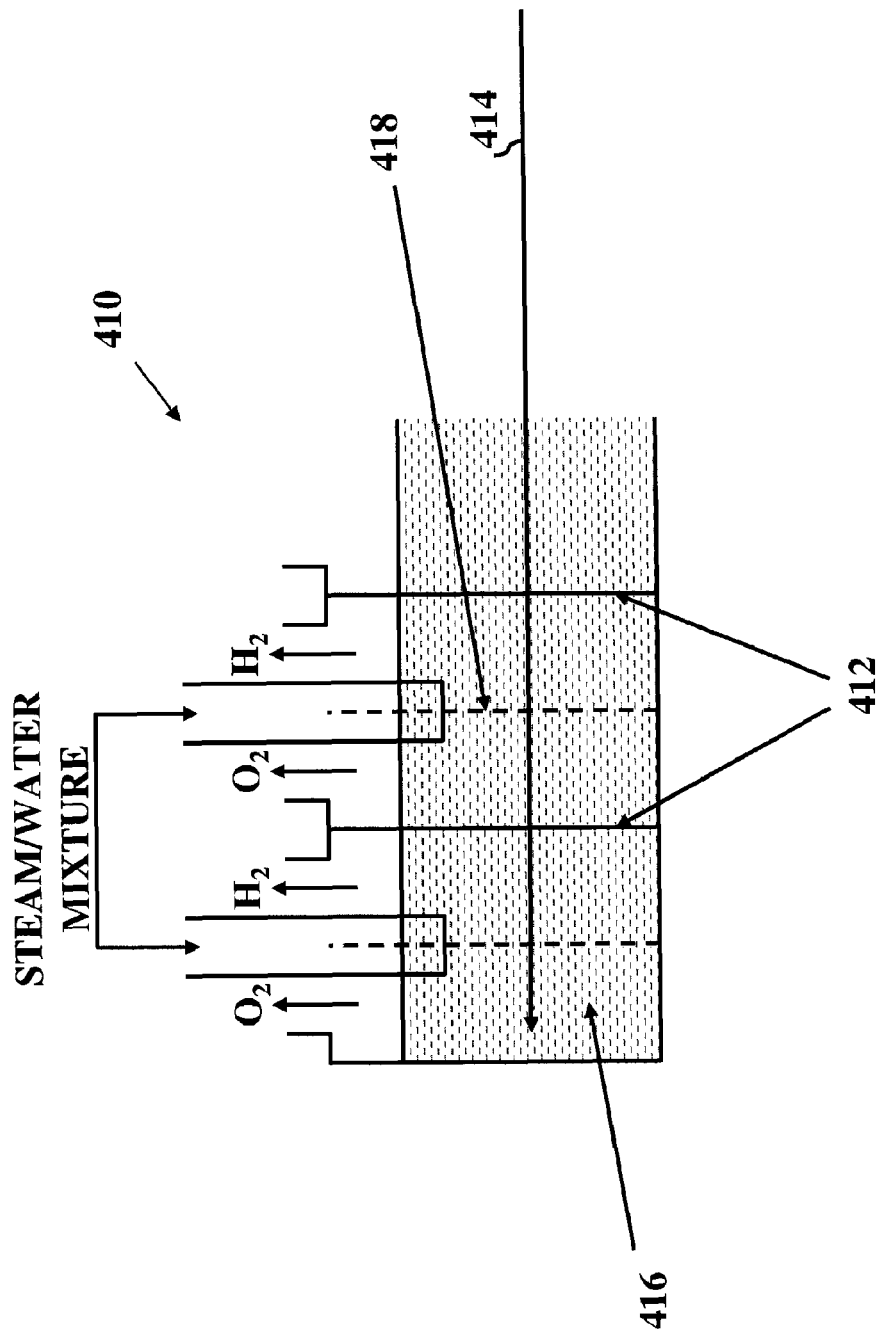
FIG. 14 shows a portion of the hydrogen unit of the present invention, electrolyser cells, according to a preferred embodiment.

A portion of an embodiment of electrolyser 410 is shown in FIG. 14. It is preferred to use bipolar electrodes 412 for a high voltage and lower current stack of electrolytic cells. Electric current 414 flows through the surface of all bipolar electrodes into electrolyte 416, which causes electrolysis of water in each cell.

Each cell can be divided by a gas diaphragm 418. Hydrogen and oxygen are released on opposite sides of each bipolar electrode, collected in the space between electrode and diaphragm, and vented out for uses in the system of the present invention 100.

In a preferred embodiment, an electrolyser design with a high current density, for example 5-20 $kA/m^2$, is used. In comparison with low current densities, for example, 1-3 $kA/m^2$, such an increase leads to much smaller size, weight, and cost electrolysers. But there is a different energy efficiency at such an increased current density due to much larger overvoltage on electrodes and resistive losses in the electrolyte. High current density electrolysers use the following construction and operating parameters:

Operating temperature is 130° C., and potentially up to 150° C., which decreases overvoltage potential on electrodes and decreases resistivity of the electrolyte;

Operating pressure is in the range of 20-30 bar to decrease volume of evolving gases that is beneficial to electrolyte conductivity, and to decrease water vaporization and its recycling;

Concentration of KOH in the electrolyte is approximately 30% by weight; and

The gap between electrodes can be made smaller by use of diaphragm materials for temperatures in 130-150° C. range.

It is possible to achieve cell voltage around its thermoneutral (isothermal) voltage at some level of high current. It means that if with a supply of electric energy, this thermoneutral potential is reached, then no additional cooling or heating of cells will be required. If this potential will be lower, then additional heat will be required, and if higher—then cooling will be required.

Reaction water to the cells of high current density electrolysers can be delivered in two ways, either traditionally as liquid, or by steam condensing into water right in the cell, or a combination of water and steam. The choice is design specific, as a function of current density, other auxiliary subsystem choice for the electrolyser, operating voltages, among others.

Choice of high current density electrolysers leads to other efficiencies in the overall plant due to lower temperature and especially pressure differentials.

Figure 15:
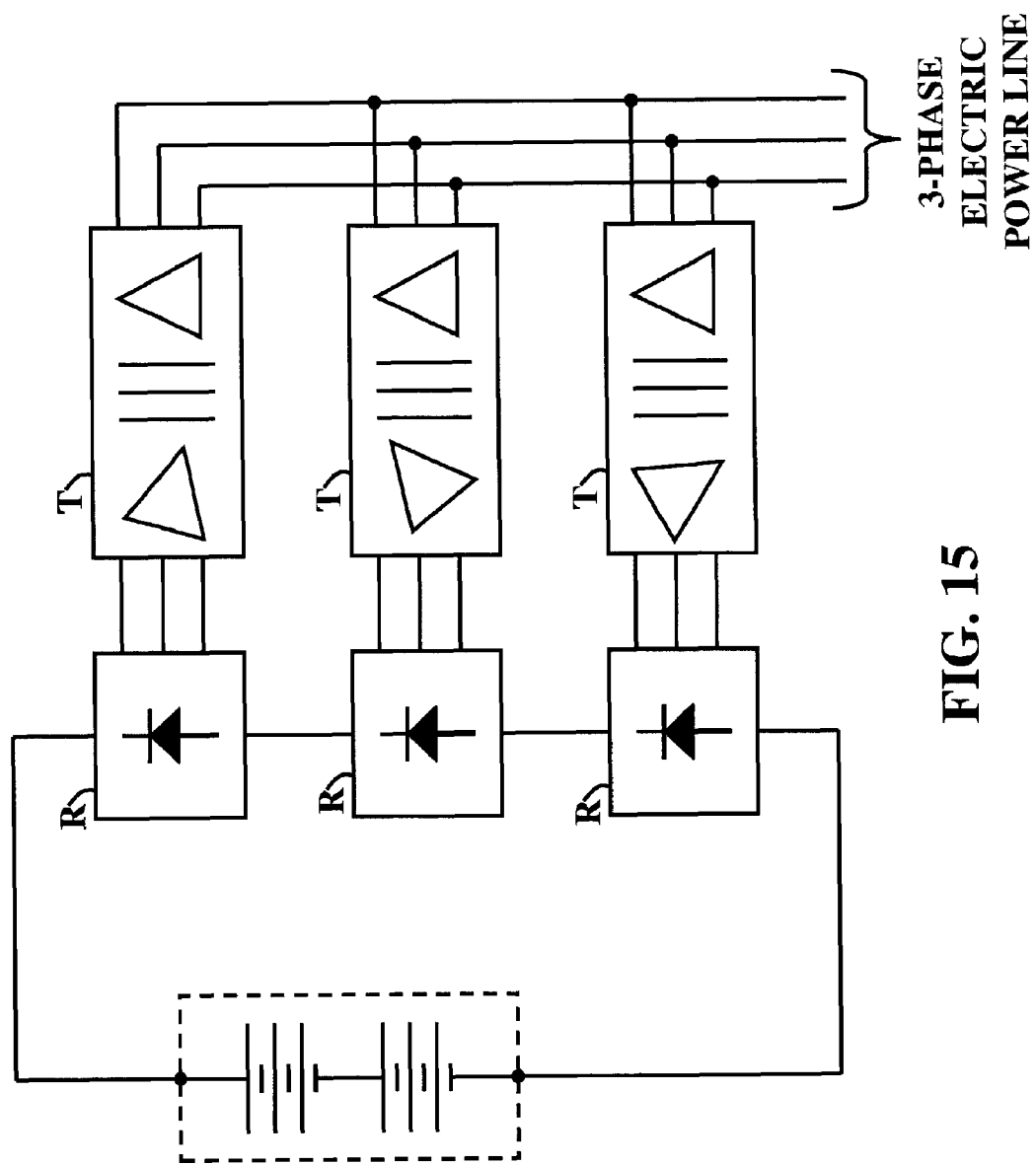
FIG. 15 illustrates one example of electric power feed to an electrolyser of the present invention, according to a preferred embodiment.

The electrical feed of the electrolyser can use existing devices described herein. In a preferred embodiment, FIG. 15 illustrates the use of several rectifiers connected in series, each fed from phase shifting transformers. This circuit design leads to a high efficiency rectifier that converts AC (alternating current) voltage in the first EDL to DC (direct current)—required for operation of electrolysers.

The high voltage stack of the electrolyser can be divided into several stacks working in parallel for convenience of construction, maintenance, and safety. The same can be done with the rectifier. Semiconductor rectifiers can be paralleled to carry higher current, or each of such parallel rectifiers can be connected to a separate electrolyser stack. The same can be done with the transformers.

Figure 16:
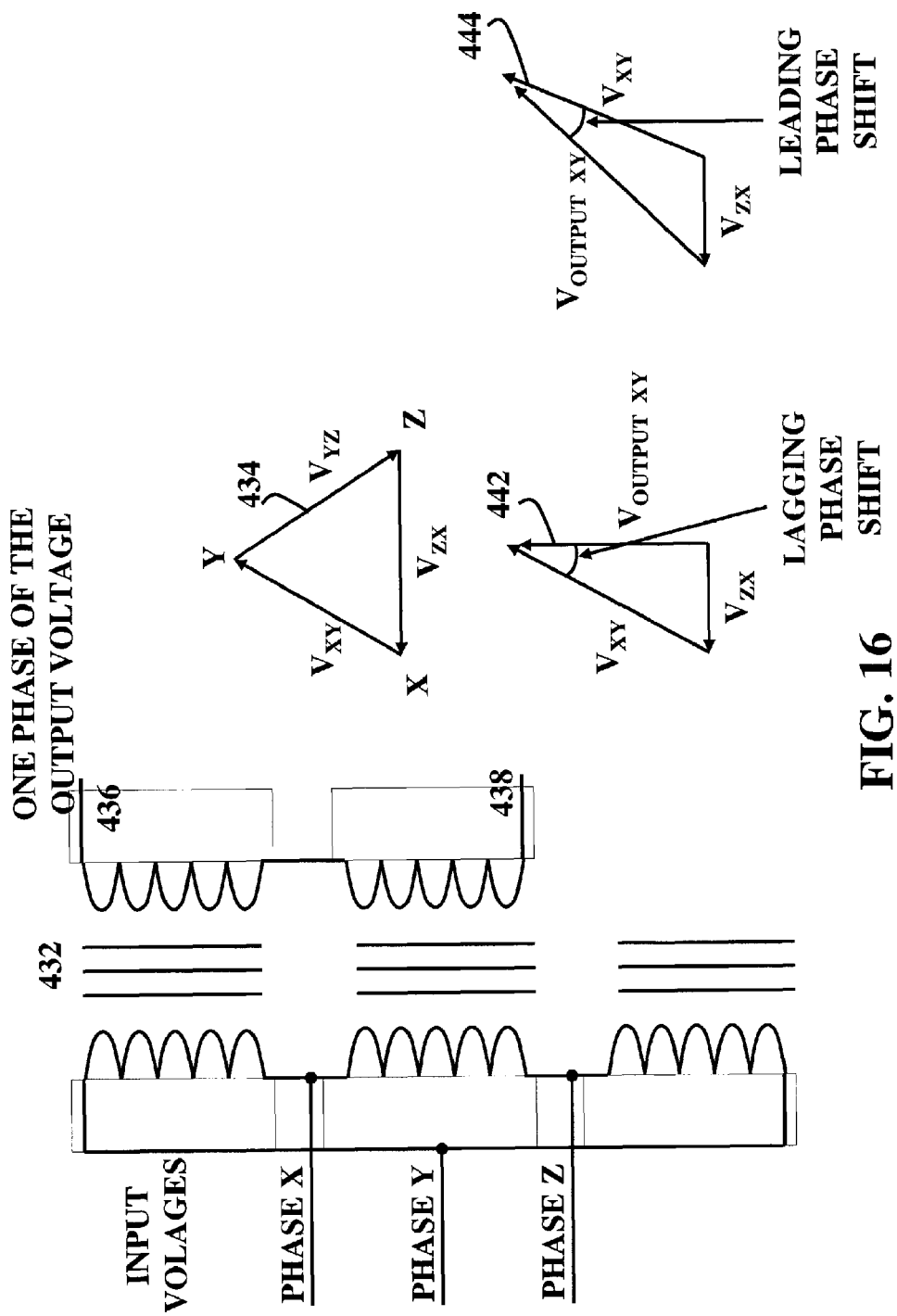
FIG. 16 illustrates various winding arrangements of phase shifting transformers.

Referring to FIGS. 15 and 16, three transformers are used, but these transformers do not have to have any phase shift, and can be used in many quantities. The high voltage electrolyser cell stacks can even be fed directly without any transformer if output voltage of the electric power plant is compatible with the stack required voltage.

The phase shifting transformers use more than one phase on the input with phase shifts between phases not 0° or 180°, but usually 120° or 240°, as common in three-phase electrical distribution. In an example, transformer 432 with three input phases is fed by the electric power distribution line (EDL). The phase relationship is shown on the vector diagram 434. This is a typical delta phase arrangement.

The output (secondary) winding of one phase of the three-phase transformer 432 comprises typically two separate windings connected in series. One winding 436 is wound over one input phase winding, and the other 438 is wound over another input phase winding. Phase of voltage in each secondary winding is in phase with the input voltage of the winding over which this secondary winding is wound.

By selecting the ratio of number of turns, or transformer ratio, between these two windings and polarity, one can achieve many desired phase shifts. The diagram 442 shows a ratio in voltage transformation and a polarity of voltages transformed from its underlying input phase voltages of equal value and 120° phase shift. The combined voltage in output phase XY is phase shifted in comparison with the input voltage in phase XY. In this example, it is lagging. The diagram 444 shows change of polarity on the output which makes this phase shift leading.

Rectifier

The present system can utilize a semiconductor rectifier, being a typical three-phase rectifier. Instead of semiconductors, vacuum tube-based rectifiers that can rectify much larger current can also be used. Semiconductors can be paralleled using known circuits to achieve reasonable sharing of current in paralleled semiconductors. The rectifier can also be made for more phases by adding more phase legs and connecting all phases from all phase shifting transformers in parallel.

Output Voltage

The phase shifting transformers and rectifiers described herein are combined into a circuit shown in FIG. 15. In a preferred embodiment, three rectifier circuits R are shown connected in series, each fed from phase shifting transformers T. This circuit leads to a rectified DC voltage with very slight pulsation of voltage, 1.5% peak-to-peak, which is beneficial for sizing of all components in the electrical circuits of the electrolyser. There are other ways to make connection, for example, through paralleling these three circuits. Another alternative is to use a different number of circuits, with more or less phases and corresponding lower or higher pulsation of output voltage.

Figure 17:
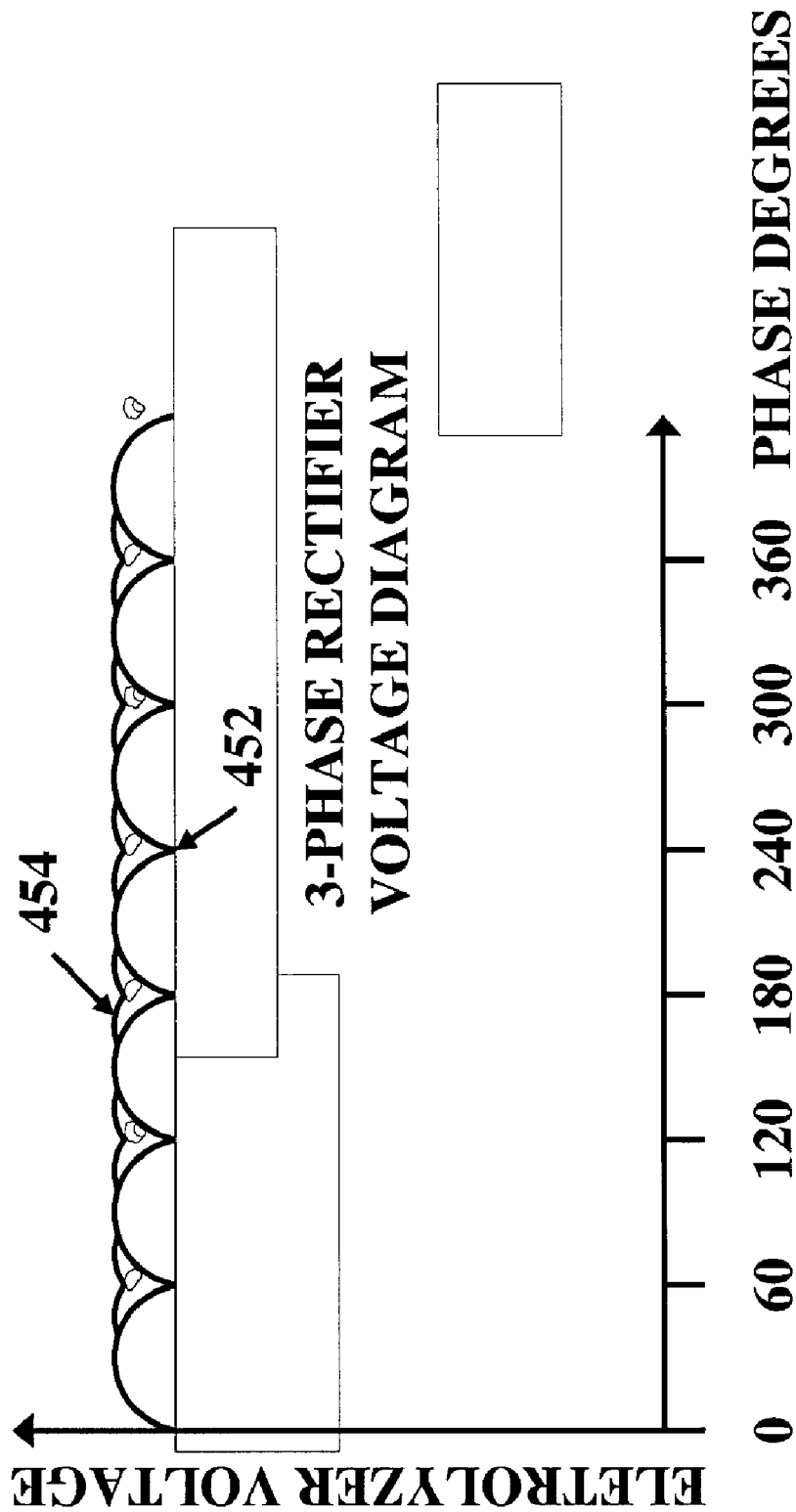
FIG. 17 is a graph of electrolyser voltage according to a preferred embodiment of the present invention.

The resulting voltage is a sum of voltages from all three rectifiers. FIG. 17 illustrates, to scale, a voltage diagram 452 from one three-phase rectifier. For one period of the electric distribution line voltage (360°), there are six rectified tops of sine waveform, from positive and negative halves of each phase. The depth of voltage pulsation is $\cos(30°)=0.866$, or 13.4% of the peak voltage value. In the circuit with three rectifiers, the phase shift is maintained between phases to be 20° leading and lagging. In this case, the depth of voltage pulsations is $\cos(10°)=0.985$, or 1.5% of the peak value—the voltage diagram 454.

This pulsation is adequate for low current fluctuation in the electrolyser cells that, in turn, leads to higher utilization of the surfaces of the cells and lower power rating of transformers and rectifiers.

The high voltage stack of the electrolyser can be divided into several stacks working in parallel for convenience of construction, maintenance and safety, among other issues. The same can be done with a rectifier. Semiconductor rectifiers can be paralleled to carry higher current, or each of such parallel rectifiers can be connected to a separate electrolyser stack. The same can be done with the transformers.

Post-Processing

Figure 18:
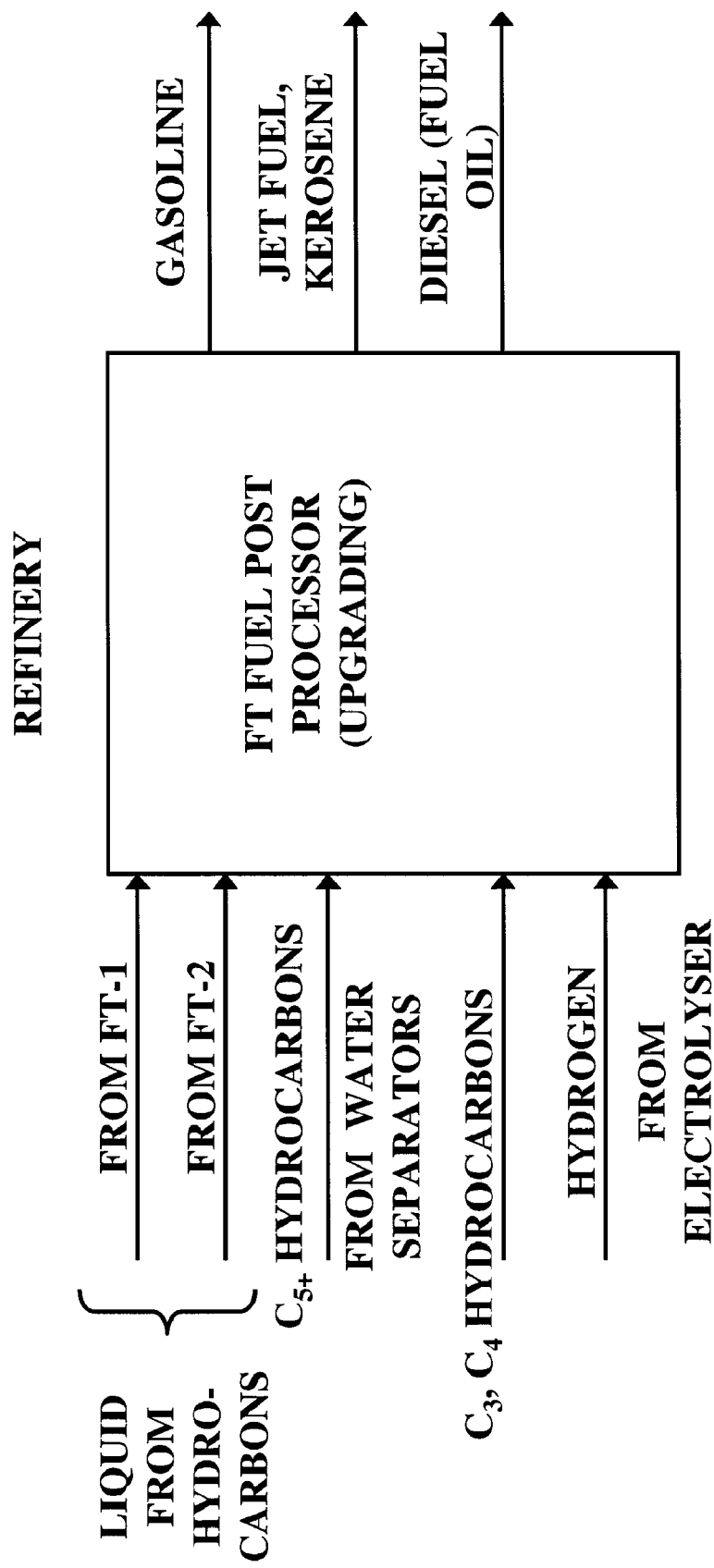
FIG. 18 shows a fuel post processor system according to a preferred embodiment of the present invention.

Typically, the output of the conversion step 300 is a spectrum of hydrocarbons. A post-processing step 500 is provided to upgrade the hydrocarbons to the desired mixture of fuels F. The process can use existing technologies to convert hydrocarbon streams from the FT subassembly into desired fuels, and other products if so desired. FIG. 18 shows inputs in and outputs from such a facility. Typical upgraders will involve hydrocracking of FT heavy ends (in the lubes and wax range) to fuels primarily in the diesel and gasoline range. It should be noted that a refinery's need in hydrogen can be preferably satisfied with hydrogen from the electrolyser.

Burner-Generator

Figure 19:
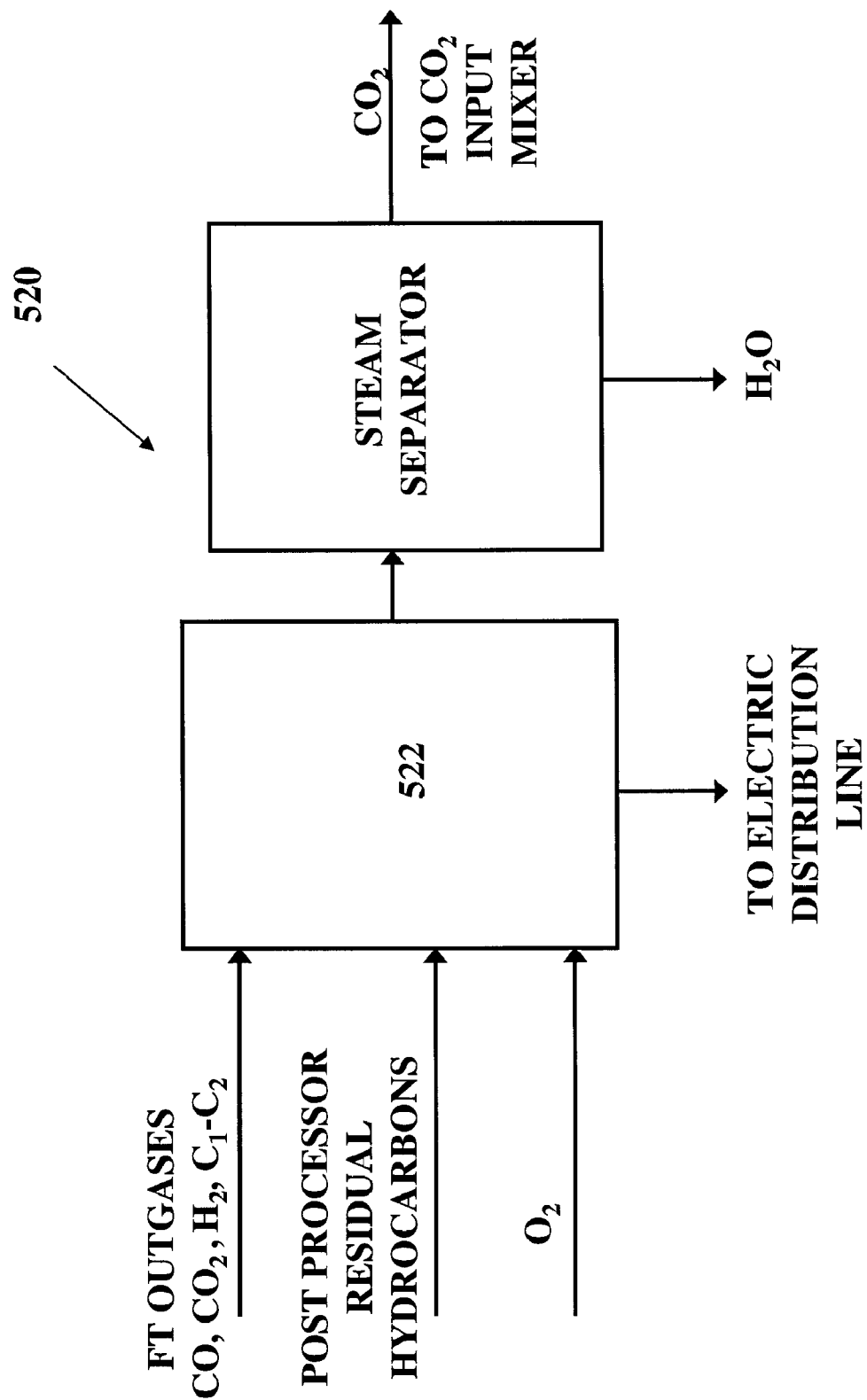
FIG. 19 illustrates a burning system according to a preferred embodiment of the present invention.

In a preferred embodiment, a burning system 520 is shown in FIG. 19. The inputs to the burner can be vented gases from the FT reactor assembly, and/or residues from the refinery, and/or natural gas compounds. All these compounds are burned in the gas turbine-generator 522 with a relatively small portion of oxygen coming from the electrolyser. The output gases from the turbine exhaust are steam and carbon dioxide.

Steam is separated into water and residue carbon dioxide—that is fed back to a gas mixer with incoming carbon dioxide. This is yet another gas recycling loop of the system of the present invention 100.

Electric power produced by the generator is fed back to the electric power line and further to the electrolyser.

As a result, there is little to no waste material coming out of the system, only the desired fuels and oxygen in the amount to combust them.

As electric power produced is recycled back into production of hydrogen, this apparatus is less sensitive to incomplete conversion of syngas in the FT subassembly. Also, as carbon dioxide is recycled back to the input of the RWGS subassembly, this apparatus is less sensitive to separation efficiency of carbon dioxide separation in the RWGS subassembly.

Gas Separation and Processing Generally

In the presented processes, there are numerous places where certain gases must be separated from a gas mixture, or simply gas parameters, for example, temperature and pressure, must be adjusted to make it compatible with an upstream process.

One advantage of the present system is its energy efficient gas processing. There are basically two energy efficient thermodynamic processes used for gas processing. The first one is an adiabatic process when all external work is converted to or from gas energy. The second one is an isothermal process, when all external work is either converted into heat or derived from heat.

It will be understood by those of ordinary skill in the art that these are ideal processes. In practical applications, there are some temperature variations in an ideally isothermal process. These variations make the process near isothermal. As used herein, the term "isothermal" shall include an operation or process that is "near", "approximate" or other such terms to modify the ideal isothermal operation, and more specifically relates to a change in absolute temperature measured in ° K in a practical isothermal process in a range of plus and minus 10% from an ideal isothermal temperature. Similarly, in practical adiabatic processes, some heat energy is involved in addition to the mainly external work performed. Such "practical" adiabatic processes are similarly "near" and/or "approximately" adiabatic, and when involved heat energy is also in a range of plus and minus 10% of the amount of external work energy from the ideal process.

The present invention preferably includes one or more units for changing the pressure of a gas "isothermally", which incorporates a range of plus and minus 10% from the ideal isothermal process temperature. The present invention preferably includes one or more units for changing the temperature of a gas "adiabatically", which incorporates a range of plus and minus 10% from the ideal adiabatic process, as described above.

Figure 20:
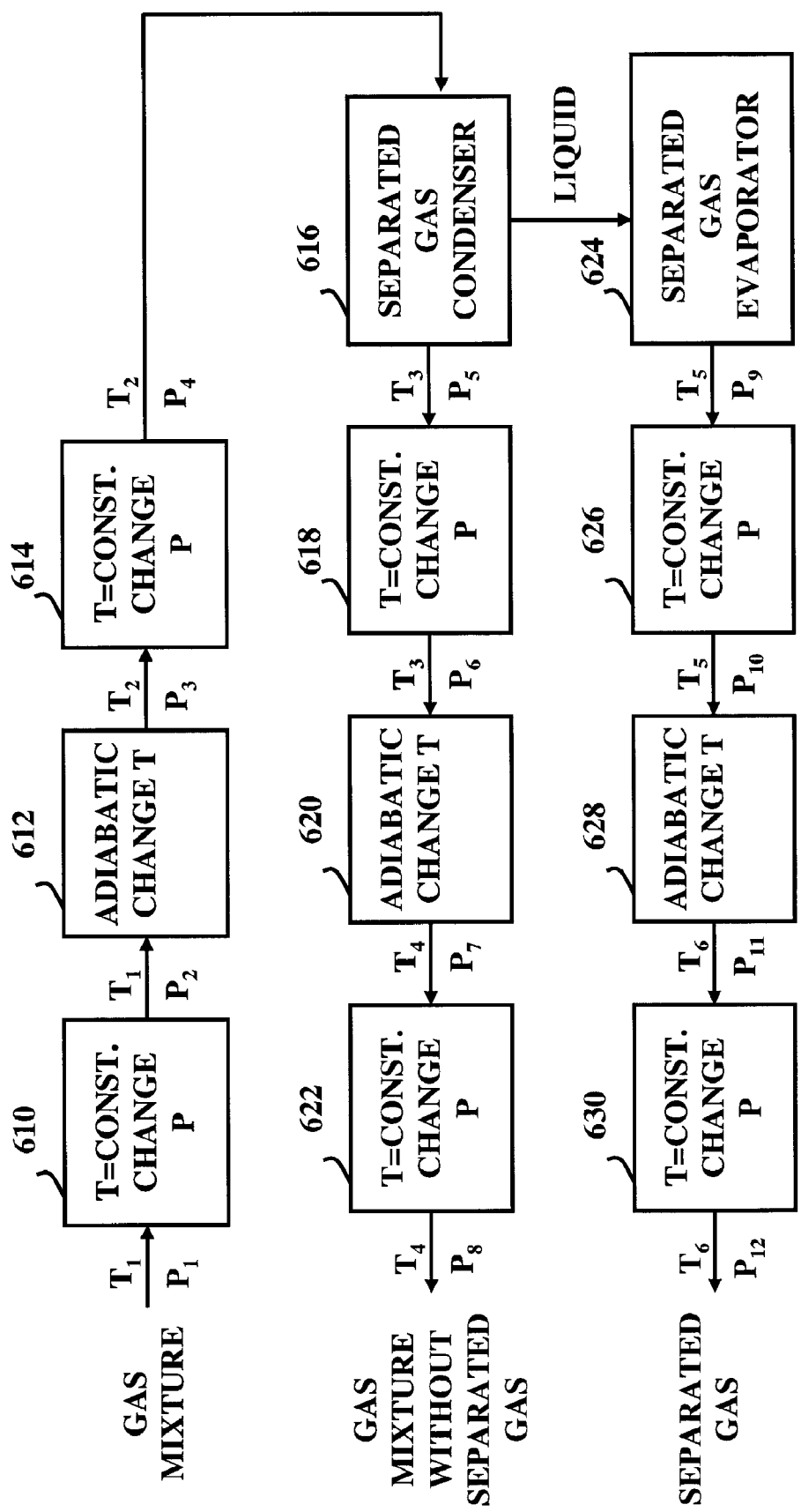
FIG. 20 illustrates a flow chart of an energy efficient electro-mechanical gas separation process.

As shown in FIG. 20, a diagram of a universal gas separation using these two processes is presented. First, three processes 610 through 614 condition a gas mixture for separation of one or more of its components by condensation in the condenser 616. Then, three processes 618 through 622 condition the residual gas mixture for further processing. The separated gas or gases is in liquid phase in the condenser 616. If it is desired for further processing in a gaseous phase, then some gases are evaporated in the evaporator 624, and then are conditioned for further processing by processes 626 through 630.

Each group of processes, either 610 through 614, or 618 through 620, or 626 through 630, are identical in their principal functioning. They are centered on conditioning of gases for adiabatic processing to avoid any gas mixture component from changing phase, either to liquid or solid. Each process begins with adjusting pressure isothermally. Next, the gas or mixture of gases is processed adiabatically to change temperature. After this process, the final isothermal process changes pressure as required for further processing. In summary, pressure is changed isothermally, and temperature adiabatically.

Figure 21:
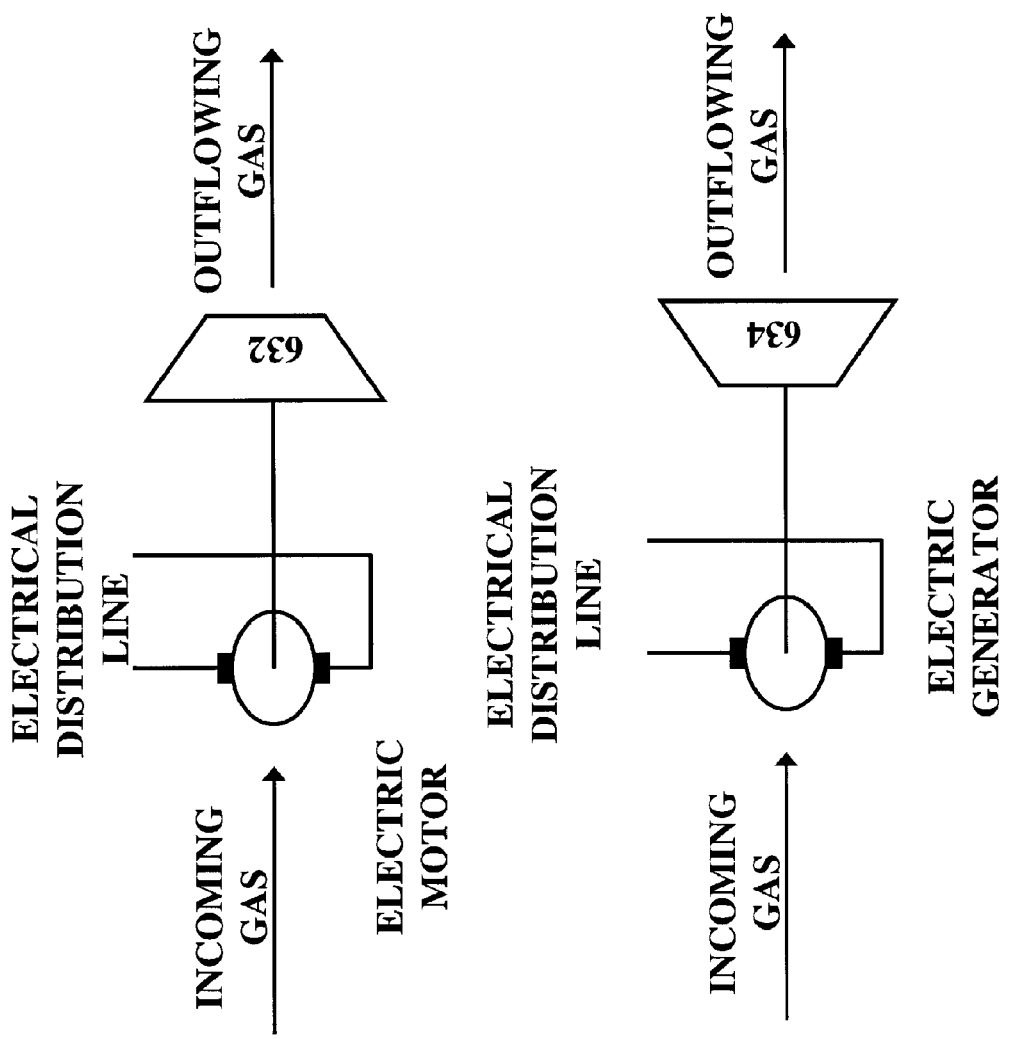
FIG. 21 shows adiabatic machines according to a preferred embodiment of the present invention.

FIG. 21 shows adiabatic machines, one to increase temperature and pressure by compression using power from an electric distribution line, and one to decrease temperature and pressure and generating power to that line. In a preferred embodiment, an electric power line is used as both a source and the recipient of power delivered to or derived from adiabatic processes. The compressor 632 is preferred to be a turbine driven by an electric motor, and the expander 634 is also preferred to be a turbine driving an electric power generator. Such generator must be synchronized to the frequency and phase of voltage in the electric power line and to match that voltage value, very similar to other generators used in electric power grid. Other types of compressors and expanders beside turbine type can be used as well.

Figure 22:
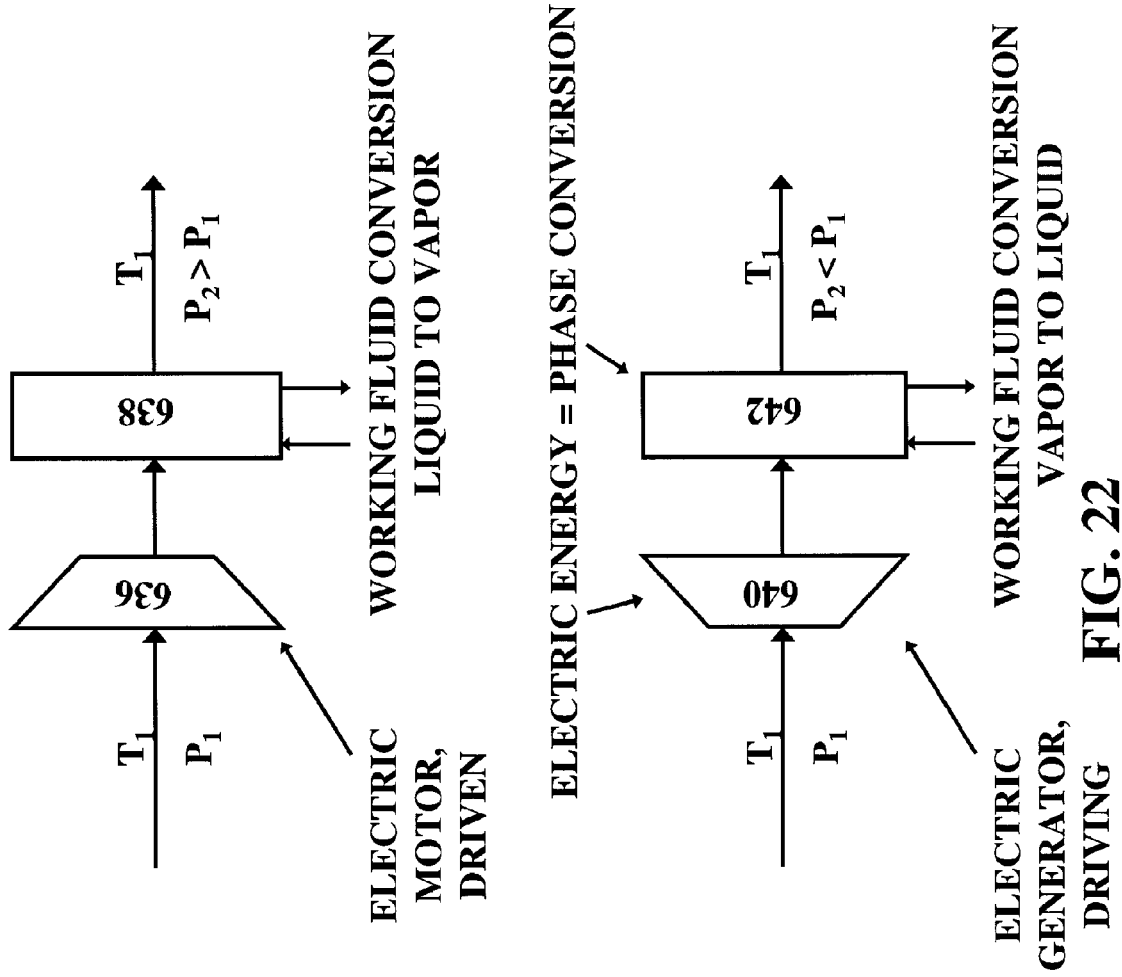
FIG. 22 shows isothermal gas mixture pressure changers according to a preferred embodiment of the present invention.

FIG. 22 shows isothermal machines, one to increase pressure and one to decrease it. In the machine to increase pressure, a compressor 636 driven by electric motor is used, and the resulting gas mixture receiving power from the electric power line is both compressed and cooled. The heat is removed by a cooler 638. The amount of heat removed is equal, theoretically, to the electric energy delivered from the electric power line. For large changes in pressure, several serially-connected isothermal pressure changers can be used. In this case, they are called interleaved compressors. They are interleaved with coolers.

The opposite process is used for reducing pressure isothermally. In this case, the gas mixture is expanded and this reduces both, its pressure and temperature. Change in temperature is compensated by heating. Again, the amount of heat delivered to the mixture is equal, theoretically, to the amount of energy delivered to an electric power line by the electric generator driven by an expander 640. It is preferred to use turbines as both, compressors and expanders, but other types can be used as well.

The system uses coolers 638 and heaters 642 in the isothermal machines. These are, in essence, heat exchangers. For isothermal operation, it is preferred to use phase conversion of a working fluid to deliver or remove heat to and from gases passing through these heat exchangers. This enables the system to process heat with near zero change in temperature.

Returning to FIG. 7, several examples of energy distribution lines used in the present invention are shown. A first is an electric power line that delivers power to all uses—the electrolyser and all electric motors—and receives power from all sources—the electric power plant and all internal electric power generators.

Other lines are heat distribution lines. They deliver heat or accept heat from various sources and uses of heat. Each line preferably includes two parts, a liquid part and a vapor part. When heat must be delivered from a line, then vapors are taken into a heat exchanger dedicated to accept this heat, condense in this heat exchanger and release heat, and condensed liquid is delivered in the other half of a heat distribution line. When heat must be accepted, the reverse process is used, liquid is evaporated into vapors.

In the present process, examples of temperatures at which phase conversions occur are:

a) At a temperature of the RWGS reactors—heat distribution line RWGS (RWGS-line);

b) At a temperature of the FT reactors—heat distribution line FT (FT-line);

c) At a temperature of water in the electrolyser—heat distribution line E (E-line);

d) At ambient temperature—heat distribution line A (A-line); and e) At a temperature of carbon dioxide separation—heat distribution line C (C-line).

The following are examples of working fluids for these lines:

a) Ethylene glycol for RWGS-line;

b) Water for FT-line, or a substitute at higher temperature, like ethylene glycol;

c) Water for E-line;

d) Ammonia for A-line; and e) Ethylene for C-line.

Figure 23:
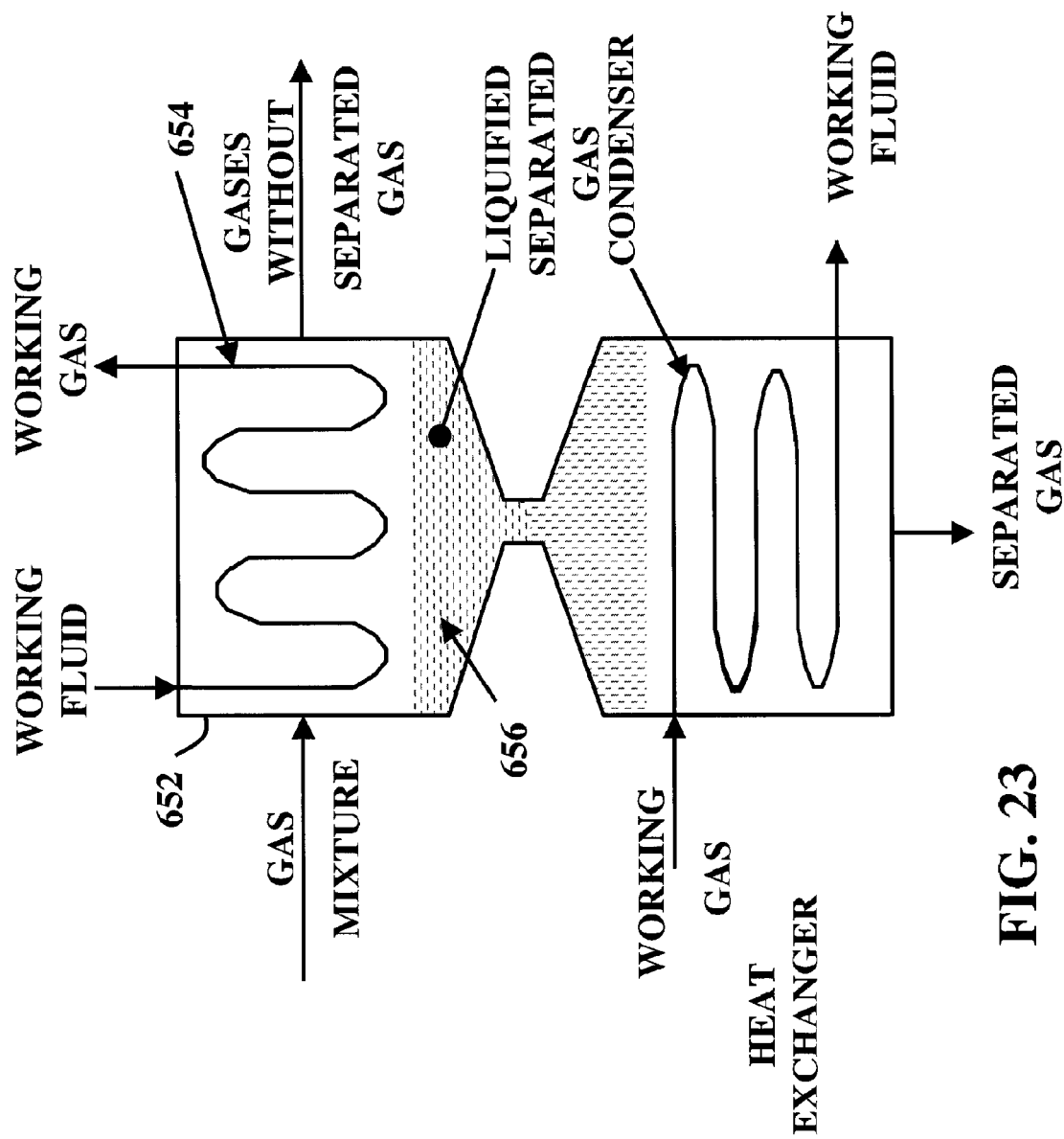
FIG. 23 illustrates a combination condenser and evaporator according to a preferred embodiment of the present invention.

FIG. 23 shows a combination of a condenser and evaporator, machines 616 and 624 on FIG. 20. The condenser part is a heat exchanger 652 through which a gas mixture is passed. Heat from the gas mixture is removed by evaporation of a working fluid via an evaporator 654, and this causes condensation of a desired component of a mixture, pre-conditioned for such condensation, in a collector part 656 of the heat exchanger 652. Liquefied gas is collected and expunged into an evaporator, where the reverse process takes place. Heat is delivered to the evaporating heat exchanger from the same heat distribution line. Theoretically, this process of condensation and evaporation of the separated gas is energy neutral.

Figure 24:
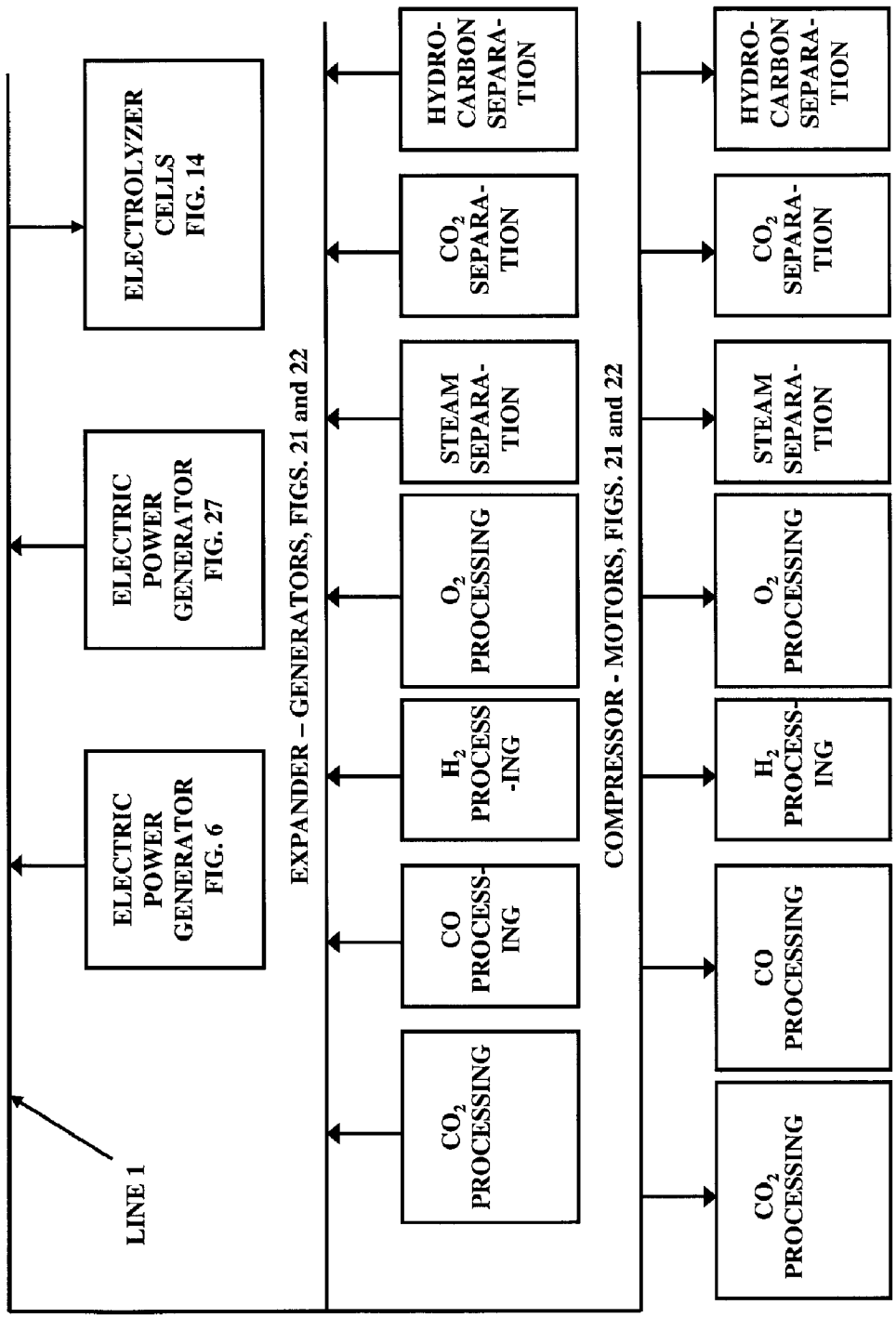
FIG. 24 illustrates electrical energy distribution and recycling lines according to a preferred embodiment of the present invention.

FIG. 24 shows how electric energy is distributed and recycled. Line 1 is three-phase electric distribution line. It is fed by the main source of electric power per FIG. 6, preferable powered by a fast breeder type nuclear reactor. It is also powered from residual energy released in the FT reactors by the generator 716 on FIG. 27. Electrolyser cells per FIG. 14 are major users of the electric power. All expander-generator devices used in adiabatic temperature changes and isothermal pressure changes are feeding this line, and all compressor motors used in adiabatic temperature changes and isothermal pressure changes are fed from this line. Naturally, all other accessory motors and generators are attached to this line. We show some areas of processing where various motors and generators are used.

Figure 25:
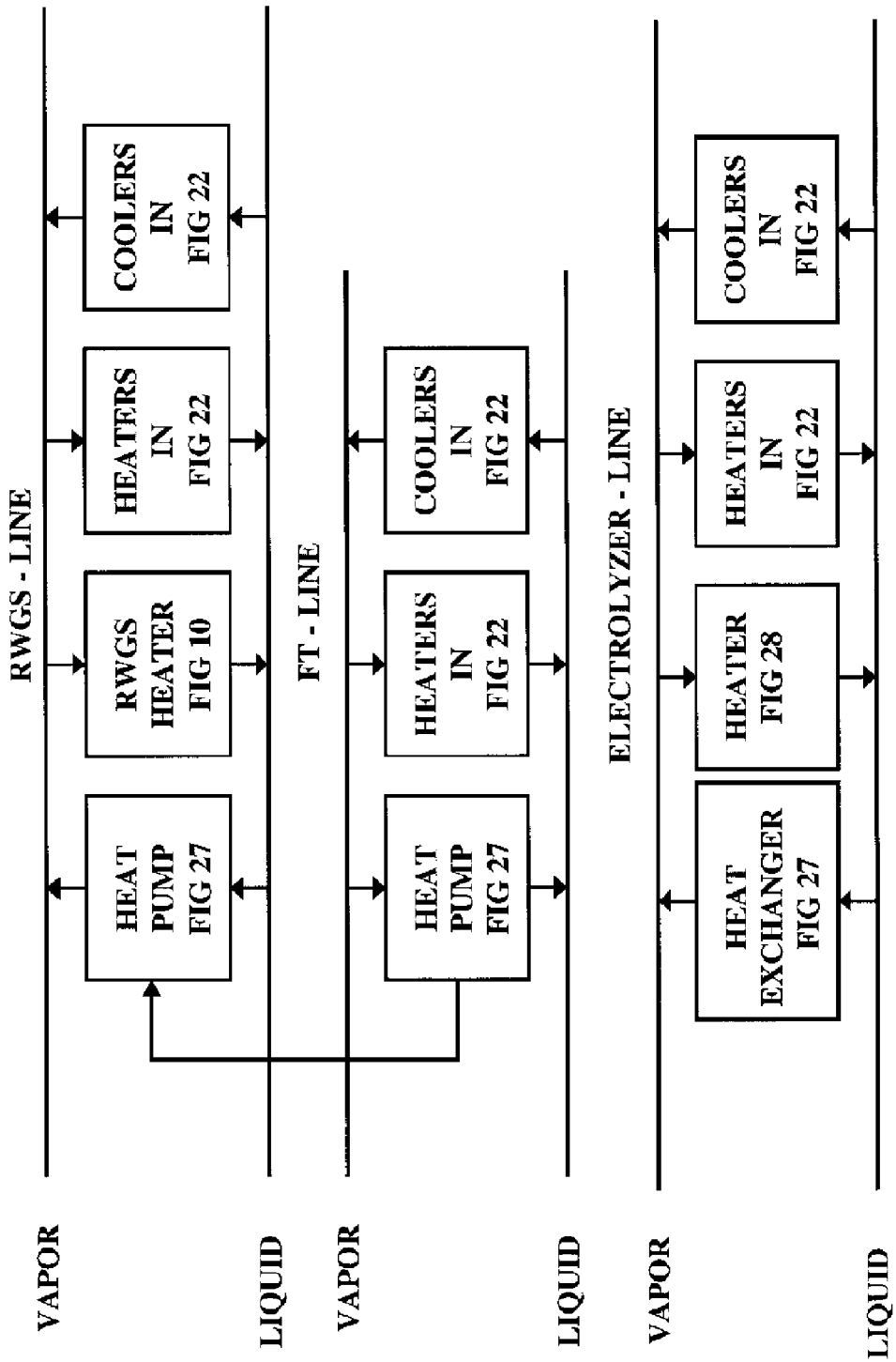
FIGS. 25-26 illustrate heat distribution and recycling lines according to a preferred embodiment of the present invention.

FIG. 25 shows how heat distribution and recycling lines are used. In the RWGS-line, heat is delivered by a heat pump 710 shown on FIG. 27, heat being derived from energy released in the FT reactors. This heat is used to heat the RWGS reactors as depicted on FIG. 10. All heaters and coolers shown on FIG. 22 that are used in isothermal pressure changes of incoming and outflowing gases in these reactors use or deliver heat from or to this line.

Figure 27:
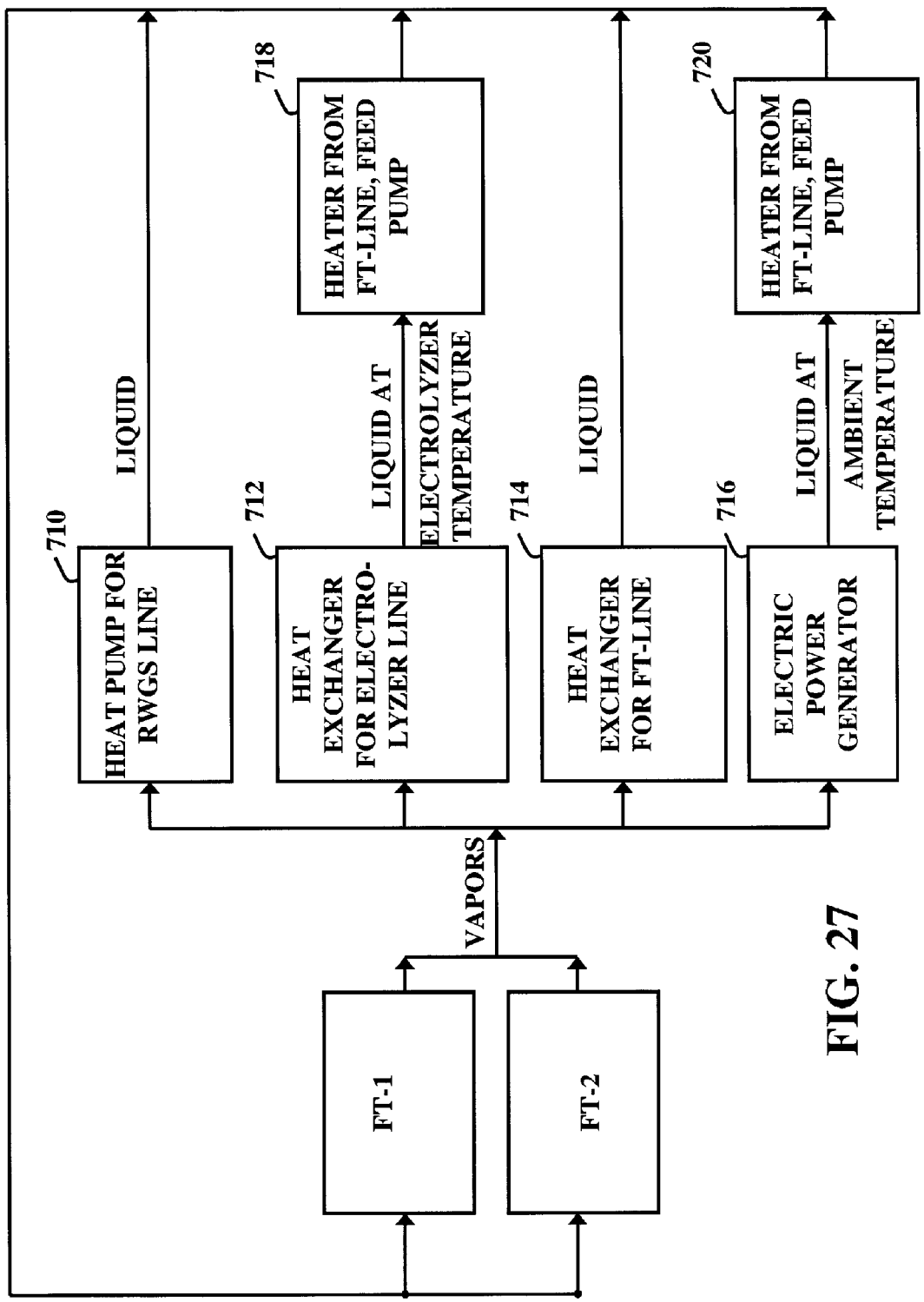
FIG. 27 shows a cooling loop for FT reactors according to a preferred embodiment of the present invention.

In the FT-line, heat is delivered via the heat exchanger 714 on FIG. 27, heat being derived from energy released in the FT reactors. All heaters and coolers shown on FIG. 22 that are used in isothermal pressure changes of incoming and outflowing gases in these reactors use or deliver heat from or to this line.

In the Electrolyser-line, heat is delivered via the heat exchanger 712 on FIG. 27, heat being derived from energy released in the FT reactors. Main user of heat is heater/boiler for electrolyser water on FIG. 28. All heaters and coolers shown on FIG. 22, that are used in isothermal pressure changes of incoming and outflowing gases in the electrolyser, use or deliver heat from or to this line.

Figure 26:
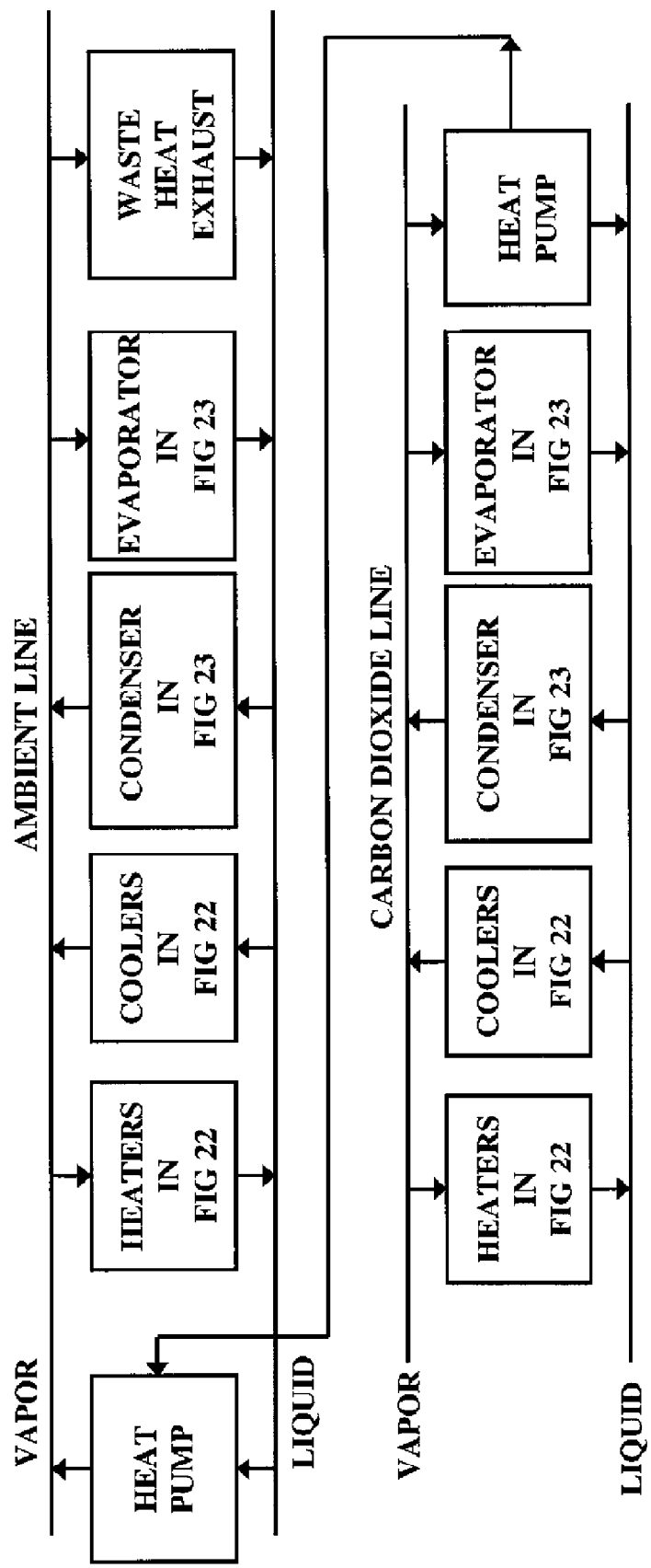

FIG. 26 shows two more heat distribution and recycling lines. One is a line operating at ambient temperature. All heaters and coolers shown on FIG. 22, that are used in isothermal pressure changes of incoming and outflowing gases at ambient temperature, use or deliver heat from or to this line. All evaporators and condensers shown on FIG. 23 of a gas separator like steam are either getting heat from this line or deliver heat to this line. There is also a receiving end of a heat pump bringing excess heat from the carbon dioxide separation line. All unused heat in the overall plant will be delivered to this line and dissipated primarily as waste heat.

The other line on FIG. 26 is the carbon dioxide separation line. All heaters and coolers shown on FIG. 22, that are used in isothermal pressure changes of incoming and outflowing gases at a temperature close to carbon dioxide separation by liquefaction, use or deliver heat from or to this line. All evaporators and condensers shown on FIG. 23 for carbon dioxide separation are either getting heat from this line or deliver heat to this line. The carbon dioxide separation line is used not only for separation of carbon dioxide from effluent gas on the output of the RWGS reactor, but also for separation of $C_3$ and $C_4$ hydrocarbons and residual carbon dioxide in the effluent gas of the FT reactor. There is also an excess heat collecting end of a heat pump taking excess heat from the carbon dioxide separation line into the ambient line.

Preferred Gas Separation and Processing

Carbon dioxide can be delivered to this apparatus typically by a pipeline at a typical gas pipeline pressure of 50 bar and at ambient temperature. For input into the RWGS subassembly, carbon dioxide shall be heated to the RWGS temperature, 400° C. in this embodiment, and operating pressure like 25 bar. To accomplish this, all or some of the processes 610 through 614 on FIG. 20 can be used.

Hydrogen from the electrolyser is coming out at 130-150° C. temperature and 20-30 bar pressure, and must be conditioned for inputting it into the RWGS subassembly. To accomplish this, all or some of the processes 610 through 614 on FIG. 20 can be used.

On the output of each RWGS reactor, steam must be separated. This must be done at low temperature in order to remove most of the steam. In this embodiment, this is ambient temperature. To accomplish this separation, all or some of the processes 610 through 614 and the process 616 on FIG. 20 can be used. Also, processes 614 and 616 can be combined in one machine. After separation, gases must be reconditioned for further processing using all or some of the processes 618 through 622 of FIG. 20.

Carbon dioxide present in the effluent stream on the output of the third steam separator in the RWGS subassembly can be separated using a variety of processes such as amine absorption, carbonate absorption, pressure swing absorption, adsorption, gas permeation, additive-assisted cryogenics (e.g., Ryan-Holmes), or three phase cryogenics (CFZ). When liquefaction is used to separate majority of carbon dioxide, then all or some of the processes in FIG. 20 can be used. In this embodiment, temperature $T_1$ is ambient, temperature of condensation $T_3$ is in −55° C. range, temperature $T_4$ is equal to the FT reactor temperature, 220° C. in this embodiment, and temperature $T_6$ is equal to the RWGS reactor temperature, 400° C. in this embodiment.

Hydrogen to the FT reactor subassembly is coming from the electrolyser at 130-150° C. temperature and 20-30 bar pressure, and must be conditioned for 220° C. and 20 bar as preferred in this embodiment. To accomplish this, all or some of the processes 610 through 614 on FIG. 20 can be used.

If carbon monoxide is supplied to the FT subassembly, it is likely to be delivered via a pipeline at a typical pressure of 50 bar and at ambient temperature. For input into the FT subassembly, carbon monoxide shall be heated to the FT temperature, 220° C. in this embodiment, and expanded to operating pressure like 20 bar. To accomplish this, all or some of the processes 610 through 614 on FIG. 20 can be used.

On the output of each FT reactor steam is separated at ambient temperature in this embodiment. To accomplish this separation, all or some of the processes 610 through 614 and the process 616 on FIG. 20 can be used. Also, processes 614 and 616 can be combined in one machine. After separation before the second FT reactor, gases must be reconditioned for further processing using all or some of the processes 618 through 622 of FIG. 20.

After the second FT reactor, steam along with heavier residual hydrocarbons is also separated at ambient temperature. To accomplish this separation, all or some of the processes 610 through 614 and the process 616 on FIG. 20 can be used. Also, processes 614 and 616 can be combined in one machine.

Following this separation, $C_3$ and $C_4$ hydrocarbon gases must be separated using all or some of the processes 610 though 616 on FIG. 20. At low content of carbon dioxide and syngas, condensation can be at ambient temperature. Otherwise, it must be at lower temperature rather than higher pressure. In a preferred embodiment, there is C-line for condensation of carbon dioxide and it is used for condensation of $C_3$, $C_4$, and $CO_2$ in this mixture. Consequently, by changing pressure of a separated liquid, $CO_2$ will evaporate first and be processed through process 624 through 630 of FIG. 20 to be input into the RWGS assembly. The condensate of $C_3$ and $C_4$ compounds can be used in liquid form or, if desired, evaporated and conditioned to gas using all or some of the processes 624 through 630 on FIG. 20. Finally, the residual of $C_1$ and $C_2$ hydrocarbons, syngas, and other gases must be conditioned for input into a controllable release 322, again using all or some of the processes 618 through 622.

Then, in the recycling loop of the FT subassembly, the gases must be converted from an input condition of ambient temperature and pressure in the controllable release to the input conditions of the first FT reactor—220° C. and 20 bar in this embodiment. Again, all or some of the processes 610 through 614 on FIG. 20 can be used.

Finally, if oxygen from the electrolyser is to be delivered for uses outside of this plant, then it also must be conditioned. It is coming out from the electrolyser at a temperature of 130-150° C. and pressure of 20-30 bar. For delivery by a pipeline, oxygen must be conditioned to a typical pipeline pressure of 50 bar and ambient temperature. To accomplish this, any or all processes 610 through 614 on FIG. 20 can be used.

Similarly, for oxygen delivery to the burner-generator, steam separation there, and delivery of carbon dioxide back to the input, the processes described herein for such purposes and presented on FIG. 20 can be used.

Similarly, hydrogen for use in refining can be processed in the same way as described, but for different output temperature and pressure.

Recycling of Heat from the Fischer-Tropsch Subassembly

Exothermic heat of the reaction in Fischer-Tropsch reactors is the major source of energy to drive all gas processing in this plant and source of additional electric energy for water electrolysis. On FIG. 27, we show a cooling loop for the FT reactors. In this embodiment, vapors of the working fluid to cool the reactors are distributed for condensation in several heat machines.

The first machine 710 is a heat pump pumping heat derived from condensation of vapors to the RWGS heat distribution line. On the output of the condenser, working fluid is in a liquid phase at condensation temperature.

The second machine is a heat exchanger to heat water to the electrolyser temperature. Again, this heat is delivered by condensation of a working fluid. This process can use all or some of the processes 610 through 616 on FIG. 20, and the electric power that is generated is delivered through an electric power distribution line to the electrolyser. The outflowing liquid is reheated from the FT-line and compressed to match the FT reactors temperature and pressure.

The third machine is delivering heat into an FT heat distribution line by condensation if such heat is required to balance heat flow in this line.

The residual vapors are driving an electric power generator 716 with outlet temperature at preferably an ambient level. The electric energy is delivered to the electric power line and via this line to the electrolyser to add to the energy delivered by the electric power plant. Liquefied working fluid is recompressed and reheated to the pressure and temperature of this liquid coming out from other condensers, and returned back to the FT reactors for cooling them by evaporation. Water is reheated using heat from FT heat distribution line. The example of the working fluid is water. At higher FT operating temperatures, other fluids like ethylene glycol can be used.

Water Feed to the Electrolyser

Figure 28:
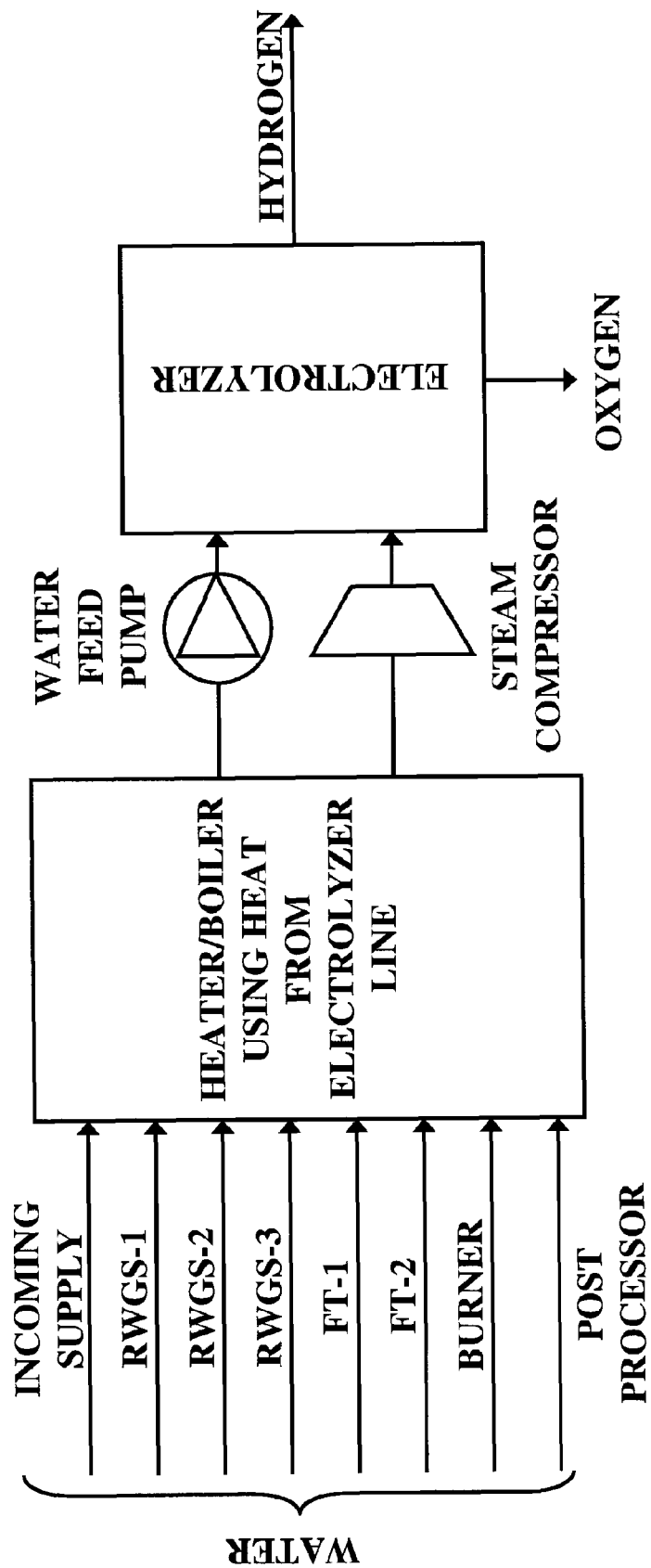
FIG. 28 shows steam/water feed to the electrolyser according to a preferred embodiment of the present invention.

On FIG. 28, we show processing of water to feed the electrolyser. Water is coming from multiple sources. It is preferred to recycle as much water from the other processes in this plant, specifically from the RWGS reactors steam separators, from the FT reactors steam separators, from the burner-generator steam separator, and any water collected in refining. All these streams of water and incoming water are at different temperatures, most of them around ambient temperature, but the electrolyser water is at 130-150° C. and compressed to 20-30 bar. Additionally, at above certain high current density the electrolyser must be cooled, and at below certain current density the electrolyser must be heated.

In the preferred embodiment, we use water heating/boiling and compression to condition this water to such temperature and at the electrolyser pressure that this water either absorbs electrolyser excess heat or delivers the excess heat. When in the mode of heat delivery, part of it can be even vaporized to deliver more heat to electrolyser water via condensation. When in the mode of heat absorption, water temperature is lower than in the electrolyser. For vapor compression, all or some of the processes 610 through 614 on FIG. 20 can be used. For water heating, E-line heat is used.

Main Controls

Electronic control is inherent to the system of the present invention 100. Controls include a physical layer and control computers with software incorporating control algorithms. The physical layer comprises sensors and actuators. Each functional block of the present invention 100 has sensors pertinent to its function—like gas flow, or specific gas or liquid flow, pressure, temperature, velocity, among others.

The actuators are pumps for condensers and evaporators, electric generators driven by expansion turbines, electric motors driving compressors, gas and liquid flow throttles or valves, mechanical regulators like variable vanes in turbines, and others as required for performance of a certain function.

It is preferred to use distributed computer processing with redundancy to assure safety and timeliness of control.

Figure 29:
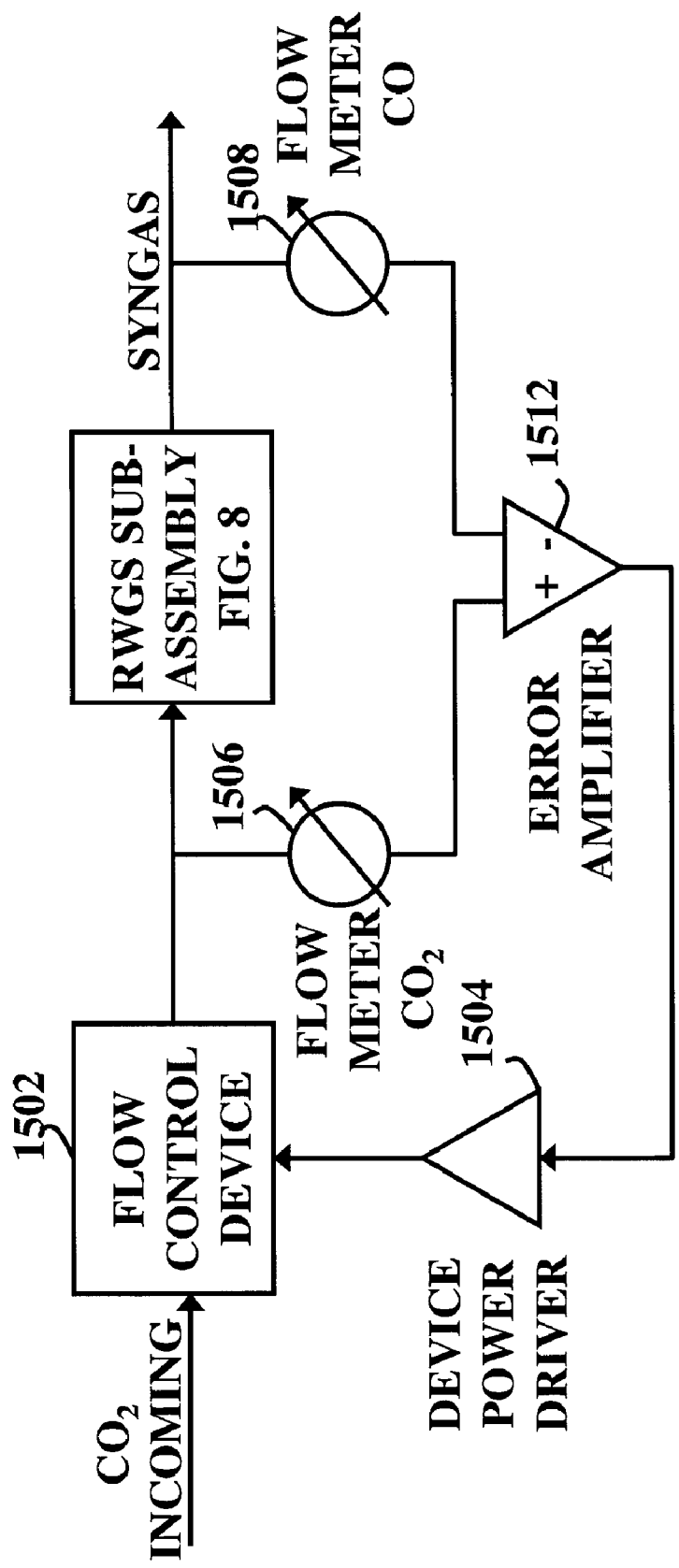
FIG. 29 shows the RWGS subassembly main loop control according to a preferred embodiment of the present invention.

A list of main control functions of this invention 100 include:

Control complete conversion of incoming carbon dioxide into carbon monoxide in the RWGS assembly;

Control gas discharge on the output of the Fischer-Tropsch assembly to maintain a predetermined level of hydrocarbon or other gases in this output stream;

Control of hydrogen supply to the input of the RWGS assembly;

Control of hydrogen supply to the input of the FT assembly;

FIGS. 29-32 illustrate various systems of the control processes 1500 of the present invention 100. FIG. 29 illustrates control of the RWGS assembly. The essential purpose of control of the RWGS assembly is to substantially as possible convert incoming carbon dioxide into carbon monoxide using feedback control.

Flow of incoming carbon dioxide is controlled via a throttling device 1502 having a regulating element driven by the power driver 1504. A flow meter 1506 is provided for incoming carbon dioxide after throttle 1502. A second flow meter 1508 is provided for carbon monoxide on the output of the RWGS assembly. Outputs of both meters are fed to inputs of an error amplifier 1512 as shown, and those inputs are calibrated in molar velocity. The output of this amplifier drives power driver 1504.

If amount of carbon monoxide becomes smaller than carbon dioxide, the error amplifier output reduces drive of the throttle and less carbon dioxide flows making difference between both flows smaller, with error bandwidth of this negative feedback loop.

Figure 30:
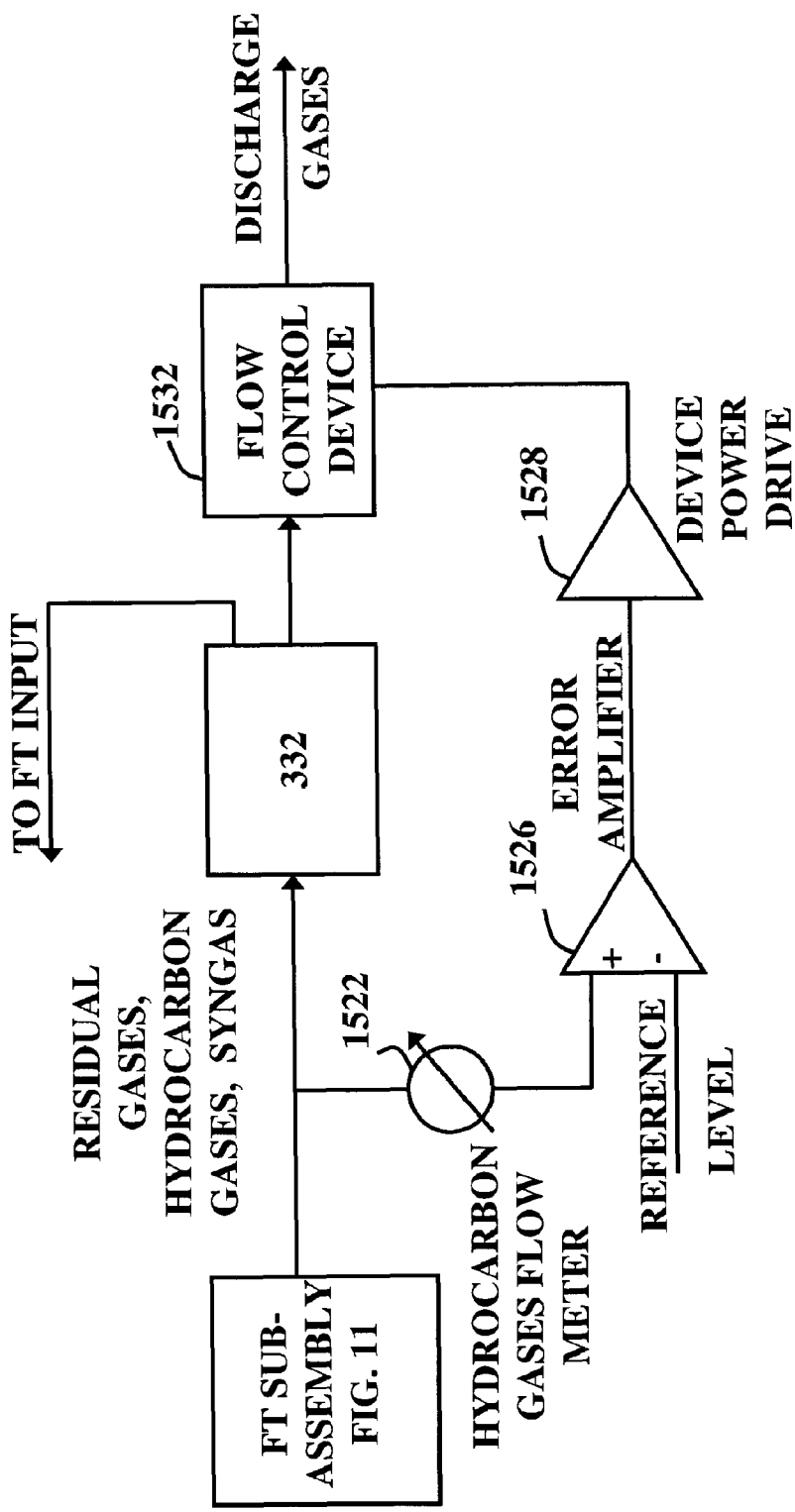
FIG. 30 shows the FT subassembly main loop control according to a preferred embodiment of the present invention.

In FIG. 30 is shown the control of the FT assembly. The essential purpose of the control of the FT assembly is to maintain certain levels of hydrocarbon or other gases like syngas on the output of the assembly, with the ultimate purpose of minimizing discharge of syngas out of the FT assembly recycling loop.

A control gas flow meter 1522 on the output of the FT subassembly is located prior to the splitter 322. Signal from this flow meter is fed into an error amplifier 1526, where it compares with a reference level. Output of this amplifier feeds a power driver 1528 that controls flow control element 1532 of the splitter 322.

This is a negative feedback loop, and in a steady state condition, the flow control device 1532 allows enough effluent gas to escape such that the amount of control gas is kept steady as defined by the reference level. If there is more control gas, then the flow control device opens more and reduces this excess, and vice versa.

Figure 31:
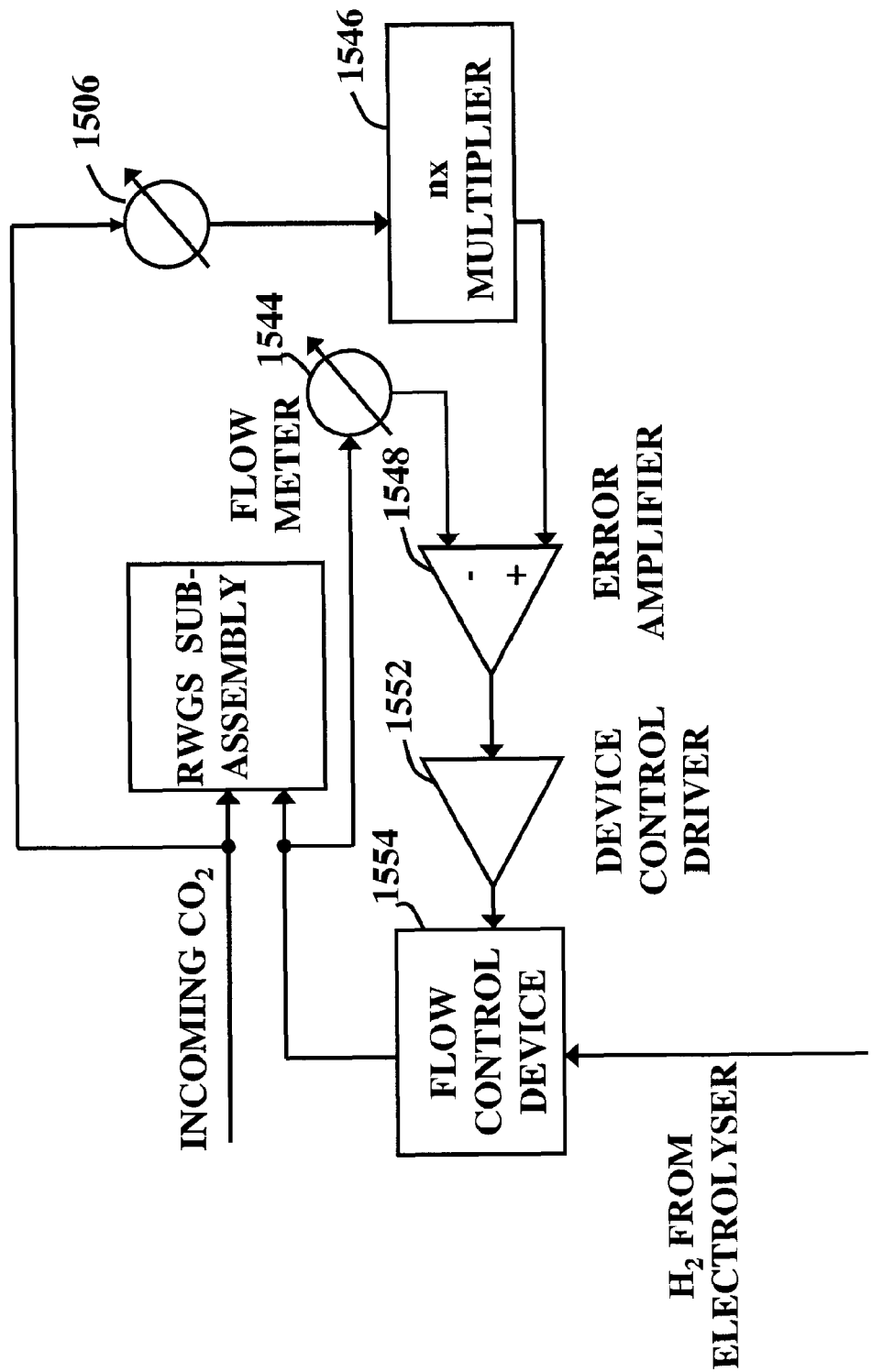
FIG. 31 shows the RWGS subassembly hydrogen supply control according to a preferred embodiment of the present invention.

In FIG. 31 is shown the control of hydrogen supply to the RWGS subassembly. The essential purpose of this control is to supply enough hydrogen for the desired $H_2/CO$ ratio on the output of the RWGS subassembly.

Flow of incoming carbon dioxide is measured by the same flow meter 1506. There is another flow meter 1544 of hydrogen. Output of carbon dioxide flow meter is fed into a multiplier 1546 that multiplies signal by the desired ratio of hydrogen versus carbon dioxide on the input of the RWGS subassembly. In a preferred embodiment it is between 1.5 and 3.2. Signals from the multiplier and from the hydrogen flow meter are fed to an error amplifier 1548, and those inputs are calibrated in molar velocity. Output of this amplifier feeds the driver 1552 to control a hydrogen flow regulator 1554, which can be as simple as a throttle.

Hydrogen is supplied from the electrolyser. It is a negative feedback loop. Its static condition is to allow flow of hydrogen when the output from amplifier 1548 is zero. If the amount of carbon dioxide supply decreases, then there will be a signal on the output of the amplifier 1548 to reduce flow via 1554. The reverse is true as well.

Figure 32:
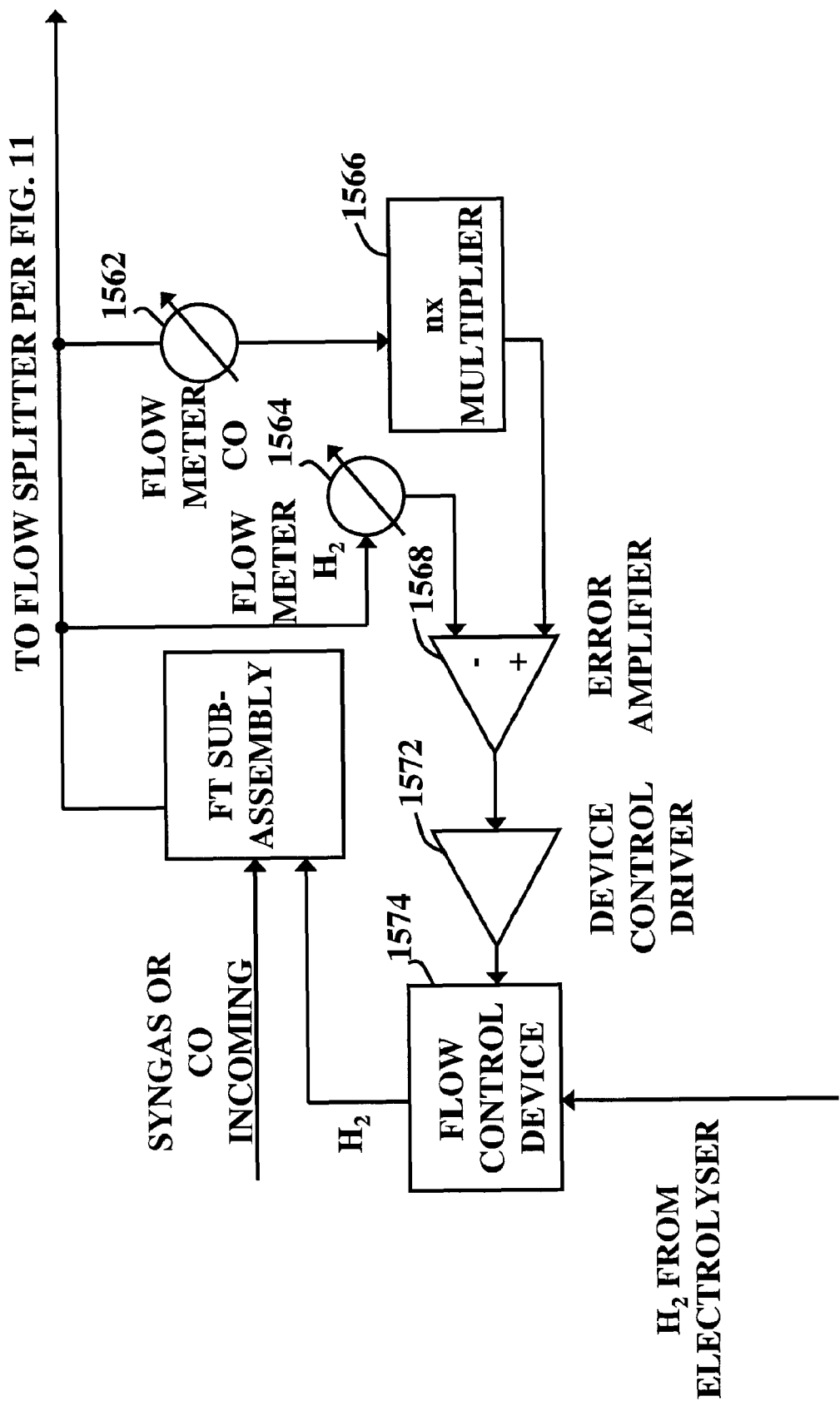
FIG. 32 shows the FT subassembly hydrogen supply control according to a preferred embodiment of the present invention.

FIG. 32 shows the control of hydrogen supply on the input of the FT subassembly. The essential purpose of this control is to regulate the ratio of hydrogen to carbon monoxide between the separator 328 and the splitter 332 for the desired production of hydrocarbons in the FT subassembly.

Carbon monoxide flow is measured by a flow meter 1562 and hydrogen flow is measured by a meter 1564. Both meters are calibrated in molar velocity. A signal from meter 1562 is fed to a multiplier 1566 where the multiplier coefficient represents the desired ratio of hydrogen to carbon monoxide on the output. In a preferred embodiment, it is approximately two, similar to the ratio on the input of the FT subassembly, and varies as a function of operating conditions of a specific type of the FT reactor hereby described.

Outputs of the multiplier 1566 and the flow meter 1564 are fed to an error amplifier 1568. Output of this amplifier feeds a control driver 1572 that powers a regulating mechanism of a hydrogen flow control device 1574 that can be as simple as a throttle. Hydrogen is fed from the electrolyser through this flow controller 1574 to the input of the FT subassembly.

This is a negative feedback loop. With zero output of the amplifier 1568, the amount of hydrogen delivered to the FT subassembly is just right for the desired coefficient of the multiplier. If more hydrogen is detected on the output of the FT subassembly, then flow control device 1574 will be regulated to pass less hydrogen, and vice versa.

There is also a water level controller in the tub. It regulates a water drain mechanism installed in the drain. It is a conventional controller used to maintain liquid level in storage tanks by drainage.

Electric Energy Usage

A summary table, TABLE 1, illustrates the calculation of efficiency and electric energy usage as described herein.

TABLE 1

| Summary Table of Energy Flow in kJ | | | | |
|---|---|---|---|---|
| Carbon oxide feed | $CO_2$ | $CO_2$ | CO | CO |
| Efficiency boundary | Min | Max | Min | Max |
| Energy for electrolysis | 853 | 753 | 578 | 510 |
| Energy for RWGS reaction | 41 | 37 | — | — |
| Energy from FT reaction | (146) | (176) | (146) | (176) |
| Energy for processing | 200 | 150 | 133 | 100 |
| TOTAL ELECTRIC ENERGY (TEE) | 948 | 764 | 565 | 434 |
| High heating value (HHV) of hydrocarbon compounds | 670 | 680 | 670 | 680 |
| Energy efficiency, % (HHV/TEE) | 71 | 89 | 119 | 157 |
| Electric energy use per unit of high heating value (TEE HHV) | 1.4 | 1.1 | 0.84 | 0.64 |
| Excess (Deficit) of TEE, % | 40 | 10 | (16) | (36) |

In Table 1, the calculations are shown for two species of carbon oxides. For each species, all values as explained in the following exemplary description and leading to minimum efficiency are combined in one column, and all values leading to maximum efficiency in another. Efficiency is defined as a ratio of the high heating value of combustion of hydrocarbon compounds (HHV) to the total electric energy supplied to the process and the plant from an external source (TEE). Electric energy use is defined as a reciprocal value of efficiency, as TEE over HHV.

In the last line of Table 1, an excess or deficit of electric energy is shown. For example, in a case of using carbon dioxide as an input and having minimum efficiency, 40% more electric energy will be required than the high heating value of combustion of hydrocarbon compounds produced. In a case of using carbon dioxide as an input and having maximum efficiency, only 10% more electric energy required.

In case of carbon monoxide as an input, it is evident that substantially less electric energy will be required, as carbon monoxide has certain combustion energy (versus carbon dioxide having none). For this reason, in case of carbon monoxide as an input and having minimum efficiency, 16% less electric energy will be required than the high heating value of combustion of hydrocarbon compounds produced. In a case of using carbon monoxide as an input and having maximum efficiency, 36% less.

The following is a description of the entries of Table 1, wherein for simplicity, all energies are shown per one carbon dioxide mole converted into hydrocarbon compounds.

Electric energy required for electrolysis of water is between 274 and 286 kJ per mole of hydrogen, as a function of temperature and under current density providing isothermal operation. In the preferred embodiment, it is estimated that this will be 275 kJ. 3.1 moles of hydrogen are required to recycle one mole of carbon dioxide, thus, 853 kJ of electricity will be required, which is for isothermal operation. For lower current densities, this amount of electric energy will be lower, for an example of up to 100 kJ lower. In such a case, this deficiency will be supplied from the other processes in this plant. Naturally, for higher current densities, there will be a need for more electric energy and additional heat must be removed. Some of this heat can be recycled into feeding an electrolyser electrically via electric power generation. Naturally, all heat can't be recovered and total energy consumption will increase.

The RWGS reaction is moderately endothermic and requires 37-41 kJ per mole of converted carbon dioxide, as a function of operating conditions. This is another process that can use heat produced in this plant.

The Fischer-Tropsch reaction is highly exothermic and produces 146-176 kJ per carbon monoxide mole converted. This reaction is a major source of heat in this plant, methods and systems.

Other energy needs comes from energy dissipated in the processes that are difficult to recover like losses in bearings, electric motors, transformers, rectifiers, radiation and convection losses, and the like, and from the difference in enthalpy of incoming and outflowing products. It is important to note that it is only losses in reversible processing of gases and liquids that count due to processing per FIG. 20. For this reason, it is estimated that these losses are in the range of 150-200 kJ per mole of carbon dioxide.

Output from the FT reactors is a mixture of hydrocarbon compounds with different combustion energies. For this estimate, the high heating value of combustion is used as water is used for recycling. In a mixture of compounds, this energy is on the order of approximately 670-680 kJ per one converted carbon dioxide mole.

Using all these values, the amount of input electric energy is calculated per amount of high heating value of combustion of hydrocarbon compounds produced using that electric energy in the process and system hereby described. This range is between 1.4 and 1.1 when only carbon dioxide is used on the input. In turn, this means that the system needs between 10 to 40% more electric energy from an external source than is contained in high heating value of combustion energy of hydrocarbon compounds with end products carbon dioxide and water.

This energy usage is favorably comparable with the energy usage of coal to liquid conversion—in the range of 2.5—and gas-to-liquid (GTL) energy usage in the range of 1.7. In both cases, the input is high heating value of either coal or gas.

In the present system, there is a much lower usage of electric energy when carbon monoxide is used from an external source, versus using carbon dioxide. In this case, the system will need one mole less of hydrogen, and no heat for the reverse water gas shift reactors. Then energy required for water electrolysis will be in the range of 275 kJ/mol, times 2.1 moles, for 578 kJ. In addition, the amount of losses in gas processing will be reduced at least by one-third due to elimination of the RWGS process and carbon dioxide separation process, so it will be 100 to 130 kJ. This results in that external electric energy needs are between 0.64 and 0.84 of high heating value of hydrocarbon compounds.

To achieve such beneficially low usage of externally supplied electricity, the following major internal energy flows are implemented:

From Fischer-Tropsch to RWGS, using heat pump;
From Fischer-Tropsch to the electrolyser, as condensation heat of steam, if required;
From Fischer-Tropsch to all process heat uses;
From Fischer-Tropsch to the electrolyser, using residual heat for electric power generation;
From internal gas expanders-generators to internal compressor-motors; and
From internal gas/liquid coolers to internal gas/liquid heaters using phase conversion of working fluids Systems-Wide Preferred Alternatives In addition to using the FT reactor(s) to convert syngas into liquid fuels, it can be desirable to produce major components of natural gas, methane. This can be accomplished using a catalysed reaction $$CO+3H_2 \rightarrow CH_4+H_2O \qquad (7)$$

In addition, other various hydrocarbon substances can be produced from such syngas, as commonly known in the art.

In another preferred embodiment of the present invention, a plant can be located in proximity to natural gas fields, to take carbon dioxide, and deliver $CH_4$. In many gas wells, there is substantial amount of carbon dioxide, perhaps and some of them are closed for that reason. The RWGS and FT processes disclosed can in some instance be bypassed, using a Sabatier reaction:

$$CO_2+4H_2 \rightarrow CH_4+2H_2O \qquad (8)$$

In this process, similar amounts of heat are released as in the FT process (per carbon oxide mole) and conversion takes place at approximately 300° C.

Two different reactions can be used replacing the disclosed FT and RWGS processes. The first is the Lurgi process, also known as the Carnol process, can be used. The second is the methanol-to-gasoline (MTG) process.

While in the reverse water gas shift reaction, carbon dioxide is reacted with hydrogen to produce carbon monoxide and water, the Lurgi or Carnol process uses the same reactants as the reverse water gas shift reaction with different catalysts and reaction conditions to produce methanol. Thus, in another embodiment of the present invention, the RWGS reaction can be substituted for the Lurgi or Carnol process, being:

$$CO+3H_2 \rightarrow CH_3OH+H_2O \qquad (9)$$

The methanol produced from this reaction is then used in the MTG process with high selectivity for light hydrocarbons forming basis of gasoline.

While the invention has been disclosed in its preferred forms, it will be apparent to those skilled in the art that many modifications, additions, and deletions can be made therein without departing from the spirit and scope of the invention and its equivalents as set forth in the following claims.

What is claimed is:

1. A method for producing hydrocarbon compounds comprising,
   a) generating hydrogen gas from water in an electrolyzer
   b) feeding carbon dioxide gas and at least a portion of said hydrogen gas to a reverse water gas shift reactor to generate a gaseous stream including at least water steam and syngas as a mixture of hydrogen gas and carbon monoxide gas, wherein
      b1) said reverse water gas shift reactor comprises serially connected reactors,
      b2) water steam is separated between and after said serially connected reactors,
   c) feeding a Fischer-Tropsch reactor with said syngas effluent from the reverse water gas reactor to generate hydrocarbon compounds, and
   d) a temperature of a gas in the method is changed at least near adiabatically and/or a pressure of a gas in the method is changed at least near isothermally with the temperature being increased/decreased at least near adiabatically by compressing/expanding an incoming gas in a compressor/expander with using/generating electrical energy from/to an electric power line such that involved heat energy is less than 10% of the used/generated electrical energy and the pressure is increased/decreased at least near isothermally by compressing/expanding an incoming gas in a compressor/expander with using/generating electrical energy from/to an electric power line and cooling/heating to compressed/expanded gas with delivering heat to/taking heat from a heat distribution line such that the absolute temperature ° K of the processed gas deviates less than 10% from the absolute temperature ° K of the incoming gas.

2. The method of claim 1, further comprising, a heat distribution process wherein heat distribution lines connecting two or more of said steps are provided for receiving or supplying heat to or from said steps as to reduce need for balance of such heat of thermal energy supplied externally.

3. The method of claim 2, further comprising, wherein a working fluid of a heat distribution line delivering heat or thermal energy is in a gaseous state upstream of the heat exchanger and in a liquid state downstream of the heat exchanger or wherein a working fluid of a heat distribution line taking up heat or thermal energy is in a liquid state upstream of the heat exchanger and in a gaseous state downstream of the heat exchanger.

4. The method of claim 3, further comprising an electric energy distribution process wherein electric power distribution lines connecting two or more of said steps are provided for receiving or supplying electric energy to or from said steps as to reduce need for balance of such electric energy supplied externally.

5. The method of claim 1, wherein within step b1) the following steps are performed:
   b) i feeding said hydrogen gas and said carbon dioxide gas to a first reverse water gas shift reactor to generate a first stream of syngas along with carbon dioxide and water steam;
   b) ii generating a second stream of syngas along with carbon dioxide by condensing at least some water steam from said first stream;
   b) iii feeding said second stream of syngas along with carbon dioxide to a second reverse water gas shift reactor to generate a third stream of syngas along with carbon dioxide and water steam;
   b) iv generating a fourth stream of syngas along with carbon dioxide by condensing at least some water steam from said third stream;
   b) v feeding said fourth stream of syngas along with carbon dioxide to a third reverse water gas shift reactor to generate a fifth stream of syngas along with carbon dioxide and water steam;
   b) vi generating a sixth stream of syngas along with carbon dioxide by condensing at least some water steam from said fifth stream;
   b) vii generating a last stream of syngas by separating at least a part of the carbon dioxide from said sixth stream,
   b) viii feeding said separated carbon dioxide back to the input of said first reverse water gas shift reactor and
   b) ix supplying said last stream of syngas, to the input of said Fischer-Tropsch reactor.

* * * * *